United States Patent
Oqab et al.

(10) Patent No.: US 12,322,979 B2
(45) Date of Patent: Jun. 3, 2025

(54) SYSTEMS AND METHODS FOR POINT TO-POINT WIRELESS POWER TRANSMISSION FOR BEAM RIDING, POWER AND DATA DISTRIBUTION SHARING, WIRELESSLY POWERED MOBILE SYSTEMS

(71) Applicant: Oqab Dietrich Induction Inc., Kitchener (CA)

(72) Inventors: Haroon B. Oqab, Kitchener (CA); George B. Dietrich, Kitchener (CA)

(73) Assignee: Oqab Dietrich Induction Inc., Kitchener (CA)

( * ) Notice: Subject to any disclaimer, the term of this patent is extended or adjusted under 35 U.S.C. 154(b) by 173 days.

(21) Appl. No.: 18/005,648

(22) PCT Filed: Jul. 15, 2021

(86) PCT No.: PCT/CA2021/050985
§ 371 (c)(1),
(2) Date: Jan. 16, 2023

(87) PCT Pub. No.: WO2022/011479
PCT Pub. Date: Jan. 20, 2022

(65) Prior Publication Data
US 2023/0275463 A1     Aug. 31, 2023

Related U.S. Application Data

(60) Provisional application No. 63/052,219, filed on Jul. 15, 2020.

(51) Int. Cl.
*H02J 50/12* (2016.01)
*B64B 1/40* (2006.01)
(Continued)

(52) U.S. Cl.
CPC ............... *H02J 50/12* (2016.02); *B64B 1/40* (2013.01); *B64B 1/62* (2013.01); *B64D 27/24* (2013.01);
(Continued)

(58) Field of Classification Search
CPC .. H02J 50/12; H02J 50/80; H02J 50/27; H02J 50/402; H02J 7/35; B64U 10/13;
(Continued)

(56) References Cited

U.S. PATENT DOCUMENTS 11,332,025 B2 *   5/2022   Parimi ................. B64U 50/38
2003/0192586 A1  10/2003   Takada et al.
2009/0229656 A1   9/2009   Tillotson

OTHER PUBLICATIONS

European Patent Office, Extended European Search Report for EP Patent App. No. 21841433.2, dated Aug. 21, 2024.

* cited by examiner

Primary Examiner — Carlos Amaya
(74) Attorney, Agent, or Firm — Own Innovation; James W. Hinton

(57) ABSTRACT

Provided is a system for point to point wireless power transmission including: a plurality of autonomous and semi-autonomous unmanned systems configured as a mobile transmitting and/or receiving power station, through which unmanned systems can navigate, maneuver, beam ride, and recharge from point to point. Provided is a method of adapting unmanned systems to receive and transmit power point-to-point amongst themselves. The method includes controlling a swarm formed from a plurality of autonomous synchronized unmanned systems to form a larger transmitter and receiver for a mobile power station.

35 Claims, 69 Drawing Sheets

(51) Int. Cl.
  *B64B 1/62*      (2006.01)
  *B64D 27/24*     (2024.01)
  *B64D 27/353*    (2024.01)
  *B64F 1/10*      (2024.01)
  *B64U 10/13*     (2023.01)
  *B64U 50/35*     (2023.01)
  *B64U 50/39*     (2023.01)
  *B64U 80/82*     (2023.01)
  *B64U 101/00*    (2023.01)
  *H02J 7/35*      (2006.01)
  *H02J 50/27*     (2016.01)
  *H02J 50/40*     (2016.01)
  *H02J 50/80*     (2016.01)

(52) U.S. Cl.
  CPC ............... *B64F 1/10* (2013.01); *B64U 10/13* (2023.01); *B64U 50/35* (2023.01); *B64U 50/39* (2023.01); *B64U 80/82* (2023.01); *H02J 7/35* (2013.01); *H02J 50/27* (2016.02); *H02J 50/402* (2020.01); *H02J 50/80* (2016.02); *B64B 2201/00* (2013.01); *B64D 27/353* (2024.01); *B64U 2101/00* (2023.01)

(58) Field of Classification Search
  CPC ........ B64U 50/35; B64U 50/39; B64U 80/82; B64U 2101/00; B64B 1/40; B64B 1/62; B64B 2201/00; B64D 27/24; B64D 27/353; B64F 1/10
  See application file for complete search history.

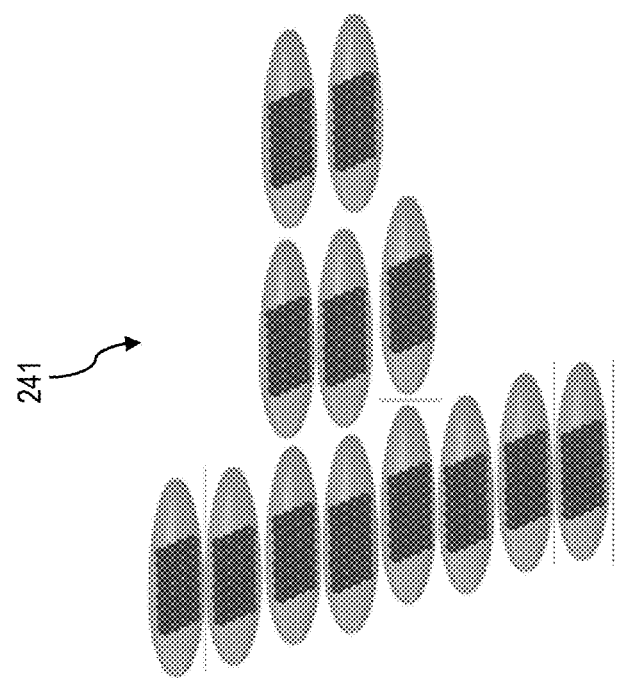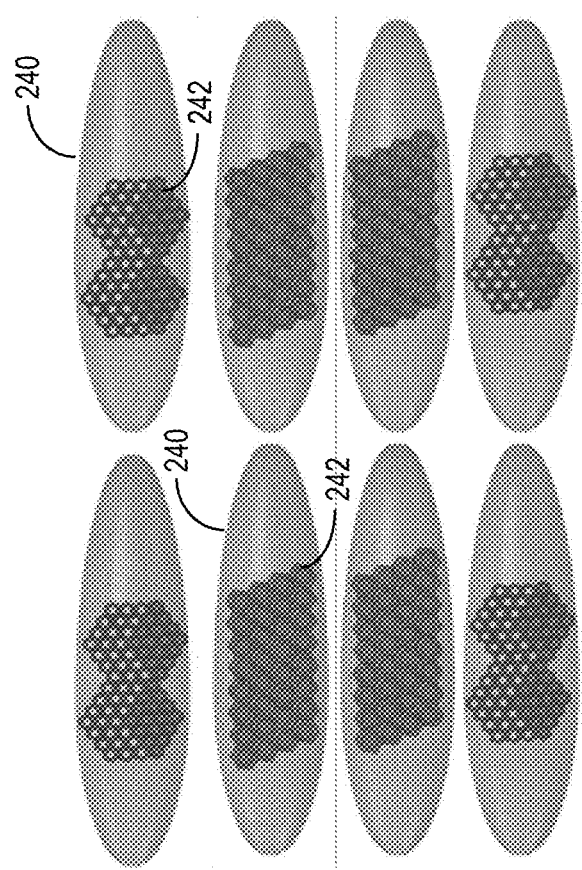
Figure 21

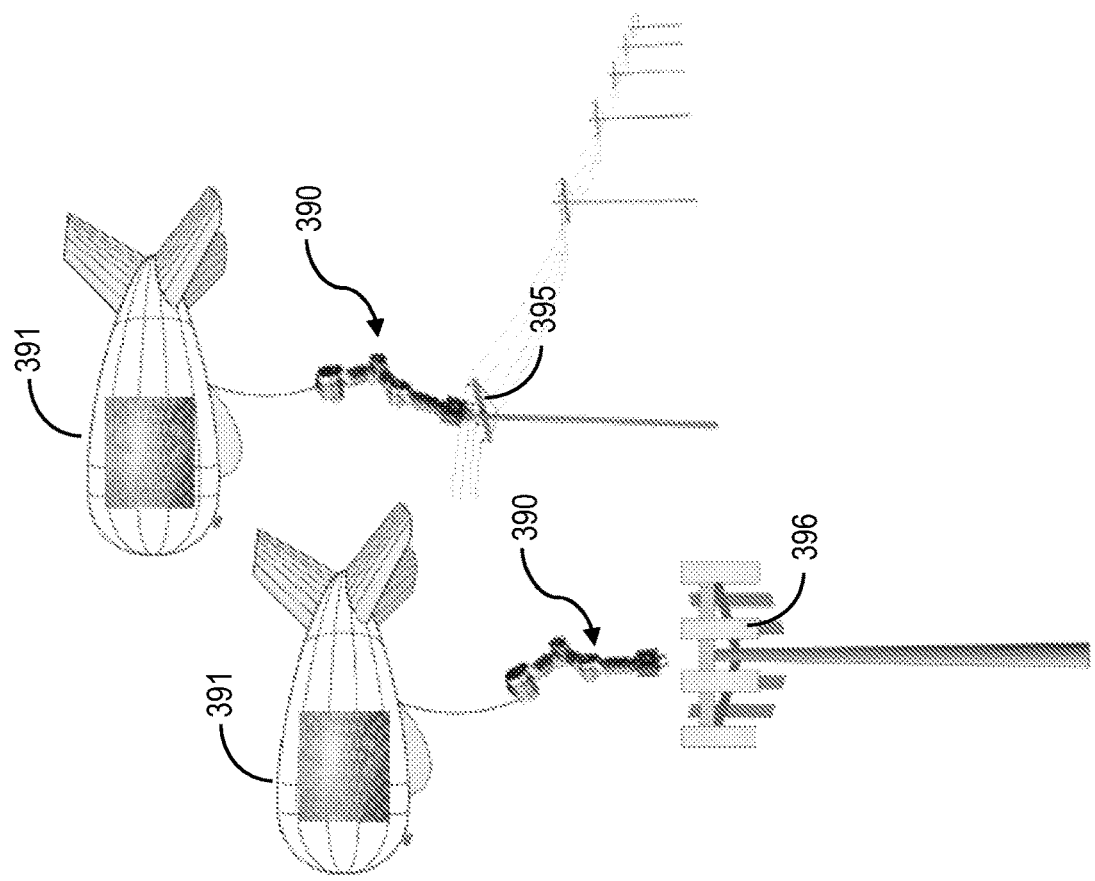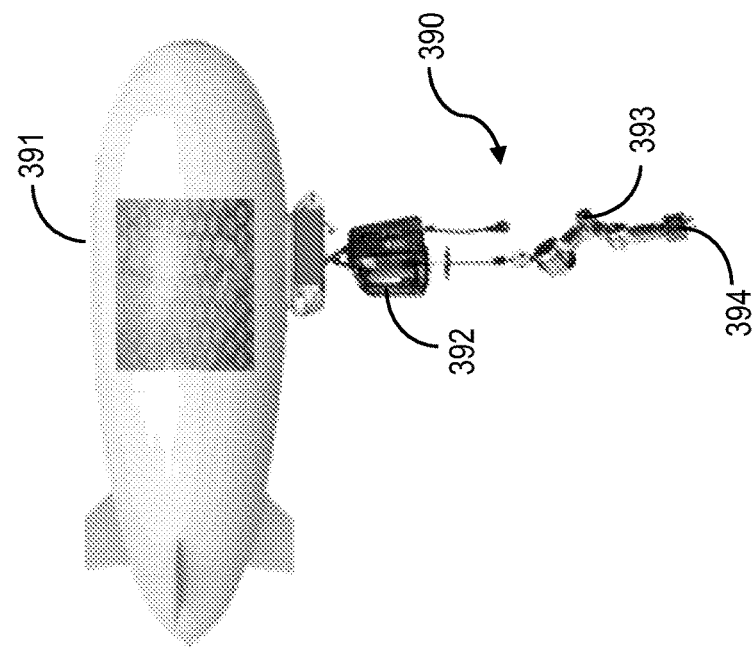
Figure 43

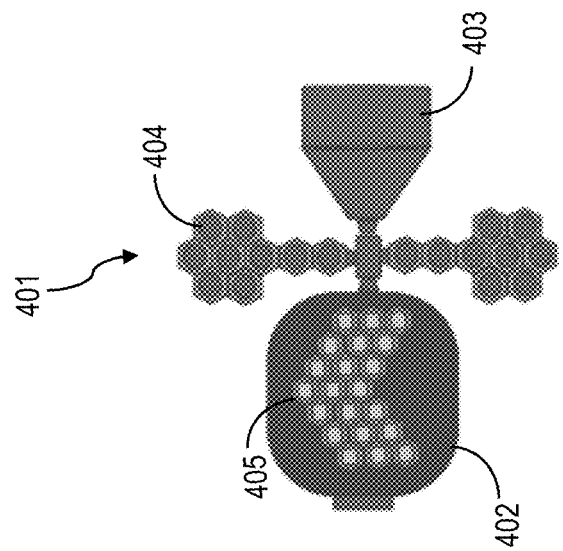
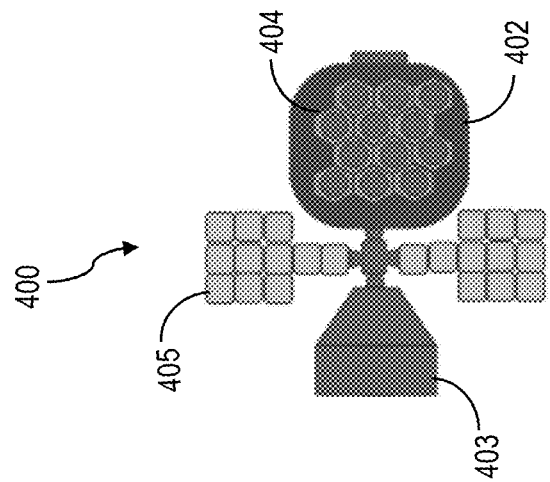
Figure 47

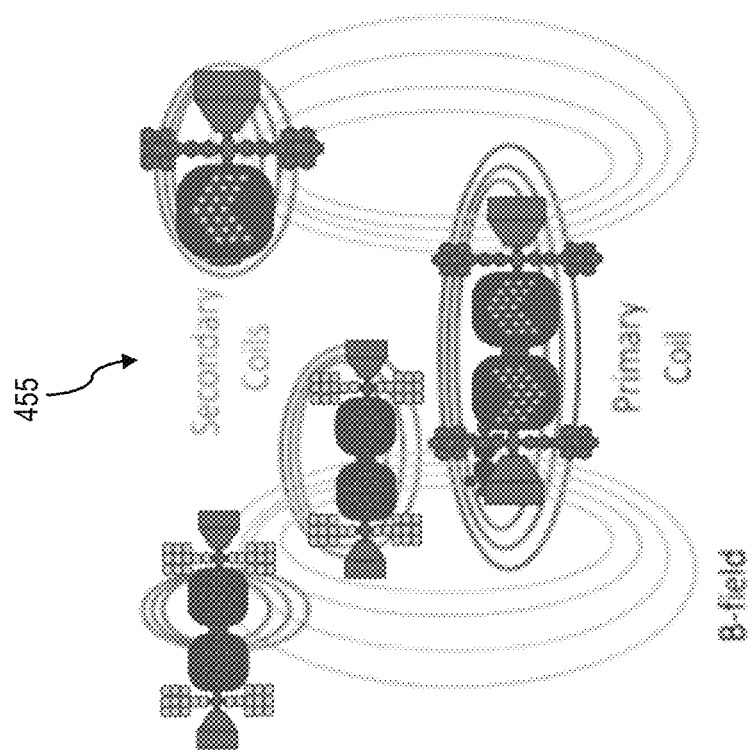
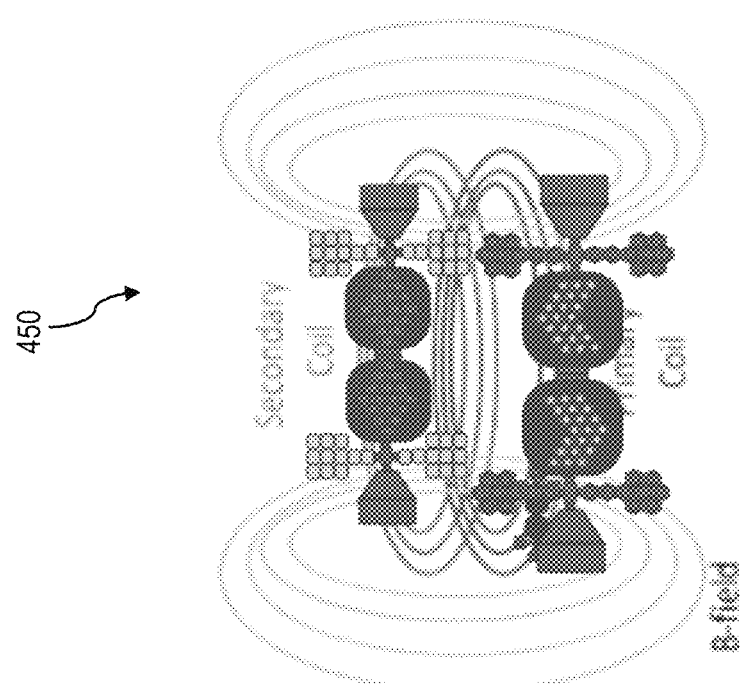
Figure 55

470

SYSTEMS AND METHODS FOR POINT TO-POINT WIRELESS POWER TRANSMISSION FOR BEAM RIDING, POWER AND DATA DISTRIBUTION SHARING, WIRELESSLY POWERED MOBILE SYSTEMS

TECHNICAL FIELD

The present disclosure relates generally to wireless transmission. More particularly, the present disclosure relates to a method and system for distributing and sharing power and data.

INTRODUCTION

Embodiments of the present systems and methods are related to deploying, launching, controlling, powering, fleet management, charging and recharging of remotely operated autonomous, semiautonomous and tele-operated modular systems for power and data sharing.

Specifically, embodiments described herein are directed to deployment, operation and retrieval of a plurality of modular systems such as unmanned and piloted aircraft, ground vehicles, and watercraft, satellites and/or the like by land, air, water and space.

SUMMARY

An aspect of the present disclosure is directed to a system for point to point wireless power transmission including: a plurality of autonomous and semi-autonomous unmanned aircraft systems configured as a mobile transmitting and/or receiving power station, through which aircraft systems can navigate, maneuver, beam ride, and recharge from point to point.

In another aspect of the present disclosure is directed to a method of adapting aircraft systems to receive and transmit power point-to-point amongst themselves. The method includes controlling a swarm formed from a plurality of autonomous synchronized unmanned aircraft systems to form a larger transmitter and receiver for a mobile power station.

In another aspect of the methods, beam riding systems are configured to a rules-based control for autonomous and semi-autonomous unmanned systems travel from point to point.

In another aspect of the method, an aircraft system comprises one or more inflatable gas bags filled with a gas for control.

In another aspect of the system, the frame assembly is an inflatable structure filled with a gas.

In another aspect of the system, aircraft systems are deployed from a mothership and/or deployed from stationary platforms and/or mobile systems.

In another aspect of the system, a plurality of electrically powered aircraft systems transit and receive power from point to point to establish a beam riding highway.

In another aspect of the method, a plurality of systems can transmit and receive power and data to and from a land-based, air-based, water-based, and/or space-based system to serve as power and data hubs, coupled to a plurality of tethers to distribute power and data to other nodes.

In another embodiment, an integrated architecture of a plurality of mobile systems to create a network to transmit and receive power and data with a plurality of mobile systems operating various environments on land, air, water, and space In another aspect of the method, a plurality of system can transmit and receive power and data using quantum effects, including entangled data transmission.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIG. 21 is a diagram of stratospheric receiving stations in formation, according to an embodiment;

FIG. 43 is a diagram of docking systems to tether an airship to power and communications infrastructure, according to an embodiment;

FIG. 47 is a diagram of additively manufactured spacecraft, according to several embodiments;

FIGS. 55-56 are diagrams of in-orbit inductive-coupled magnetic resonance wireless power transfer systems, according to several embodiments;

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

Figure 1:
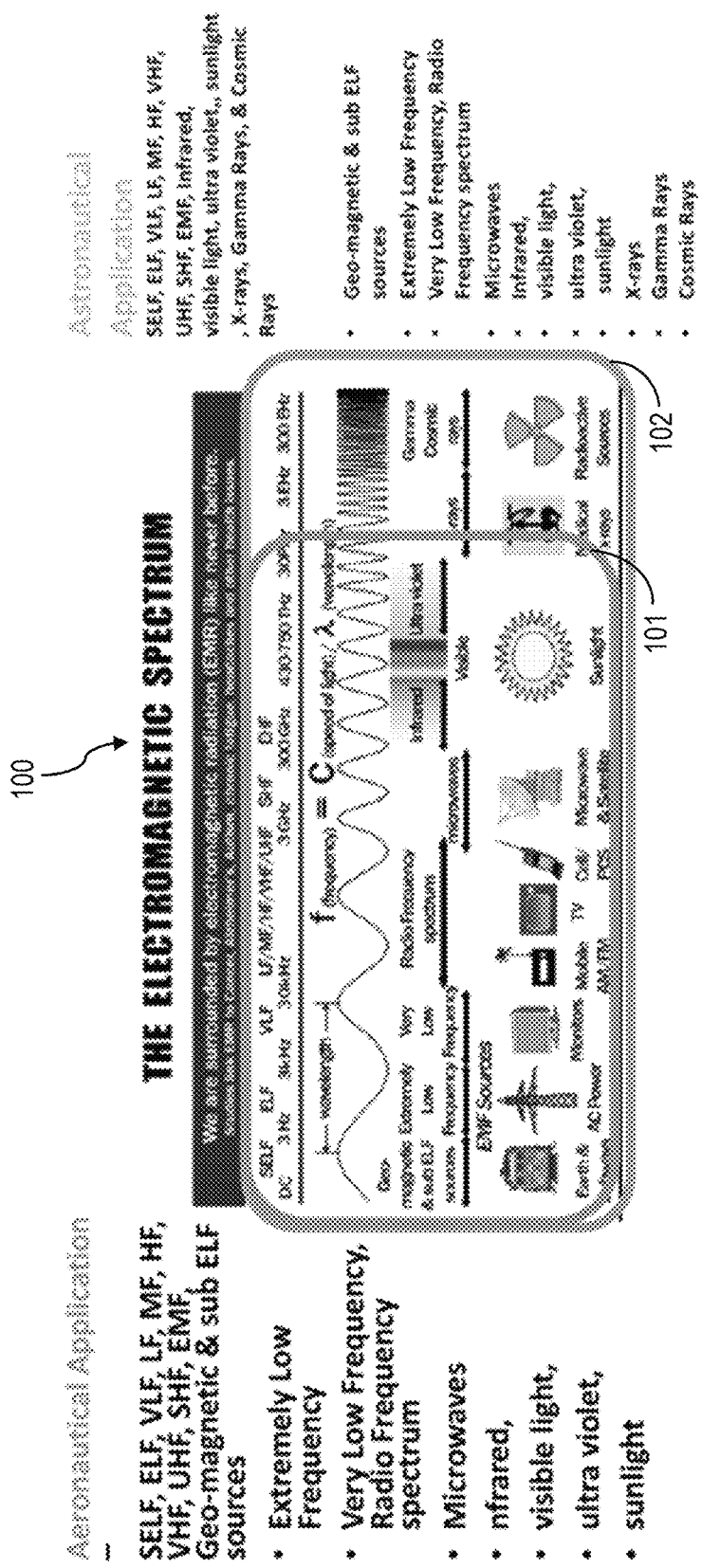
FIG. 1 is a diagram of the electromagnetic spectrum ranges for aeronautical and astronautical applications.

FIG. 1 is a diagram of the electromagnetic (EM) spectrum showing wavelengths of electromagnetic radiation 100 that may be used for aeronautical and astronomical applications. The aeronautical application range 101 includes extremely low frequency (ELF), very low frequency (VLF), microwave, infrared, visible light and ultraviolet radiation. The astronomical application range 102 includes the wavelengths in the aeronautical application range 101 as well as x-ray, gamma and cosmic radiation. Types of radiation that are present in both the aeronautical application range 101 and the astronomical application range 102, for example microwave radiation, may be used for combined aeronautical and astronomical applications such as space-to-ground data transmission.

Figure 2:
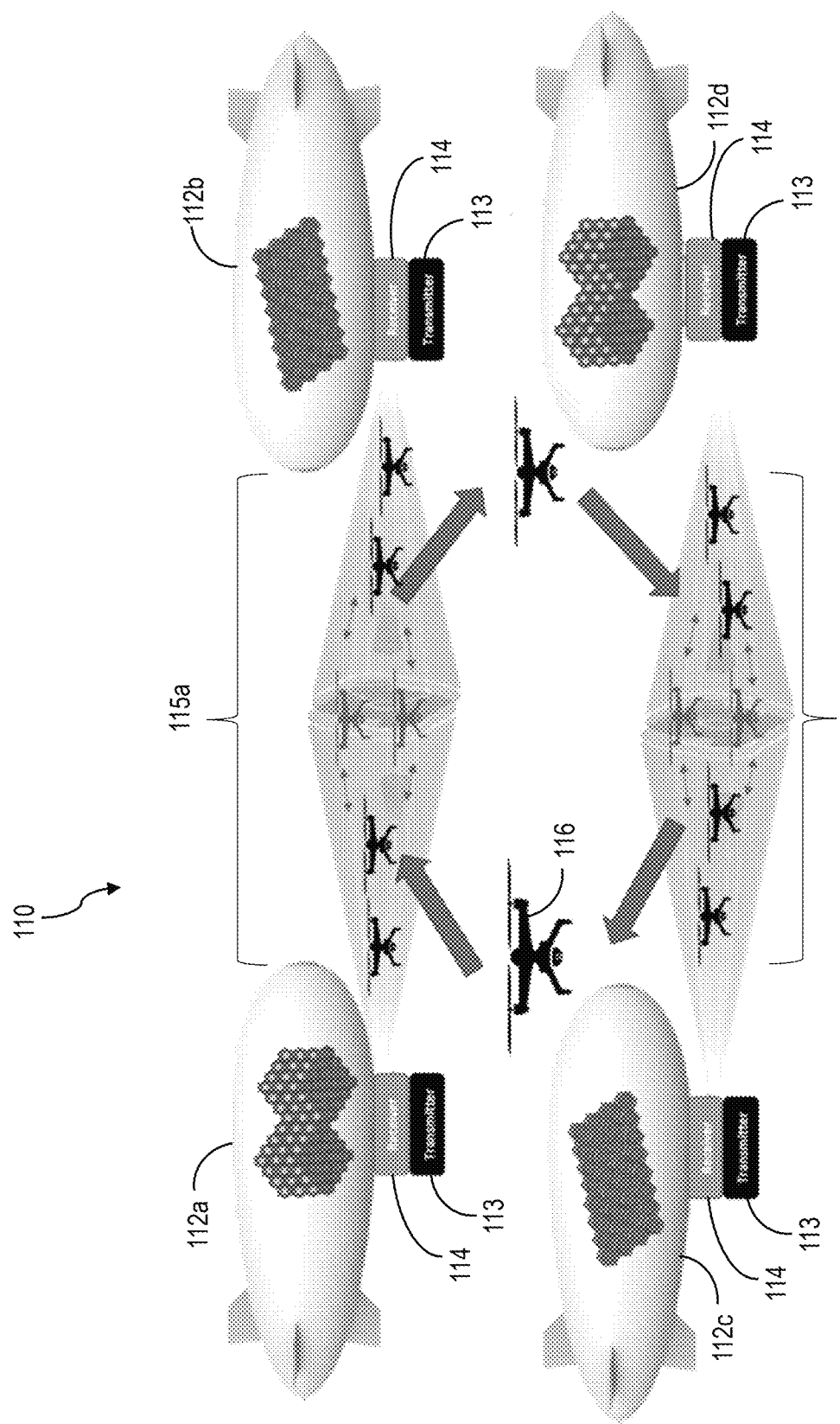
FIG. 2 is a diagram of a point-to-point beam riding system, according to an embodiment.

FIG. 2 is a diagram of a point-to-point (P2P) beam riding system 110, according to an embodiment. The P2P beam riding system 110 includes at least a pair of craft 112a, 112b (a second pair of craft 112c, 112d is also shown). The craft 112a, 112b, 112c, 112d may be autonomous or semi-autonomous airships (as shown), balloons or drones (i.e., unmanned aerial vehicles, UAVs). Each craft 112a, 112b, 112c, 112d includes at least one transmitter 113 and at least one receiver 114 for transmitting and receiving, respectively, EM radiation, for example, microwave radiation. The craft 112a, 112b, 112c, 112d are positioned (in the air) in pairs such that the EM radiation transmitted by a first craft 112a, 112c is received by a second craft 112b, 112d.

The radiation transmitted and received between the craft produces a beam riding "highway" (shaded regions indicated by reference numbers 115a, 115b), or a microwave tunnel in the case of microwave radiation, in a volume of air between the craft. The beam riding highway 115a, 115b may be utilized for wireless power transfer (WPT), wireless data transfer between the craft 112a, 112b as well as providing over-the-air charging, command and control functions, for beam riding aerial craft (e.g., drone 116) that can be powered and/or recharged by microwave radiation.

Each beam riding highway 115a, 115b is directional, that is the direction of radiation transmitted between the craft 112a, 122b is in one direction. The direction of radiation transmission between the craft 112a, 112b may be reversed. Consequently, the drone 116, may only "ride" the beam riding highway 115a, 115b in the direction of radiation transmission. A shown, the direction of radiation transmission in the first beam riding highway 115a, and the direction of travel for the drone 116 within the first beam highway 115a is generally in the direction from craft 112a to craft 112b. The direction of radiation transmission in the second beam riding highway 115b, and the direction of travel for the drone 116 within the second beam highway 115b is generally in the direction from craft 112c to 112d. For example, the drone 116 may enter the first beam riding highway 115a in the vicinity of the craft 112a and ride the first beam riding highway 115a between the craft 112a, 112b, then exit the first beam riding highway 115a in the vicinity of craft 112b.

Figure 3:
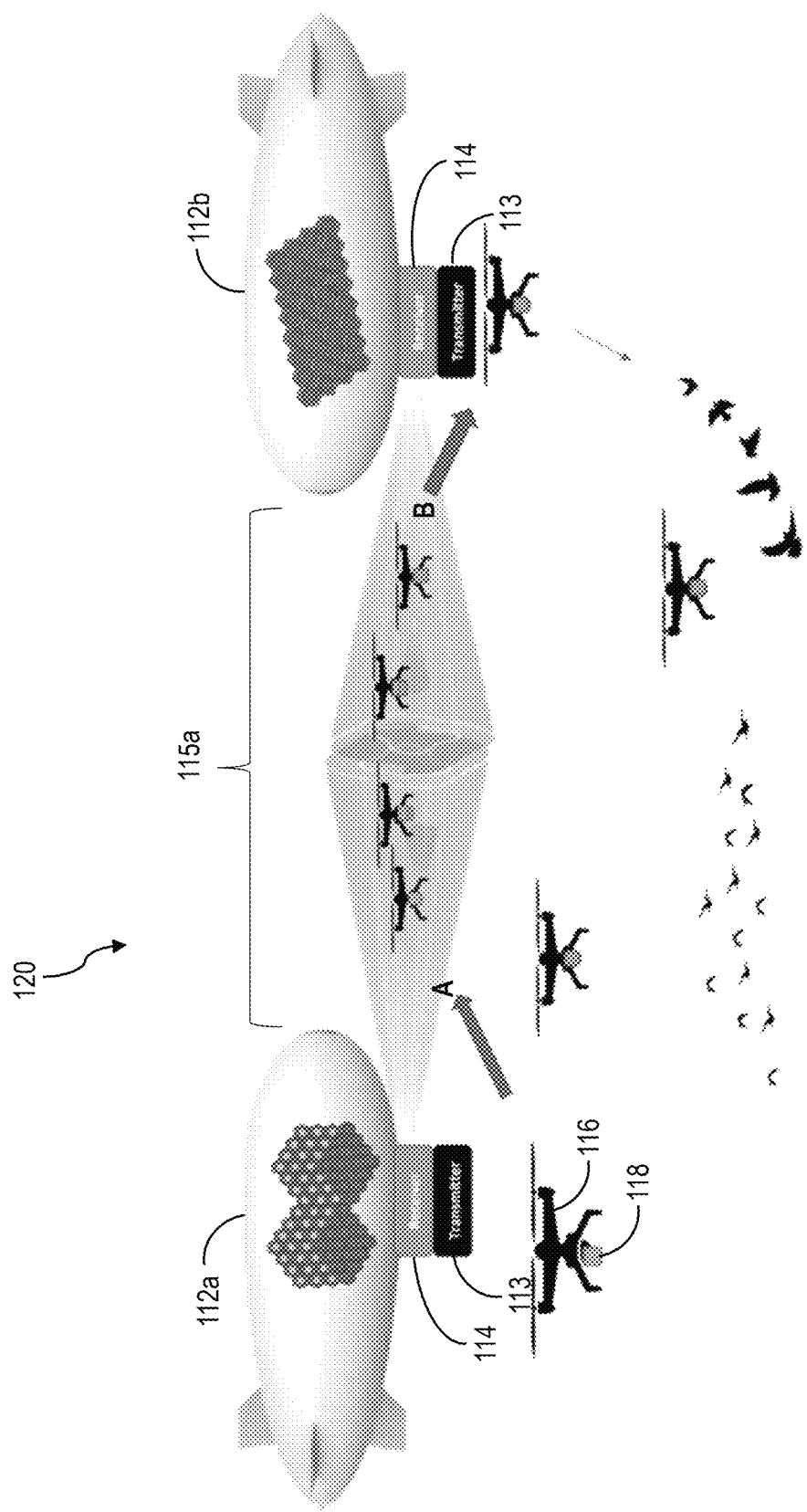
FIG. 3 is a diagram of point-to-point wireless power transmission for wildlife management applications, according to an embodiment.

FIG. 3 is a diagram of a system 120 for point-to-point wireless power transmission for wildlife management applications. The system 120 is substantially similar to the system 110 in FIG. 2, and includes a pair of aerial craft 112a, 112b that produce a microwave beam riding highway 115a between them. The drone 116 includes a rectenna rechargeable power source 118. The power source 118 may be recharged by the drone 116 entering the beam riding highway 115a so that the rectenna receives microwave radiation and converts it to electricity that is stored in the power source 118.

In the exemplary application shown in FIG. 3 the drone 116 is used for wildlife management applications in the vicinity of an area of interest, such as an airport to keep birds away from aircraft flight paths. When the drone 116 is low on power, it may fly into the beam riding highway 115a, for example, at point A to recharge the power source 118. As the drone 116 travels between the aerial craft 112a, 112b along the beam riding highway 115a, the power source 118 is recharged. When the power source 118 is sufficiently charged, the drone 116 exits the beam riding highway 115a, for example, at point B and may then return to its operational mode of keeping birds away.

As noted above, the travel of the drone 116 along the beam riding highway is in one direction only (the same direction of microwave radiation transmission between the aerial craft 112a, 112b) to allow the drone 116 maximum exposure to microwave radiation in order to charge the power source to sufficient levels required for operation. The drone 116 may travel a further distance along the beam riding highway 115a to recharge the power source 118 more.

Figure 4:
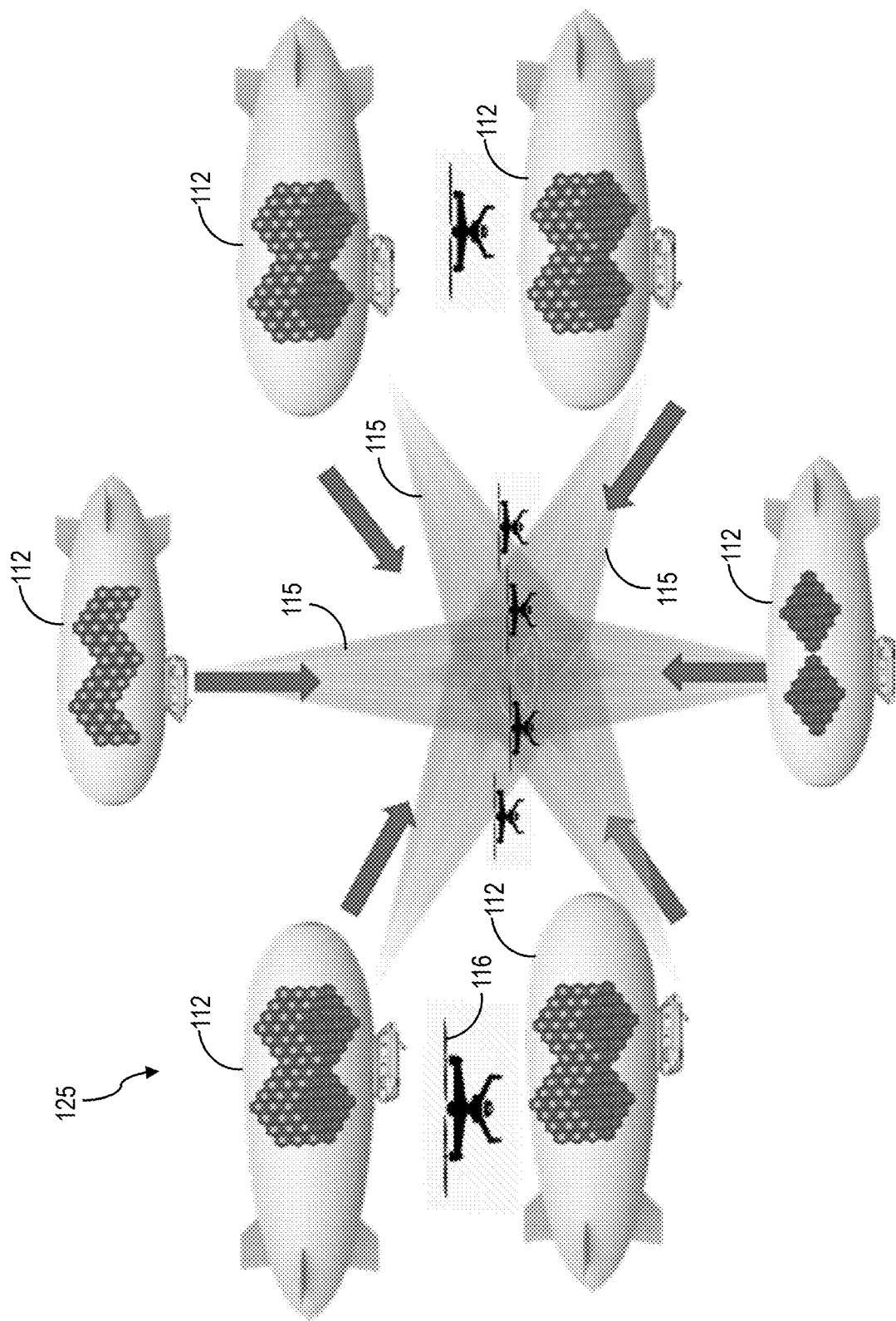
FIG. 4 is a diagram of a multi-directional beam riding system, according to an embodiment.

Referring to FIG. 4, one or more beam riding highways 115 may be implemented within a point-to-point beam rising system 125 to allow for bidirectional or multi-directional travel of a beam riding drone 116. Accordingly, the drone 116 may ride one beam riding highway 115 to travel in one direction and ride another beam riding highway 115 to travel in another direction. Generally, a beam riding highway 115 may be implemented to travel in any direction between appropriately positioned aerial craft 112. The direction of travel of the drone 116 along the beam riding highways 115 may result in a change altitude, a change in position at the same altitude or a change in altitude and position of the drone 116.

Figure 5:
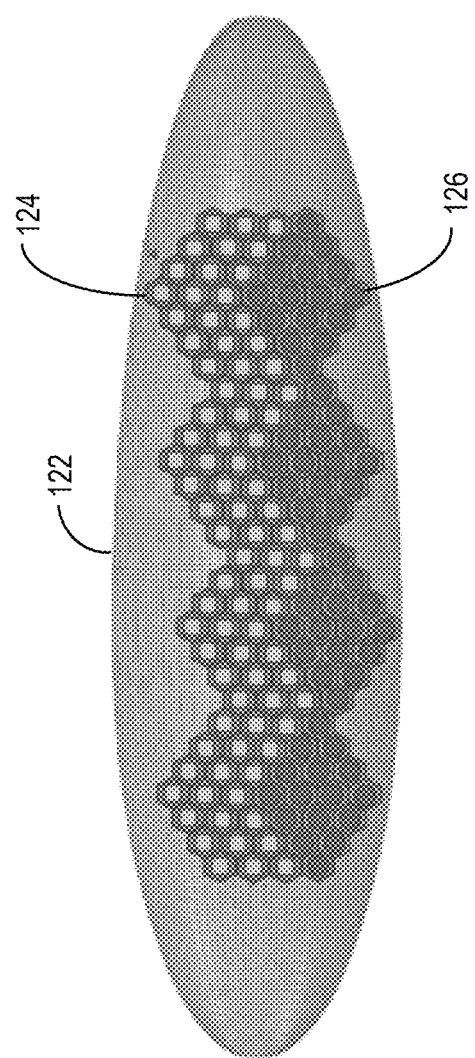
FIG. 5 is a diagram of additive manufacture of rectenna and solar cells on inflatable and deployable structures for aerial craft, according to an embodiment.

FIG. 5 is a diagram of additive manufacture of rectennas 126 and solar 124 cells on an inflatable and deployable structure 122 for aerial craft. The inflatable and deployable structure 122 may be the outer fuselage or skin of a flight vehicle, for example, an airship, balloon, aircraft, drone, satellite, rocket, hybrid vehicle and/or the like. The rectennas 126 and solar cells 124 may be additively manufactured to the structure 122 while it is deflated. After manufacture, the structure 122 may be inflated for deployment.

When the structure 122 is inflated (as shown) the solar cells 124 and rectennas 126 become oriented in the correct position for operation. For example, the solar cells 124 are generally positioned on a top surface of the structure 122 and oriented to face the sun when the aerial craft is deployed, to receive a maximum amount of solar radiation. Similarly, the rectennas 126 are oriented to receive EM radiation, for example, from a beam riding highway (not shown).

An advantage of additive manufacture of inflatable and deployable structures 122 is that the structures 122 may be manufactured in the deflated configuration thus providing a more compact size for storage and transport to the site where they will be inflated and deployed (whether in atmosphere or in space).

Figure 6:
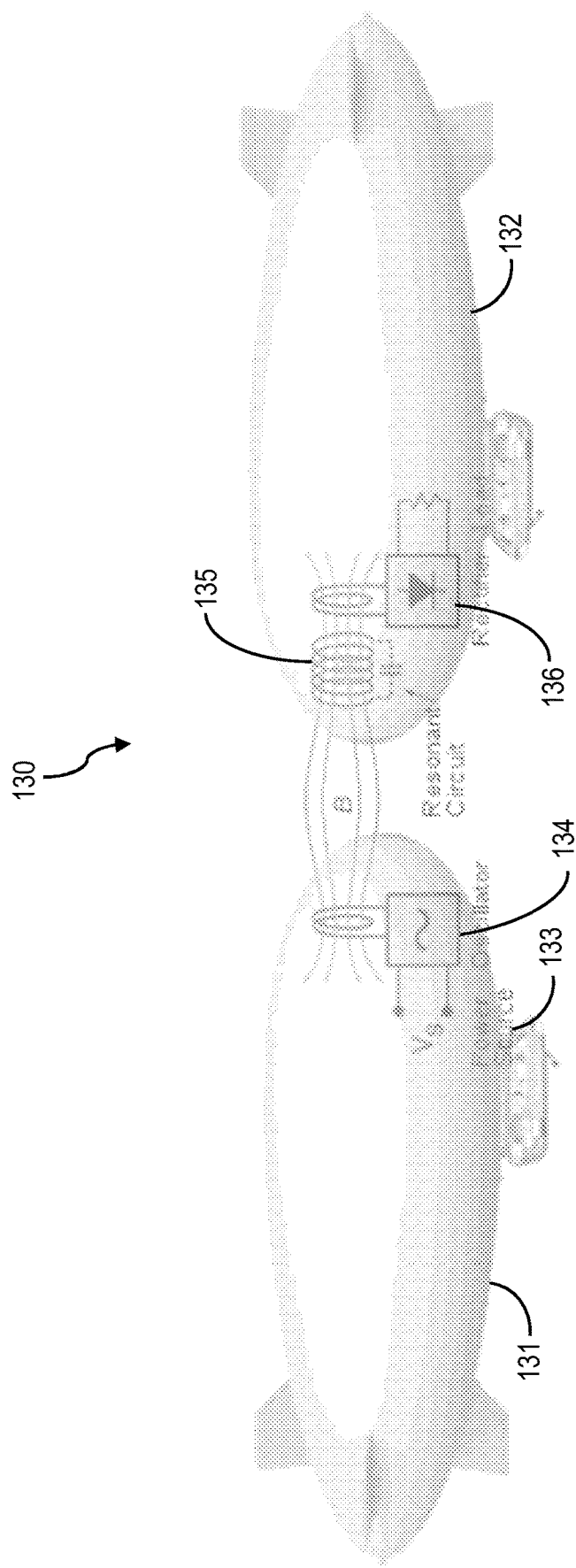
FIG. 6 is a diagram of inductive-coupled magnetic resonance wireless power transfer between two aerial craft, according to an embodiment.

FIG. 6 is a diagram of inductive-coupled magnetic resonance wireless power transfer 130 between a transmitting aerial craft 131 and a receiving aerial craft 132. The transmitting craft 131 includes a power source 133 connected to an oscillator 134. The receiving craft 132 includes a resonant circuit 135 connected to a rectifier 136. The oscillator 134 draws DC power from the power source 133 and converts it to AC power in a circuit to generate a magnetic field, B. If the receiving craft 132 is in close enough proximity to the transmitting craft 131, the resonant circuit 135 will be within the magnetic field, B, thus causing a current flow through the resonant circuit 135. The AC current flowing from the resonant circuit 135 is converted to DC power by the rectifier 136 and can then be used to power the load of the receiving craft 132.

Figure 7:
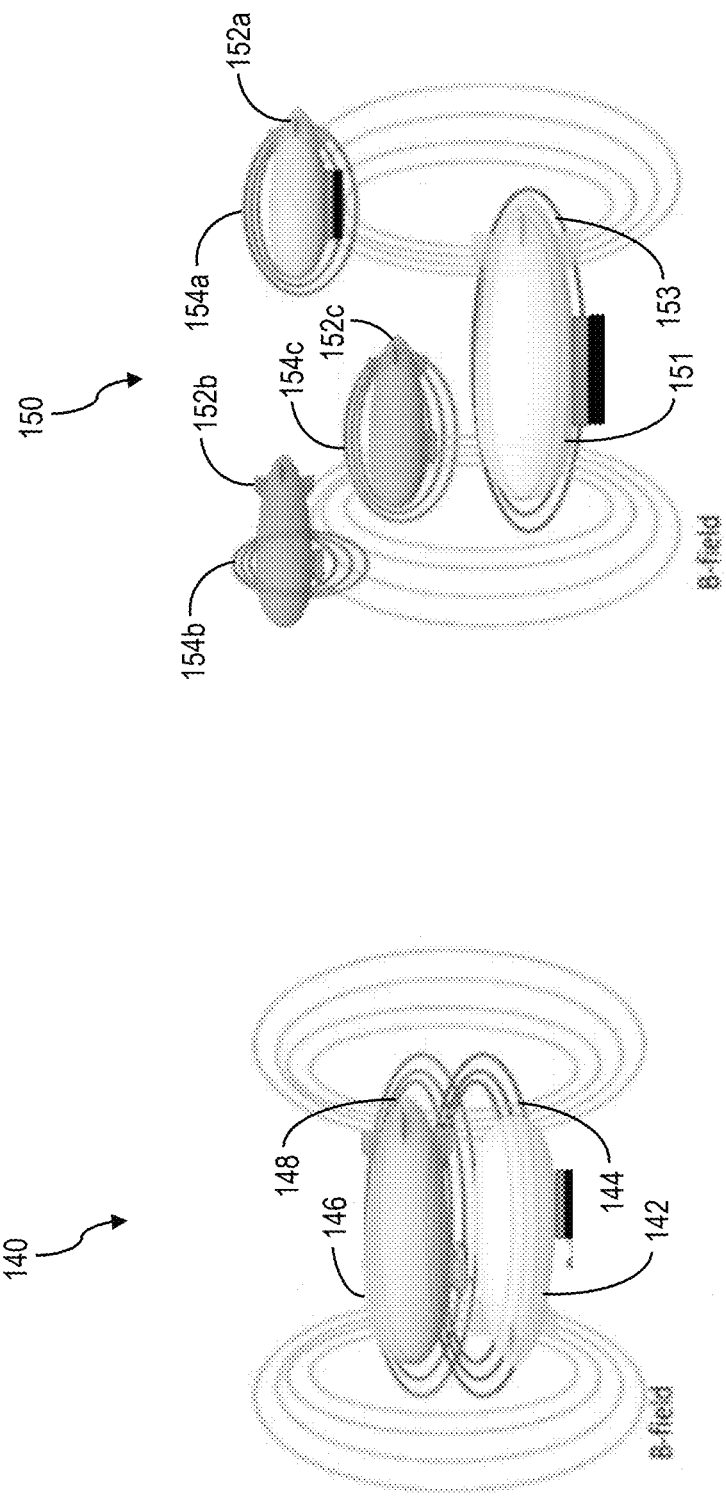
FIGS. 7-8 are diagrams of wireless power transfer systems for charging airborne fleets of UAVs, according to several embodiments.
Figure 8:
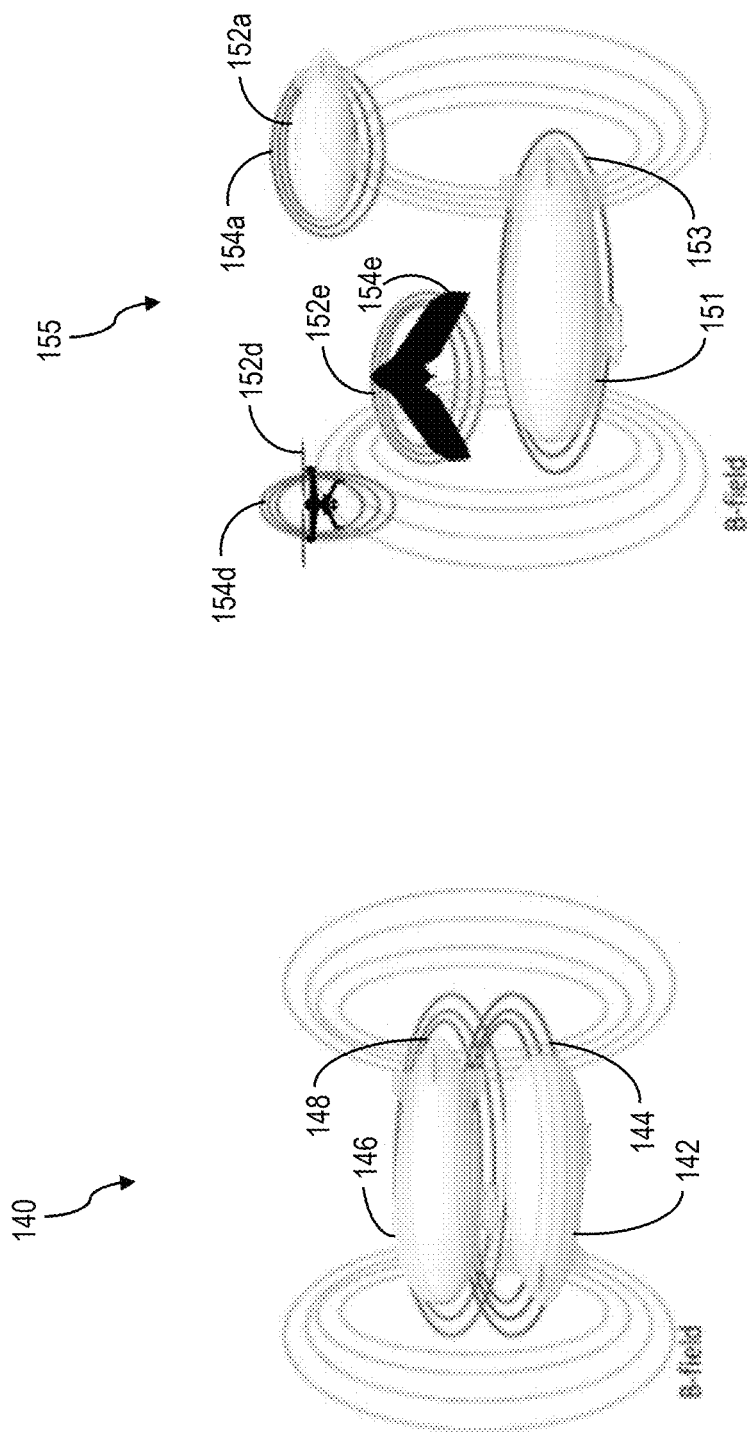

Referring to FIGS. 7-8, shown therein are diagrams of an inductive power transfer system 140 and a resonant power transfer system 150, 155 for wireless power transmission between aerial craft.

The inductive power transfer system 140 includes a transmitting aerial craft 142 having a primary (transmitter) coil and a receiving aerial craft 146 having a secondary (receiver) coil. It should be noted that the primary and secondary coils are located within the respective craft 142, 146 and are depicted as primary coil field 144, and secondary coil field 148 for ease of explanation. Current running passing through the primary coil generates a magnetic field B in the proximity of the primary coil field 144. If the receiving craft 144 is in proximity to the magnetic field such that a sufficient portion of the magnetic field intersects the secondary coil, a current will be generated in the secondary coil thus resulting in inductive power transfer between the transmitting craft 142 and the receiving craft 146.

The resonant power transfer systems 150, 155 includes a transmitting aerial craft 151 having a primary (transmitter) coil and one or more receiving aerial craft 152a, 152b, 152c, 152d, 152e each having a secondary (receiving) coil. It should be noted that the primary and secondary coils are located within the respective craft 151, 152a, 152b, 152c, 152d, 152e and are depicted as a primary coil field 153, and secondary coil fields 154a, 154b, 154c, 154d, 154e for ease of explanation. In the resonant power transfer systems 150, 155, the wireless transmission of power from the transmitting craft 151 to the receiving craft 152a, 152b, 152c, 152d, 152e depends only on the secondary coils 154a, 154b, 154c, 154d, 154e intersecting a reasonable amount of primary coil flux lines (i.e., intersection the magnetic field, B, generated by current passing through the primary coil 153).

A resonant power transfer system 155 may be preferable to the inductive power transfer system 140 depending on the size and number of the respective transmitting and receiving craft. For example, in the resonant power transfer system 155 more smaller sized craft may receive wireless power transmission simultaneously compared to the inductive power transfer system 140.

Figure 9:
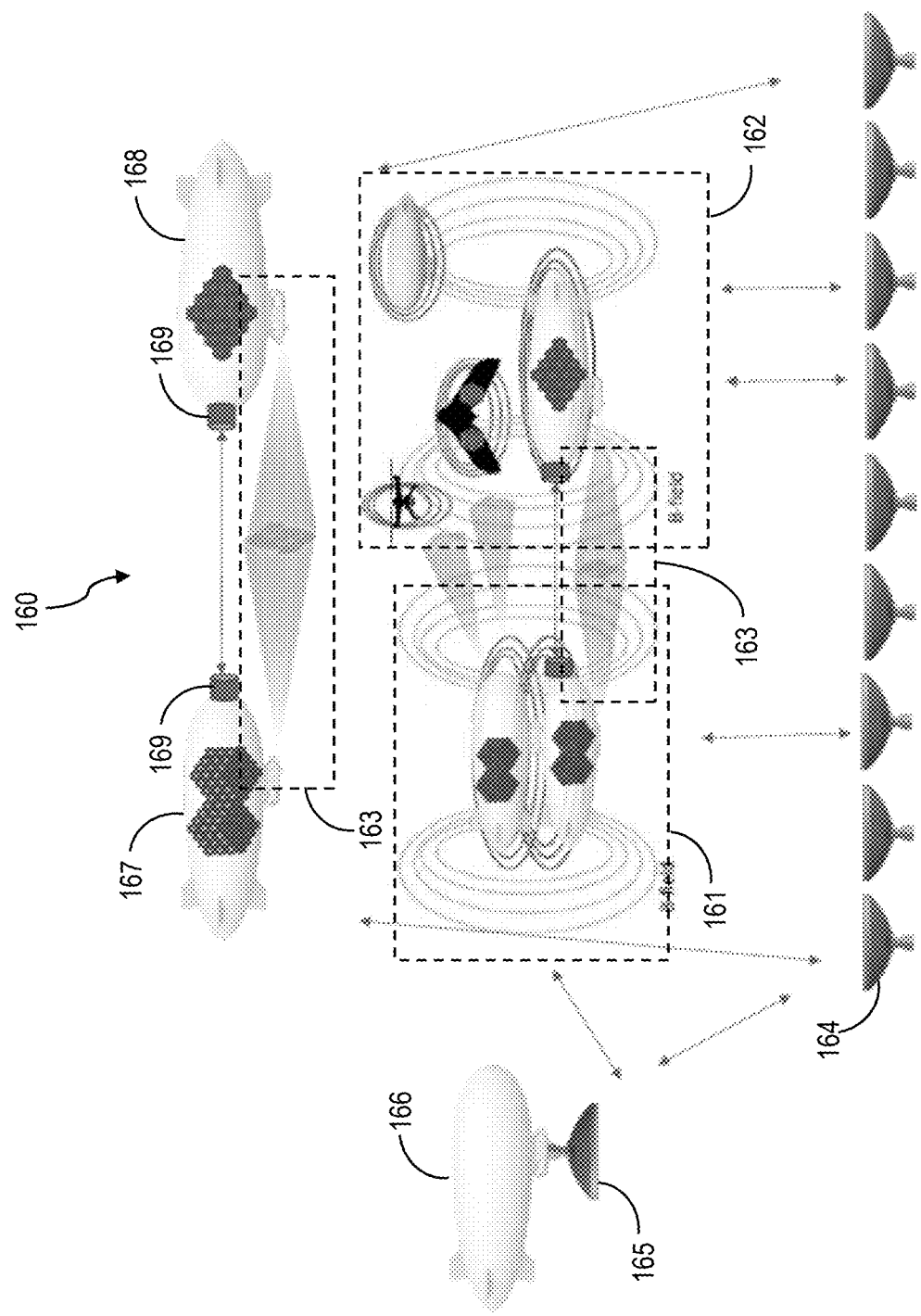
FIG. 9 is a diagram of a hybrid wireless power transmission system, according to an embodiment.

FIG. 9 is a diagram of a hybrid wireless power transmission system 160, according to an embodiment. The hybrid power transmission system 160 may include one or more of inductive power transfer systems 161 (i.e., inductive power transfer system 140 in FIGS. 7-8), resonant power transfer systems 162 (i.e.,) resonant power transfer systems 150, 155 in FIGS. 7-8) and beam riding highways 163 (i.e., beam riding highway 115a, 115b in FIGS. 2-4) between respective transmitting and receiving craft.

The hybrid wireless power transmission system 160 may further include a plurality of ground parabolic transmitters 164 to transmit EM radiation from the ground that is received by aerial craft 166 having rectennas to convert the EM radiation to current and wirelessly transmit the power to other aerial craft via one or more inductive power transfer systems 161, resonant power transfer systems 162 and/or beam riding highways 163.

In addition, the transmitting craft 167 and the receiving craft 168 may include lasers 169 to transfer excess or unused EM radiation received by the receiving craft 168 back to the transmitting craft 167 as laser radiation to conserve energy and propagate the beam riding highway 163 for use by other aerial craft. The craft 167, 168 may further include one or more transmitters and receivers (not shown) for transmitting control and data signals between the craft 167, 168.

Accordingly, the hybrid power transmission system 160 may be readily adapted, as needed, to power a variety of aerial craft having different wireless energy transfer capabilities and to also provide control and data signals to perform a variety of tasks.

Figure 10:
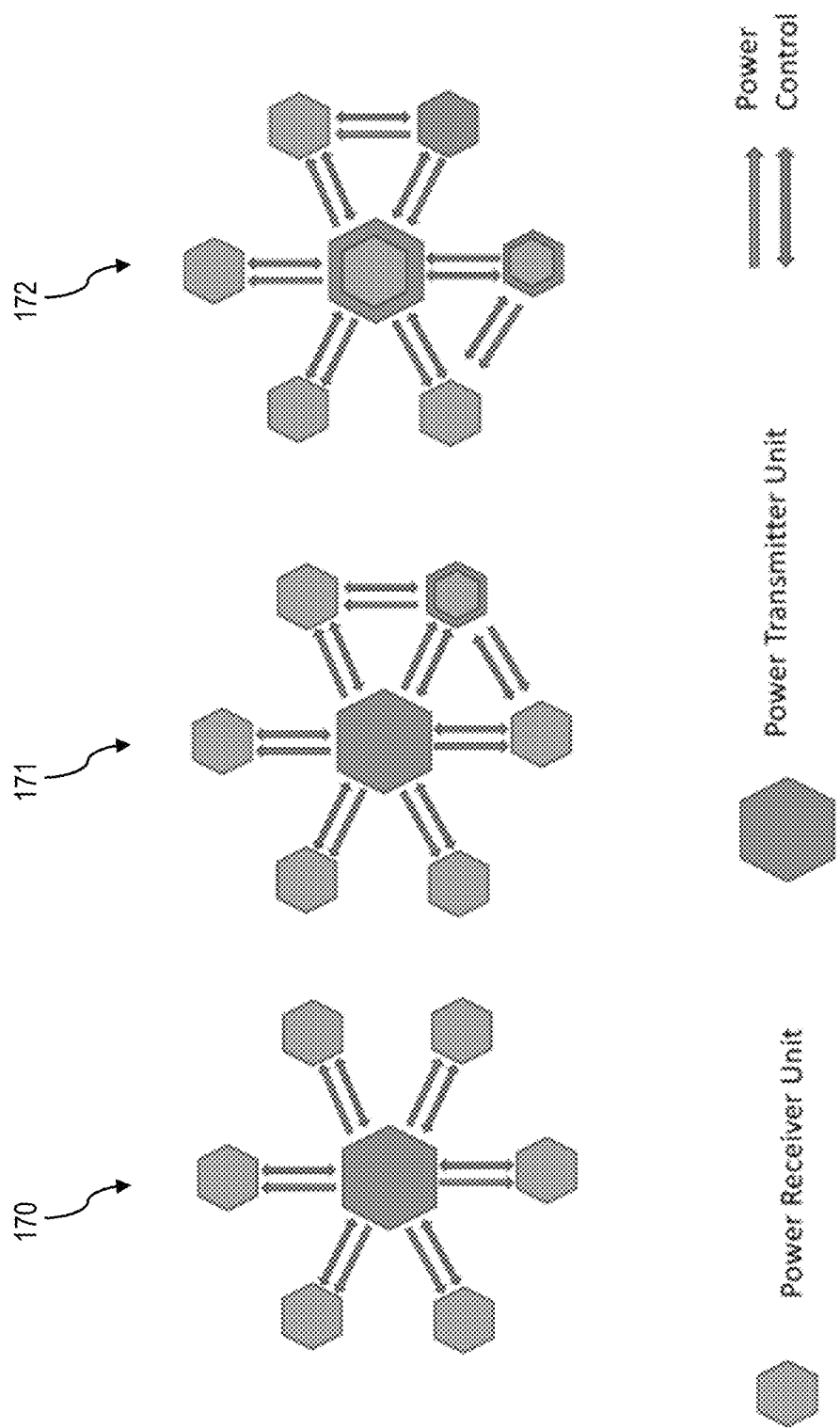
FIG. 10 are diagrams of system architectures for wireless power and data transmission, according to several embodiments.

FIG. 10 shows diagrams of system architectures 170, 171, 172 for wireless power and control data transmission, according to several embodiments. The control data may be: data signals to control operation or the aerial craft; data signals with respect to power usage/transmission; sensor data, advanced metering interfaces, wayfind, and/or in-situ monitoring data etc. Each of the power receiver and power transmitter units depicted in the architectures 170, 171, 172 may be located on an aerial craft that is part of a larger deployment or swarm of aerial craft.

A central system architecture 170 includes a central transmitter unit surrounded by receiver units. Power is wirelessly transmitted one-way from the central transmitter unit to each of the receiver units. Control (data) signals may be wirelessly transmitted two-way between the central unit and any of the receiver units.

A distributed system architecture 171 includes a central power transmitter unit, a power transmitter/receiver unit and several receiver units surrounding the central transmitter unit. The central transmitter unit transmits power to each of the surround receiver units including the transmitter/receiver unit. The transmitter/receiver unit may also transmit power to adjacent receiver units. Control (data) signals may be wirelessly transmitted two-way between the central transmitter unit and any of the receiver units as well as between the transmitter/receiver unit and adjacent receiver units.

A hybrid system architecture 172 includes a central power transmitter/receiver unit surrounded by several receiver units, a power transmitter unit and a second power transmitter/receiver unit. The central transmitter/receiver unit may transmit power to any of the surrounding receiving units. The power transmitter unit may transfer power only to the adjacent receiving unit and central transmitter/receiver unit. Similarly, the second power transmitter/receiver unit may only transmit power to the adjacent receiving unit and the central transmitter/receiver unit. Control signals may be wirelessly transmitted two-way between the central transmitter/receiver unit and any of the surrounding receiver units, the power transmitter unit and the second transmitter/receiver unit, as well as between the transmitter/receiver unit and adjacent receiver units.

Figure 11:
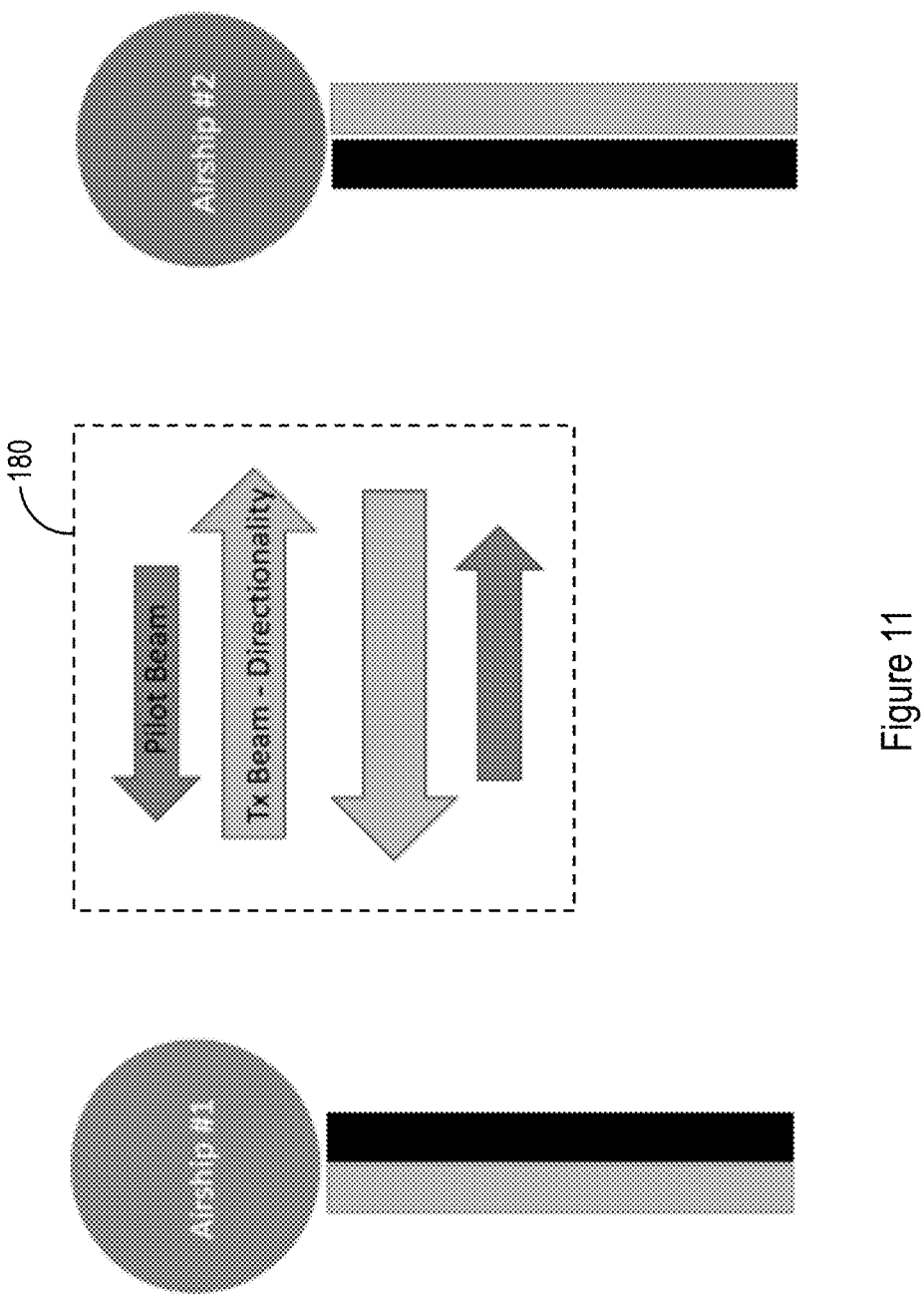
FIG. 11 is a diagram of recording wireless power and data transfer in a blockchain, according to an embodiment.

FIG. 11 is a diagram recording wireless power and data transfer in a blockchain 180, according to an embodiment. Each wireless power transmission (light shaded arrows) and control (data) signals (dark shaded arrows) transmitted and received between two aerial craft may be recorded as a transaction between the transmitting and receiving craft using blockchain technology between mobile nodes.

Figure 14:
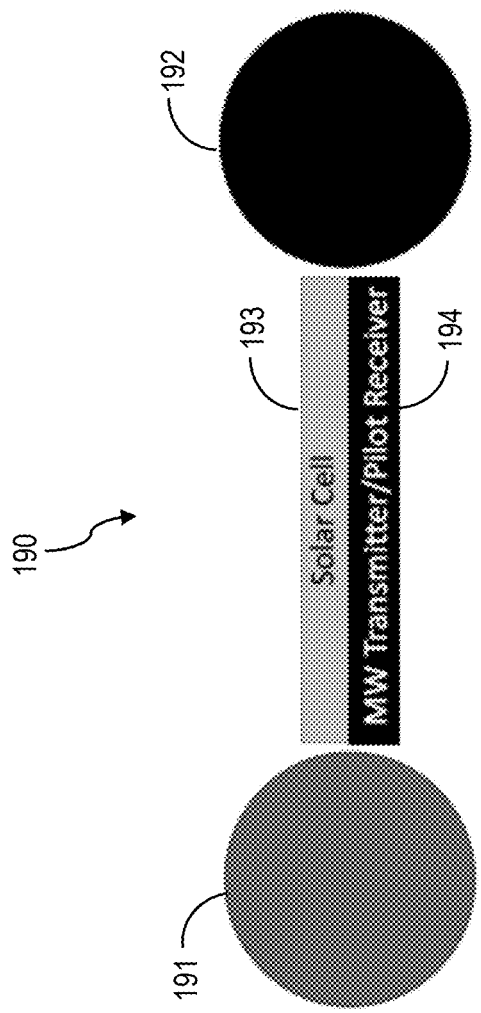
FIGS. 14-15 are diagrams of multi-layer sandwich rectenna structures for point-to-point wireless power and data transmission, according to several embodiments.

FIG. 14 is a diagram of a joined system of a multi-layer sandwich rectenna structure 190 for point-to-point wireless power and data transmission, according to an embodiment. The sandwich rectenna structure 190 includes a solar cell layer 193 attached to a microwave transmitter/pilot signal receiver layer 194. The sandwich rectenna structure 190 joins two aerial craft 191, 192 in a "dumbbell" configuration. Such a dumbbell configuration may be advantageous to connect multiple sandwich rectenna structures 190 together to contain and direct a swarm of aerial craft to change direction, as described below.

Figure 15:
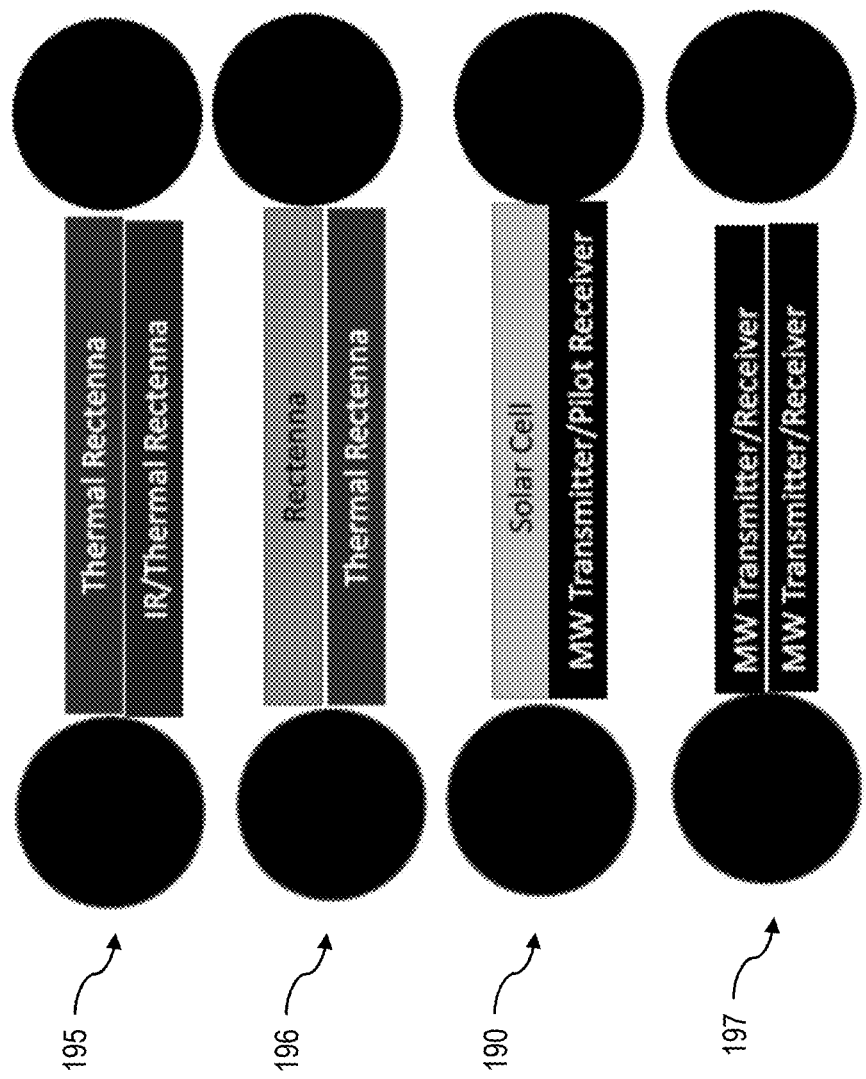

FIG. 15 are diagrams of multi-layer sandwich rectenna structures 190, 195, 196, 197 according to several embodiments. The sandwich rectenna structure 195 includes a thermal rectenna layer connected to an infrared thermal rectenna layer. The sandwich rectenna structure 196 includes a rectenna layer attached to a thermal rectenna layer. The sandwich rectenna structure 197 includes two microwave transmitter/receiver layers attached together. The sandwich rectenna structure 195, 196, 197, 198 may be metamaterials that are actively tuned for point-to-point wireless power and data transmission.

Figure 12:
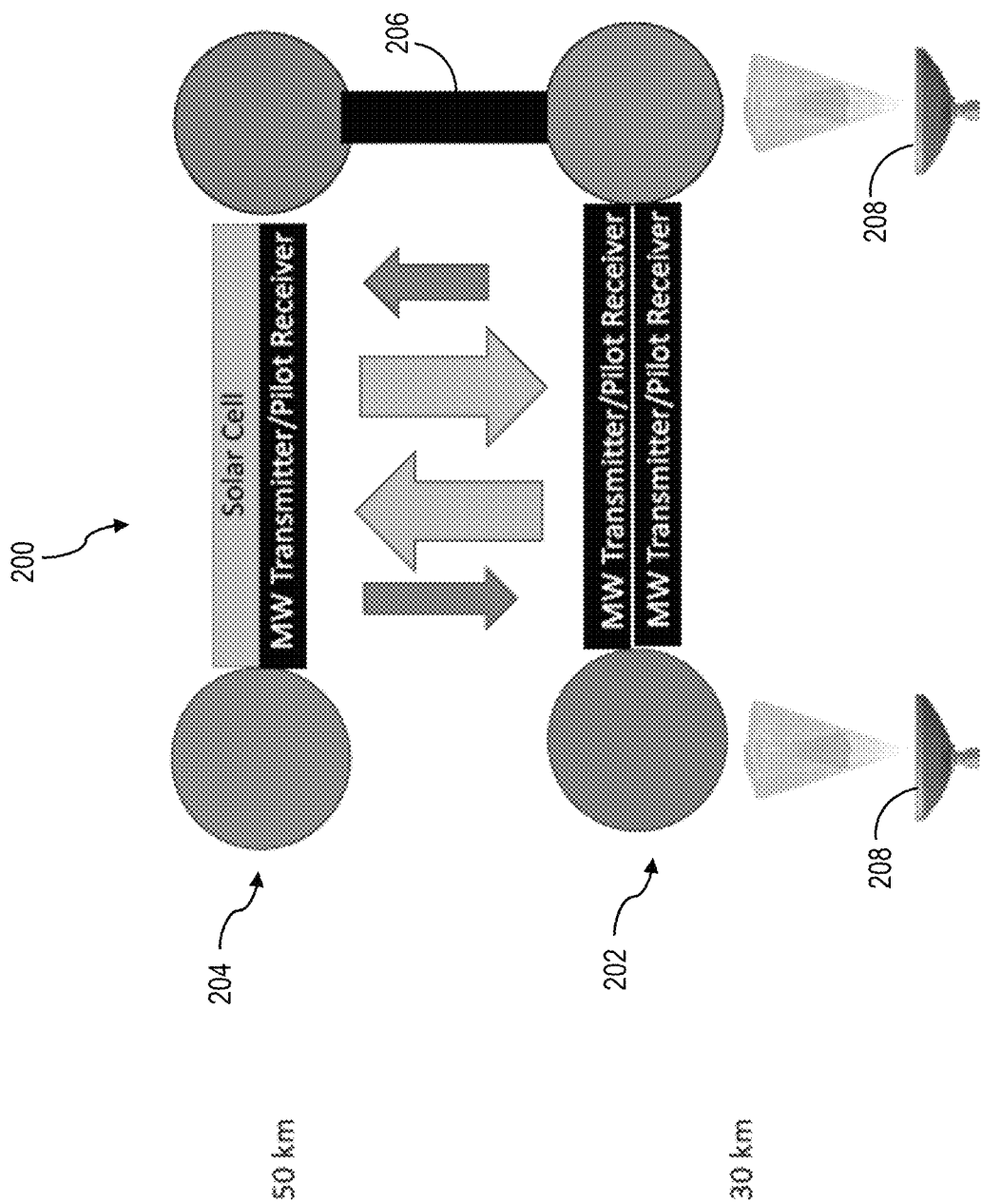
FIGS. 12-13 are diagrams of a microwave elevator system, according to an embodiment.
Figure 13:
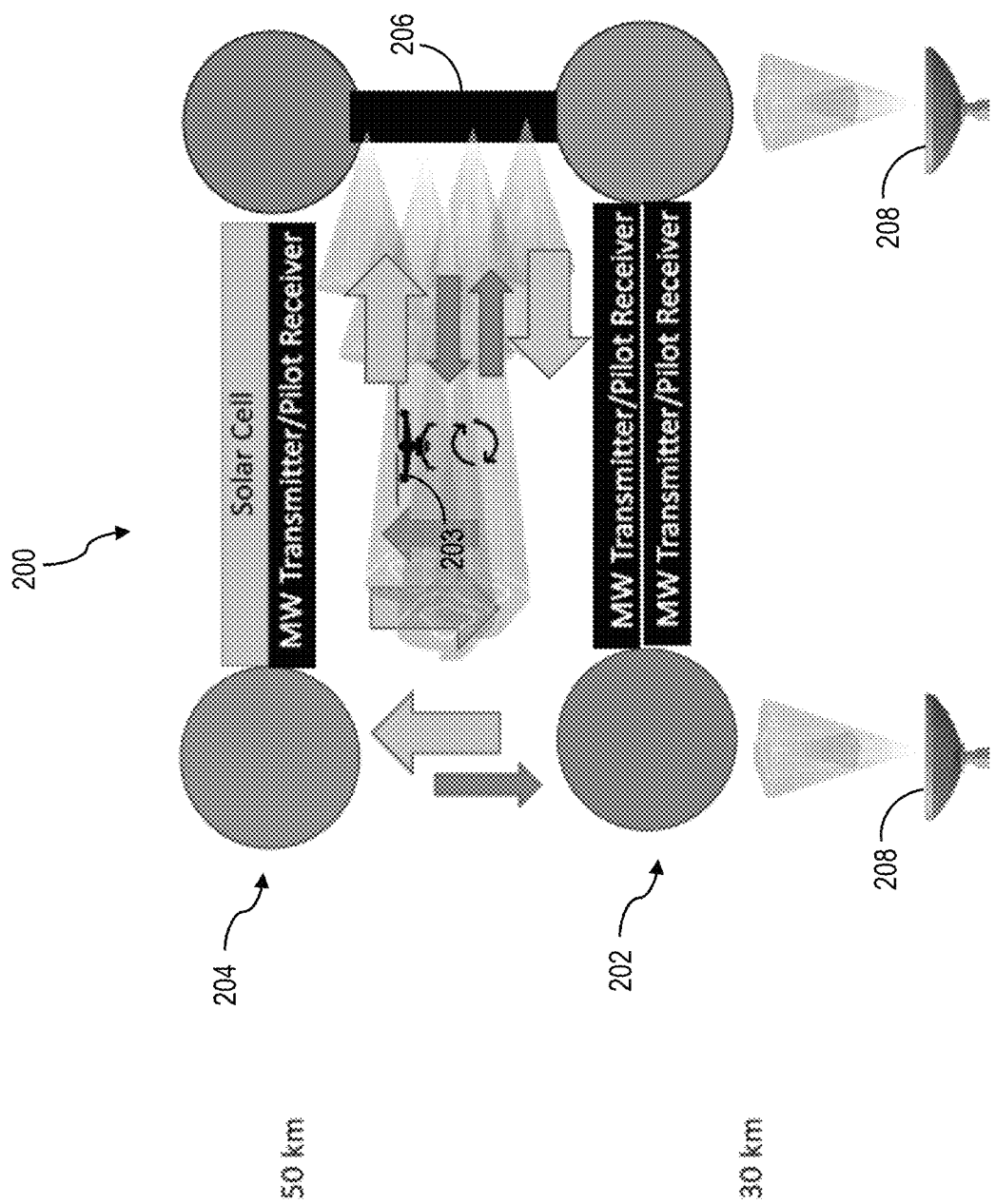

FIGS. 12-13 are diagrams of a microwave elevator system 200 for orbital raising/descending and horizontal/vertical travel, according to an embodiment. It should be noted that the diagrams are not drawn to scale. The elevator system 200 includes a first multilayer rectenna structure 202 joining a first pair of aerial craft in a dumbbell configuration at approximately 30 km altitude above the earth. The first multilayer rectenna structure 202 includes a microwave transmitter/pilot signal receiver layer. The elevator system 200 includes a second multilayer rectenna structure 204 joining a second pair of aerial craft in a dumbbell configuration at approximately 50 km altitude above the earth. The second multilayer rectenna structure 204 includes a solar cell layer attached to a microwave transmitter/pilot signal receiver layer. The elevator system 200 may include a tether 206 for physically connecting the first multilayer rectenna structure 202 to the second multilayer rectenna structure 204.

The system 200 includes ground parabolic microwave transmitters 208 for transmitting microwave radiation upward to the first rectenna structure 202. The radiation received by the first rectenna structure 202 may be retransmitted and received by the second multilayer rectenna structure 204, thus forming a beam riding highway between the first and second multilayer rectenna structures 202, 204.

Similarly, solar radiation absorbed by the second multilayer rectenna structure 204 may be transmitted downward as microwave radiation that is received by the first rectenna structure 202 thus forming a beam riding highway between the first and second multilayer rectenna structures 202, 204. Aerial craft 203 having rectennas may enter the beam riding highway for vertical (up/down) travel between the first and second multilayer rectenna structures 202, 204.

The tether 206 may further include a microwave transmitter array to project a horizontal beam riding highway which aerial craft 203 may enter for horizontal travel between the first and second multilayer rectenna structures 202, 204.

Figure 16:
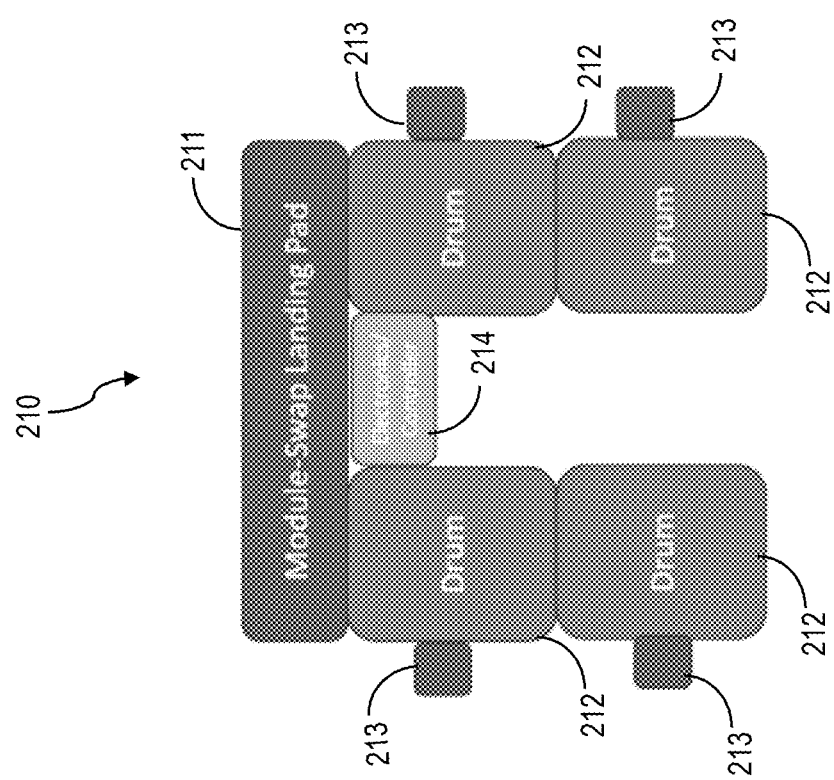
FIG. 16 is a diagram of module swapping system for aerial craft, according to an embodiment.

FIG. 16 is diagram of module swapping system 210 for aerial craft, according to an embodiment. The module swapping system 210 may be used to swap modules between aerial craft. The module may be a fuel source (e.g., a battery, capacitors, super capacitors, inductors, super inductors, incendiary fuel, reactive metal compounds, or the like). The module may also be structures of rectennas, coils, capacitors or solar cells to receive EM radiation. The module may be electronics, on-board computers, sensors or data storage devices or other parts for repair and/or maintenance, reconfiguration and/or component upgrade.

The module swapping system 210 may be positioned within a "mothership" or large aerial craft configured to service smaller aerial craft. The module swapping system 210 includes a landing pad 211 for receiving aerial craft for module swapping. The landing pad 211 may be present in a hanger, or the like, on the mothership. The landing pad 211 may be located on an external surface of the mothership.

The module swapping system 210 includes one or more drums 212 for storing modules. Generally, one module is stored within one drum 212. The drums 212 may be stored in a storage configuration adjacent to the landing pad 211 such that when a drum 212 is to be swapped, it is rotated from the storage position onto the landing pad 211 for swapping. The module swapping system 210 includes servos 213 connected to each drum 212 for rotating the drums 212 from the storage configuration to a swapping position on the landing pad 211. The servos 213 may also swap the module within the drum 212 for the module on the aerial craft on the landing pad 211. The module swapping system 210 further includes a controller 214 for controlling the servos 213 and swapping of modules. The controller 214 may operate to swap modules according to a schedule with autonomous and semi-autonomous operations.

Figure 17:
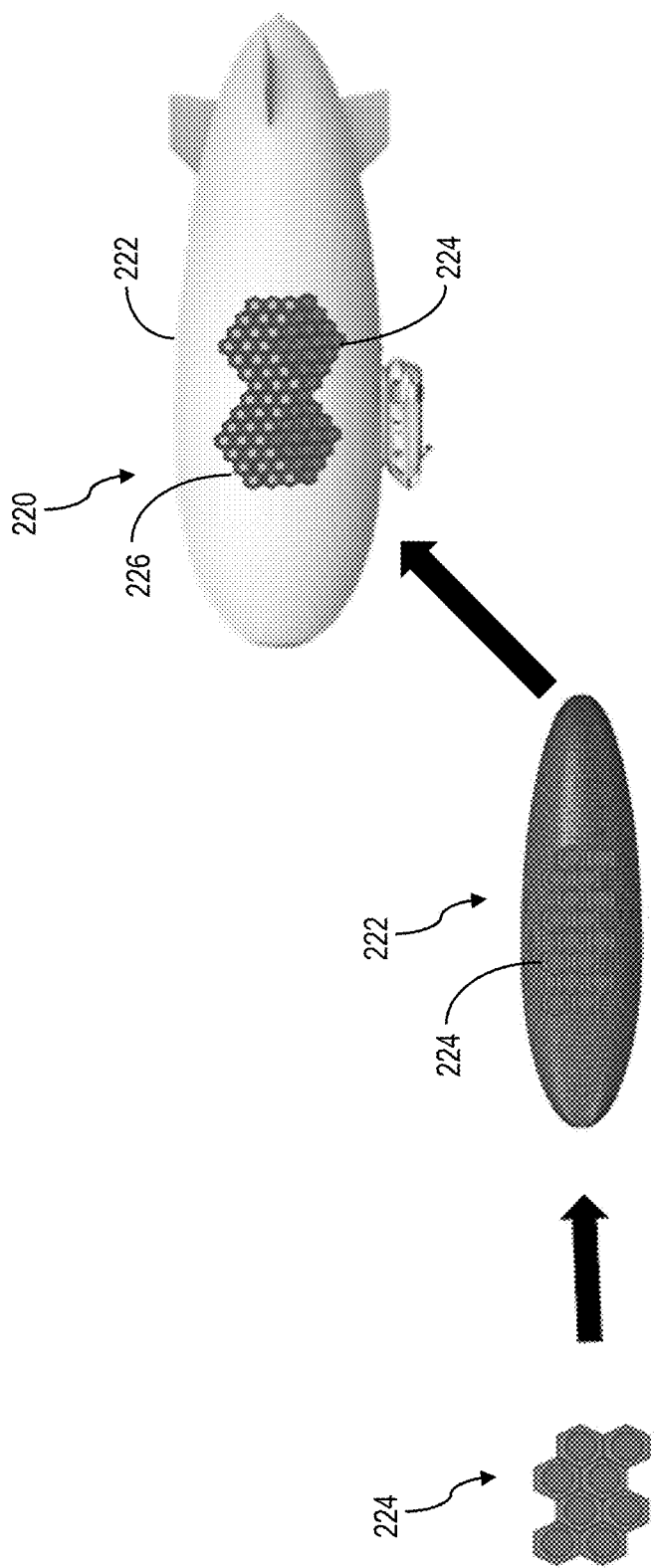
FIG. 17 is a diagram of a microwave powered high altitude platform, according to an embodiment.

FIG. 17 is a diagram of a microwave powered high altitude platform 200, according to an embodiment. The platform 200 may be a hybrid airship (as shown), a hot air balloon (FIG. 18), or the like. The platform 200 includes an inflatable exterior surface envelope 222. The surface envelope 222 is covered with arrays of rectennas 244 and/or solar cells 226. The arrays of rectennas 224 and/or solar cells 226 can be additively manufactured on the envelope 222, combined and joined and/or attached to the platform 200 while airborne. The platform 200 interior is filled with a gas (hot air, helium, hydrogen and/or the like) to provide lift.

Figure 18:
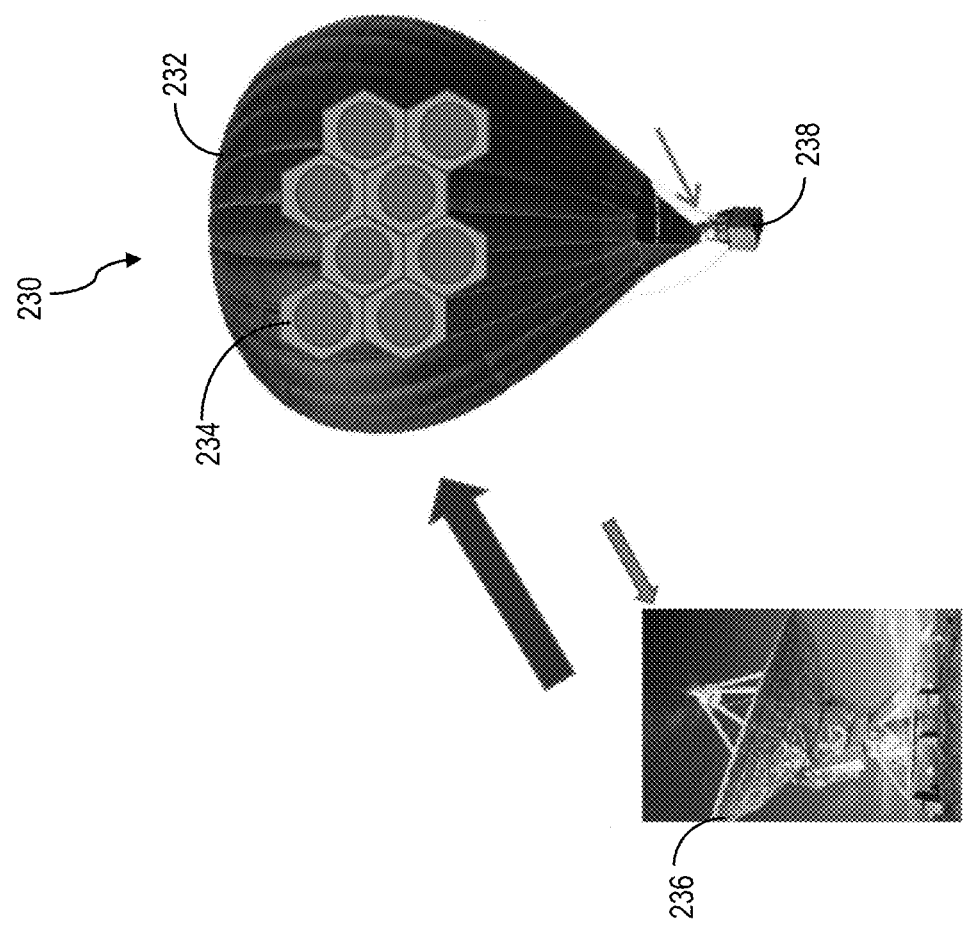
FIG. 18 is a diagram of a microwave powered electric hybrid balloon, according to am embodiment.

FIG. 18 is a microwave powered electric hybrid balloon 230, according to an embodiment. An envelope 232 of the balloon 230 is covered with rectennas 234. A microwave beam may be transmitted from a ground parabolic transmitter 236 and received by the rectennas 234 to recharge and power on-board systems. Traditional burners used for power and lift, may be replaced with electric hot air fans. Thermal energy generated from the electrical power system can be used to heat the inside of the envelope 232. A plurality of propulsion systems (not shown) may be mounted for controlling the ascent/descent of the balloon 230. A payload 238 may be carried by the balloon 230.

Figure 19:
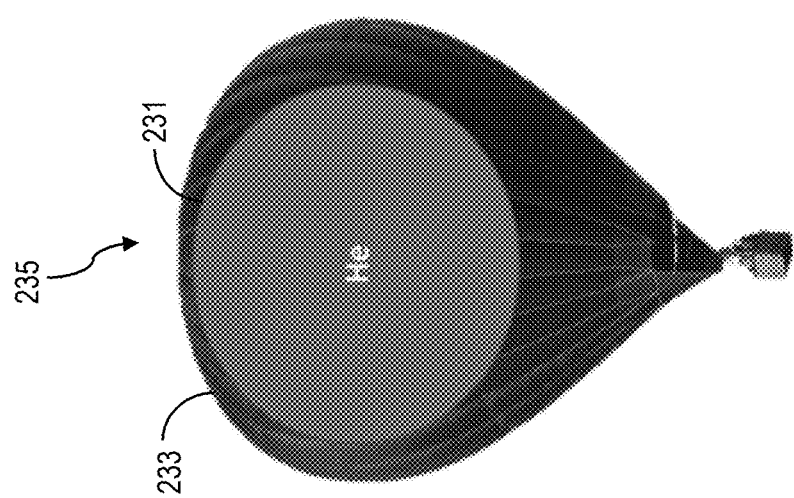
FIGS. 19-20 are diagrams of a microwave powered hybrid balloon, according to an embodiment.
Figure 20:
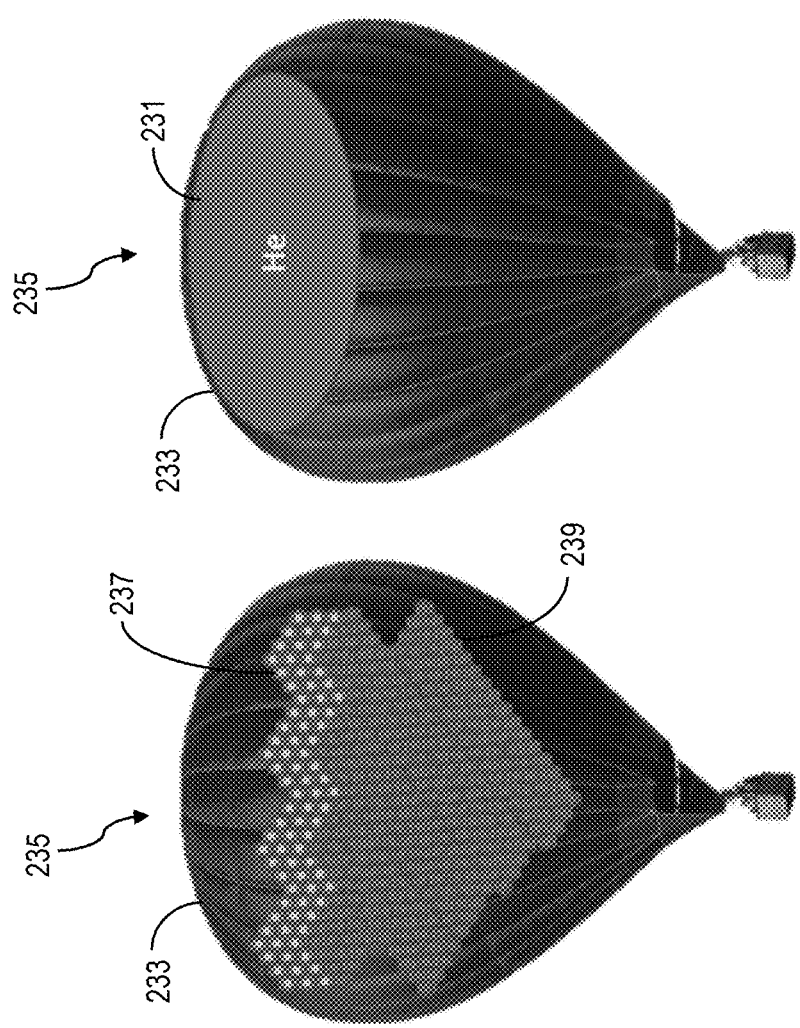

FIGS. 19-20 show a hybrid hot air/helium balloon 235, according to an embodiment. The hybrid balloon 235 includes an inner gas bag 231 filled with helium or other lighter-than-air gasses to provide lift. The hybrid balloon 235 includes an envelope 233. The exterior of the envelope 233 is covered with microwave rectennas 239, while the interior of the envelope 233 is covered with thermal rectennas 237 for capturing solar thermal and/or thermophotovoltaic energy. Air within the envelope 233 and helium within the gas bag 231 may be heated using conventional burners and fuel or solar energy and waste heat to increase buoyancy. The hybrid balloon 235 and the rectennas 237, 239 thereon may be additively manufactured, inflatable and deployable (see FIG. 17).

FIG. 21 is a diagram of stratospheric receiving stations 240 in a formation 241, according to an embodiment. The receiving stations 240 may be airships, balloons or the like, covered in rectennas 242. Each receiving station 240 may be 20-30 meters in length thus providing, a larger combined surface area of rectennas 242 when flying in formation 241. The formation 241 of receiving stations 240 may receive and transmit microwave radiation from the ground. Such a system is advantageous to collect and provide power in the stratosphere where conventional aircraft (i.e., planes, helicopters, drones) cannot operate for lack of atmosphere. The formation 241 of receiving stations 240 may be altered by docking/undocking receiving stations by use of telescopic arms, booms, deployable and inflatable venetian blinds and/or wings for command and control.

Figure 22:
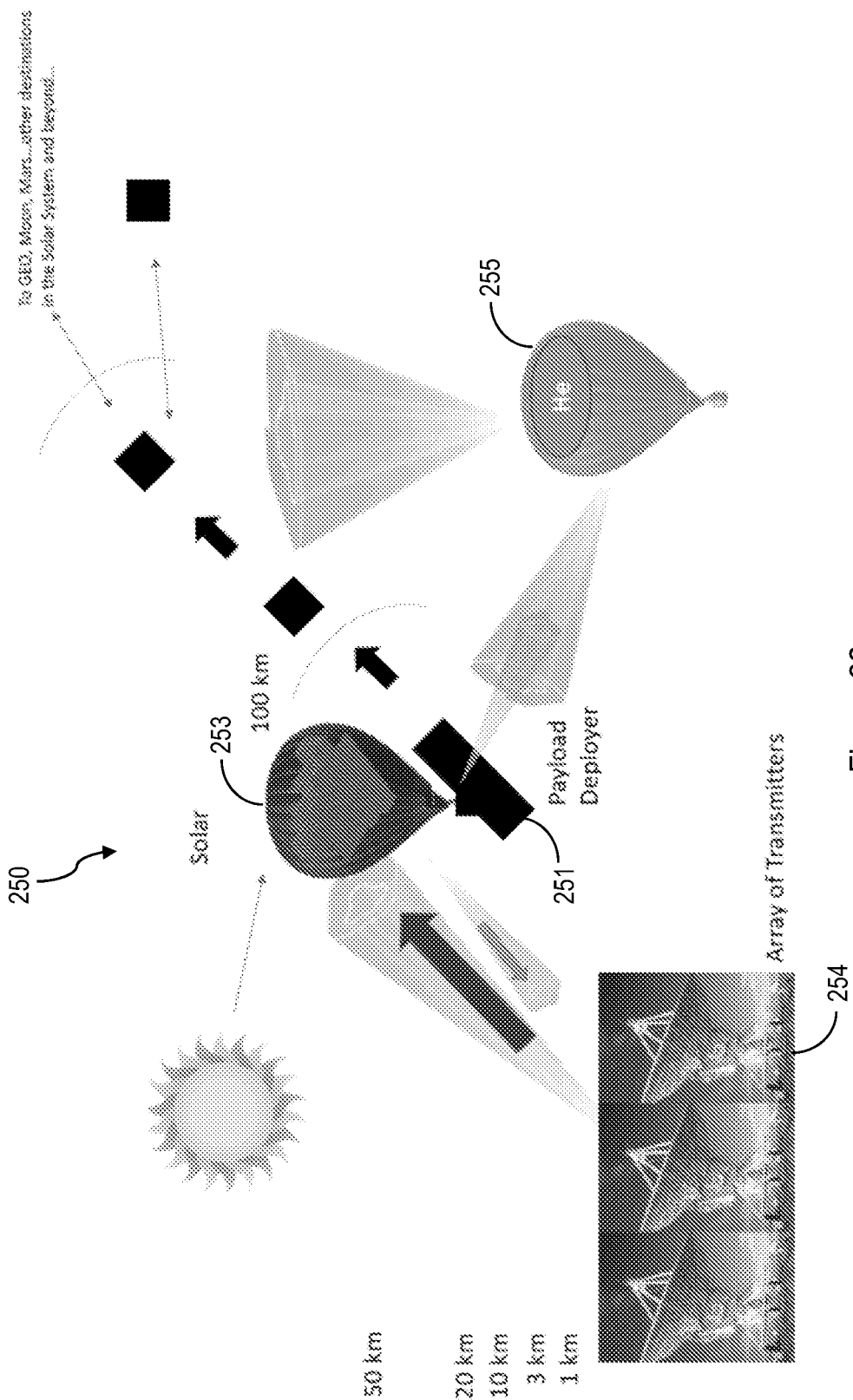
FIGS. 22-23 are diagram of a balloon launching system, according to an embodiment.
Figure 23:
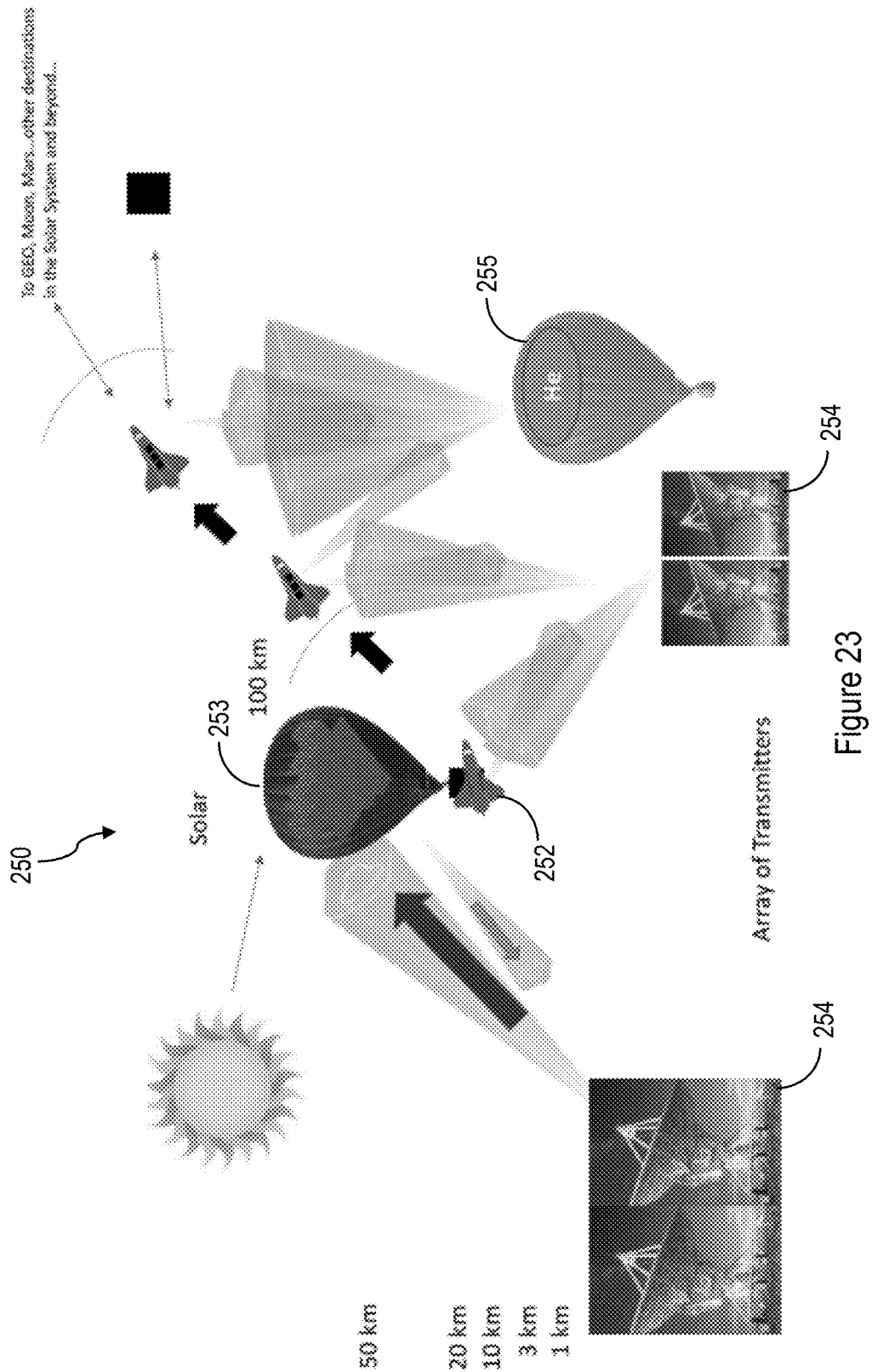

FIGS. 22-23 shown are diagrams of a balloon launching system 250, according to an embodiment. The balloon launching systems may be used to transport a payload 251 from the ground to orbit (FIG. 22) or launch a space craft 252 into orbit (FIG. 23). The system 250 includes an array of ground transmitters 254 for beaming up radiation. The system 250 includes a launch balloon 253 for carrying the payload 251 or spacecraft 252. The launch balloon 253 is covered in rectennas to receive the radiation beamed up from the ground transmitters 254 and/or solar radiation to provide the launch balloon 253 with energy for propulsion and lift to carry the payload 251/spacecraft 252. The launch balloon 253 may transport the payload 251/spacecraft 252 up to an altitude of approximately 50 km above the earth. The system 250 includes a secondary airship 255. The secondary airship 255 may track flight path of the launch balloon 253, deployment of payloads 251 and/or interface with satellites in orbit.

Referring to FIG. 23, the spacecraft 252 may include a heat exchange (i.e., thermal rectennas) that can use directed power/radiation of propulsion once separated from the launch balloon 253.

Figure 24:
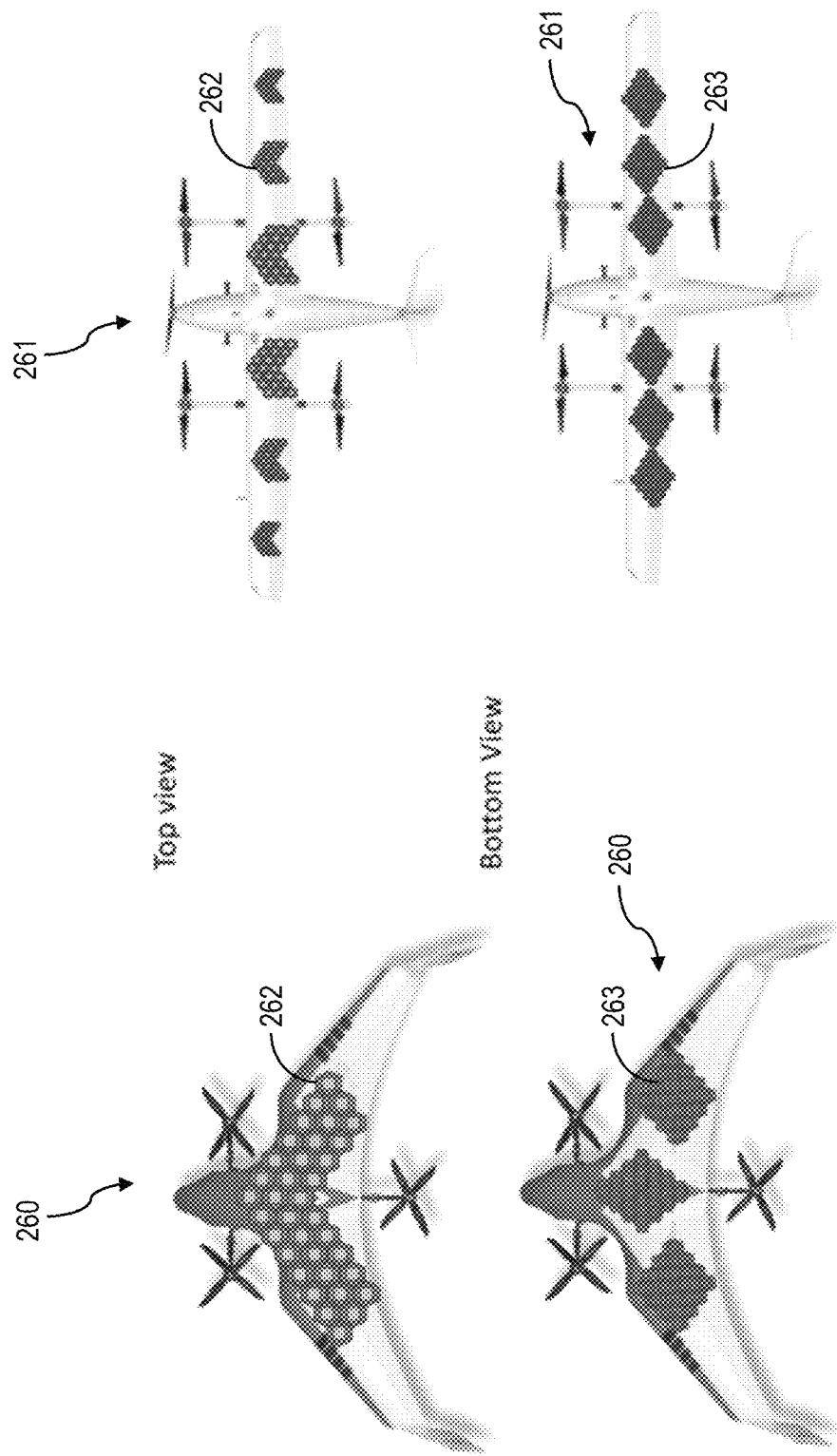
FIG. 24 is a top and bottom view of a microwave powered beam riding drone, according to an embodiment.

FIG. 24 shows top and bottom views of a microwave powered beam riding drones 260, 261, according to several embodiments. The drones 260, 261 may be rotary-wing, fixed wing, or a hybrid rotary and fixed wing configuration. A top surface of the drones 260, 261 includes solar cells 262 or thermal rectennas for receiving solar radiation to provide power to the drones 260, 261. A bottom surface of the drones 260, 261 includes rectennas 263 to receive radiation beamed up from the ground to provide power to the drones 260, 261.

Figure 25:
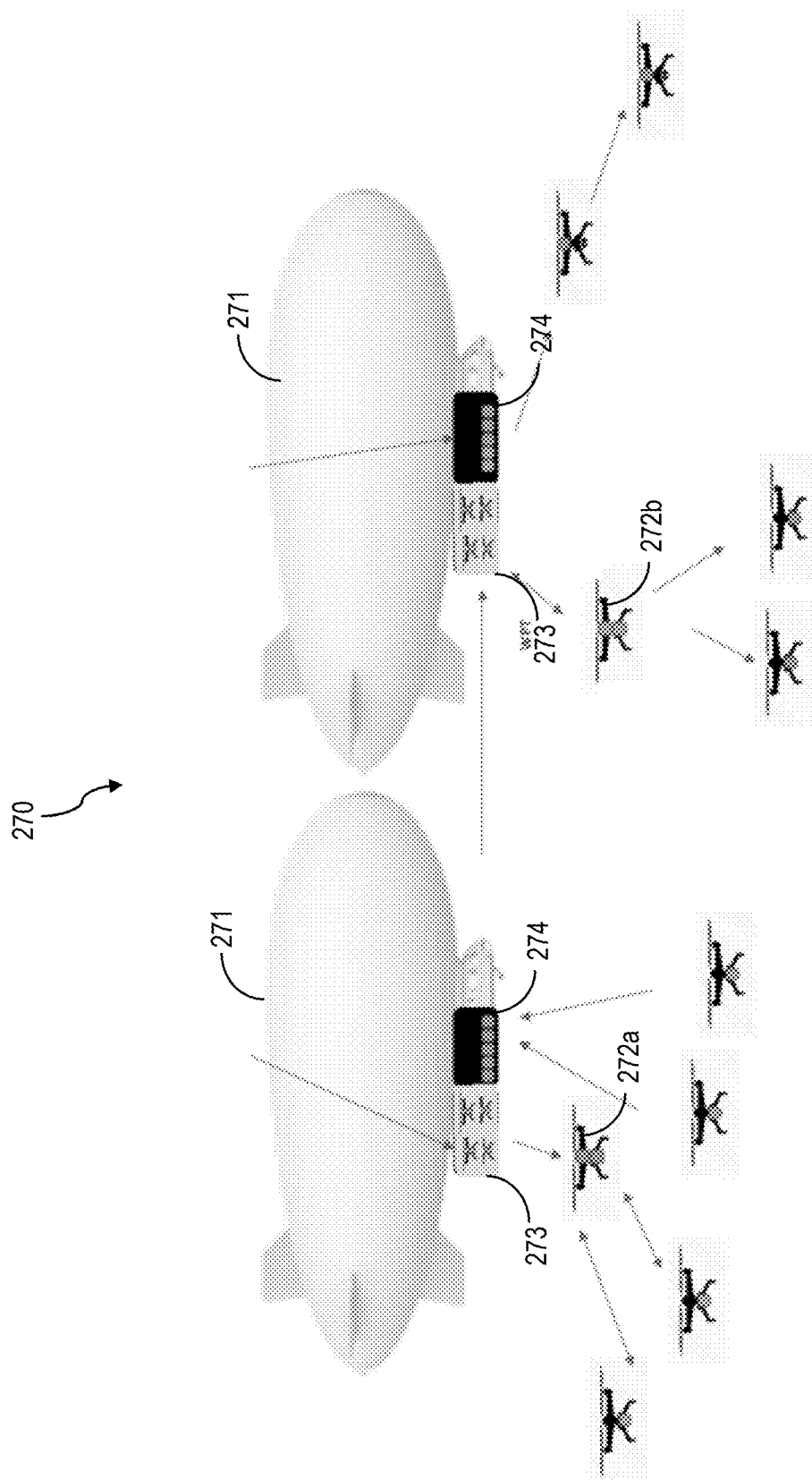
FIG. 25 is a diagram of an in-flight charging system for drones, according to an embodiment.

FIG. 25 is a diagram of an in-flight charging system 270 for drones, according to an embodiment. The system 270 includes motherships 271 (i.e., airships) to transport, deploy and recharge drones 272. The mothership 271 includes a drone deployer 273 to store and deploy fully charged drones 272a. The mothership 271 includes a battery swapping system 274 for recharging battery depleted (uncharged) drones 272b. Uncharged drones 272b may dock with the mothership 271 to have their battery replaced by the battery swapping system 274. Uncharged drones 272b may also dock with the mothership 271 to have their battery recharged. The mothership 271 may also include components (inductions coils, etc.) for wireless power transfer between the mothership 271 and uncharged drones 272b so that drones may recharge in-flight when in close enough proximity to the mothership 271.

Figure 26:
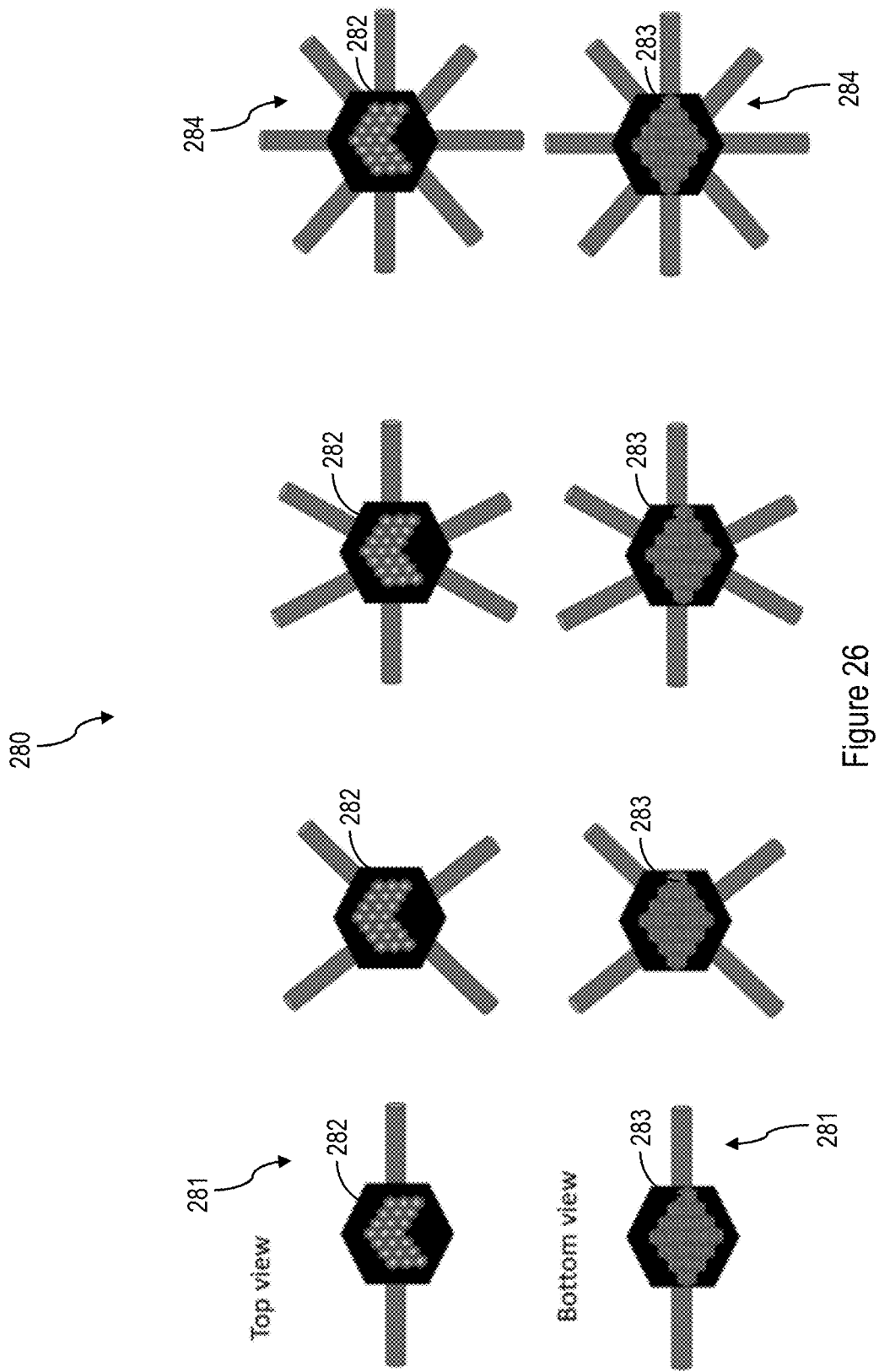
FIG. 26 are top and bottom views of inflatable drone systems, according to several embodiments.

FIG. 26 shows top and bottom views of an inflatable drone system 280 according to several embodiments. The drone system 280 may be rotary-wing, fixed wing, or a hybrid rotary and fixed wing configuration. A top surface of the drone 280 includes solar cells 282 or thermal rectennas for receiving solar radiation to provide power to the drone 280. A bottom surface of the drone 280 includes rectennas 283 to receive radiation beamed up from the ground to provide power to the drone 280. The drone system 280 is inflatable and deployable from a compact configuration 281 to a fully deployed configuration 284.

Figure 27:
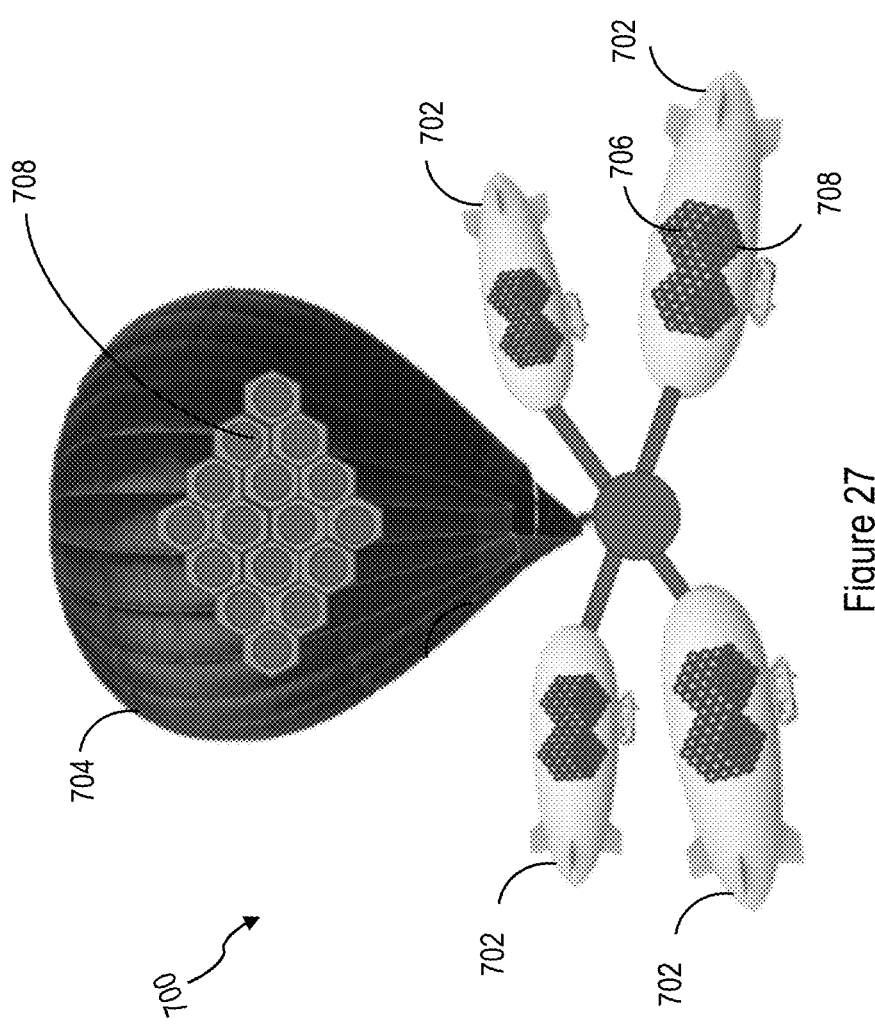
FIG. 27 is a diagram of deployment of a fleet of aerial receiving stations, according to an embodiment.

FIG. 27 is a diagram of deployment of a fleet 700 of aerial receiving stations 702. according to an embodiment. The fleet 700 as pictured comprises four aerial receiving stations 702. Aerial receiving stations are coupled to a launch vehicle 704. In the embodiment of FIG. 27, each aerial receiving station comprises an airship, comprising an array of solar cells 706, and rectennas 708. In other examples, each aerial receiving station may comprise a hybrid balloon, drone, spacecraft, or the like. In other embodiments, each aerial vehicle may comprise components other than solar cells 706 and rectennas 708, for example, microwave transmitters/receivers. In other embodiments, launch vehicle 704 may be coupled to more or less than four aerial receiving stations. Launch vehicle 704 comprises a hybrid balloon, comprising an array of rectennas 708. When launching aerial receiving stations 702, each aerial receiving station may be in a deflated configuration. Launch vehicle 704 may launch from ground level, until a target altitude is reached. Once the target altitude is reached, each aerial receiving station 702 may be inflated, then deployed at the target altitude, by decoupling each aerial receiving station 702 from the launch vehicle 704.

Figure 28:
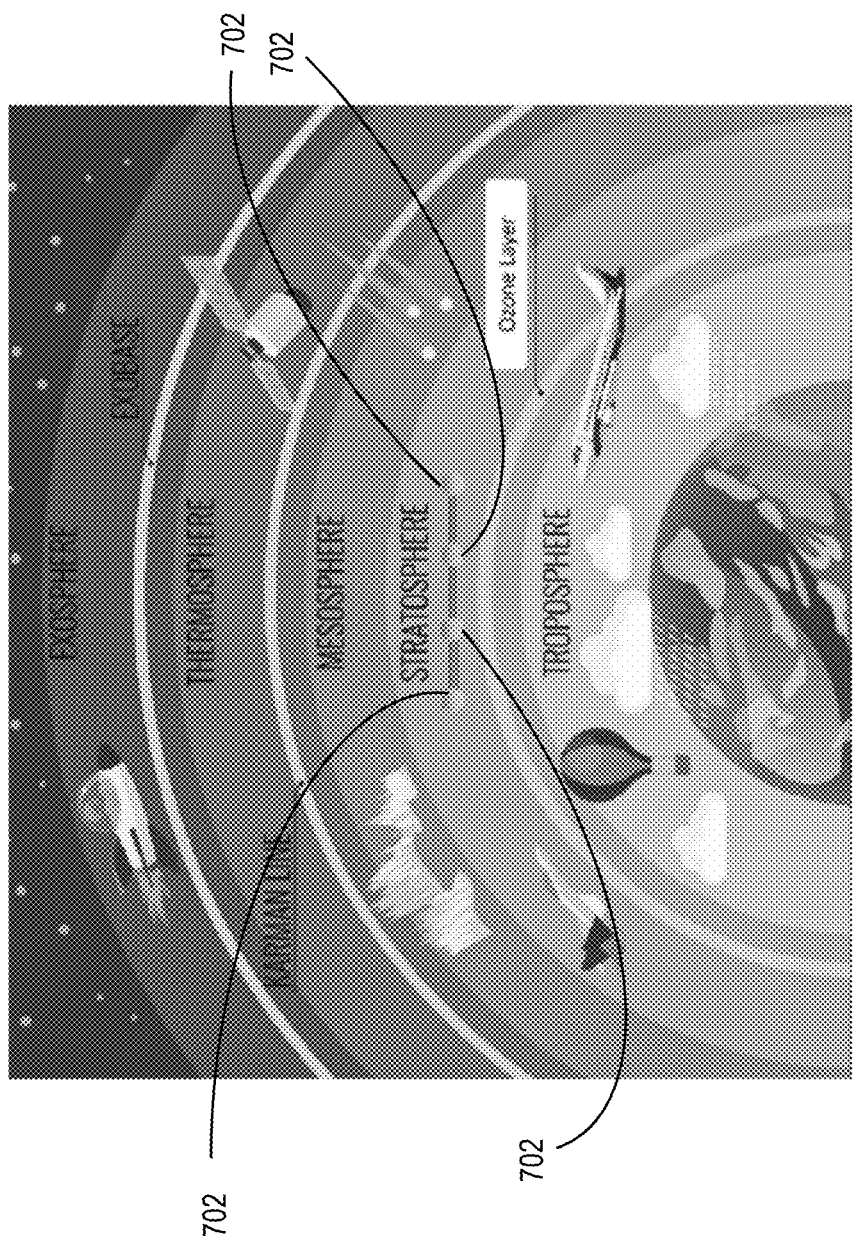
FIG. 28 is a diagram showing the deployment of a system for wireless point-to-point power and data transmission in the earth's atmosphere, according to an embodiment.

FIG. 28 is a diagram showing the deployment of a system for wireless point-to-point power and data transmission in the earth's atmosphere, according to an embodiment. The wireless point-to-point power and data transmission of FIG. 28 comprises four aerial receiving stations 702. Each aerial receiving station 702 is at an elevation such that each station is within the stratosphere. In other embodiments, the elevation of each aerial receiving station 702 may be at an altitude higher or lower than the stratosphere.

Figure 29:
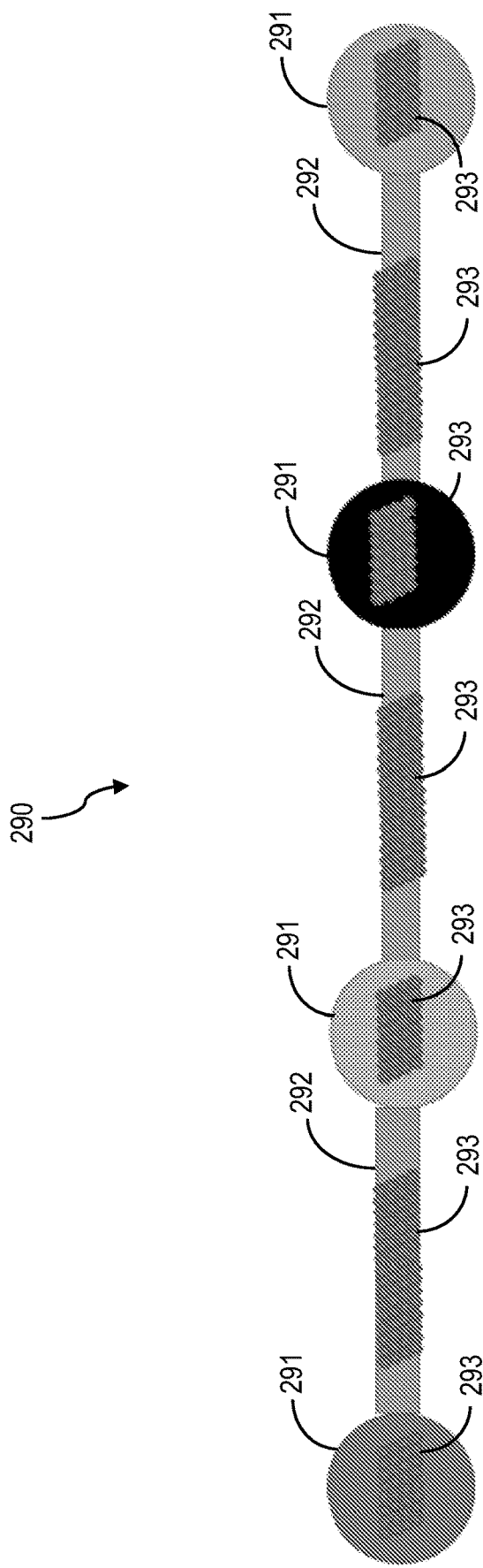
FIG. 29 is a diagram of a system of mobile receivers, according to an embodiment.

FIG. 29 is a diagram of a system of mobile receivers 290, according to an embodiment. The system 290 includes two or more airships 291 joined by sheets 292 of rectennas 293. The sheets 292 have a gossamer "fishing net" structure to be resilient and low weight. The airships 291 further include rectennas 293 on their surface. The system 290 may be transported (by moving the airships 291) to a desired location where beamed radiation may be received by the rectennas 293 and converted to electricity. For deployment the airships 291 may be elevated to a desired altitude and then the sheets 292 may be deployed between adjacent airships 291. To create a larger receiver, more than two airships 291 can be joined with sheets 292. The system 290 may be configured in various 2-dimensional (as shown) and 3-dimensional shapes.

Figure 30:
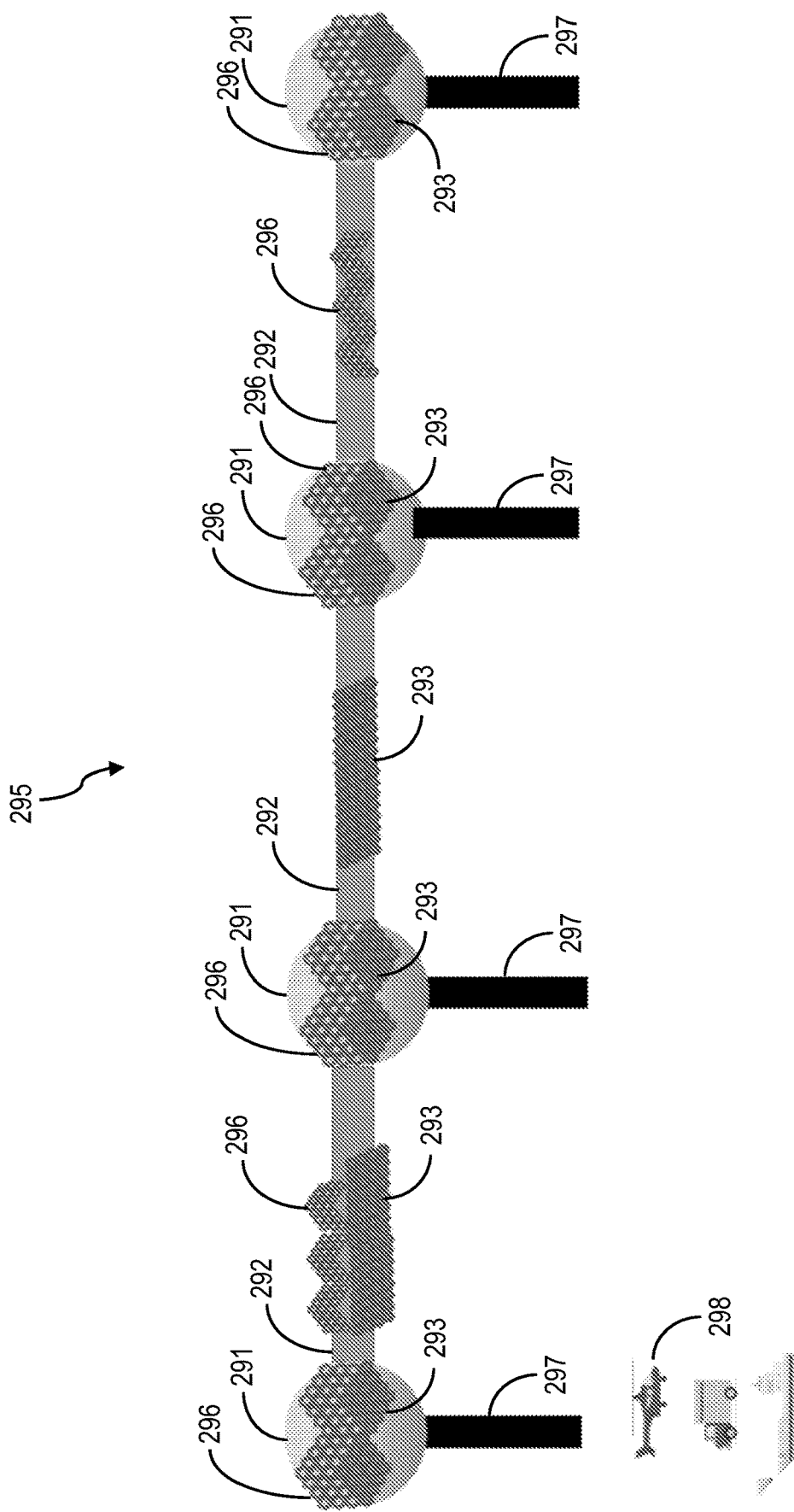
FIG. 30 is a diagram of a system of tethered receivers, according to an embodiment.

FIG. 30 is a diagram of a system of tethered receivers 295, according to an embodiment. Similar to system 290 (FIG. 29), the system 295 includes two or more airships 291 joined by sheets 292 of rectennas 293. The airships 291 further include rectennas 293 on their surface and solar cells 296 on a top surface. Solar cells 296 may also be present on the sheets 292. Each airship 291 is held in place by a tether 297. The tether 297 is connected to a fixed or mobile node 298. A fixed node may be a ground structure (not shown). A mobile node 298 may be a vehicle, aircraft or ship. Fixed nodes anchor the system 295 in place, whereas a mobile node 298 may be used to position the system 295 as needed and then hold the system 295 in place.

Figure 31:
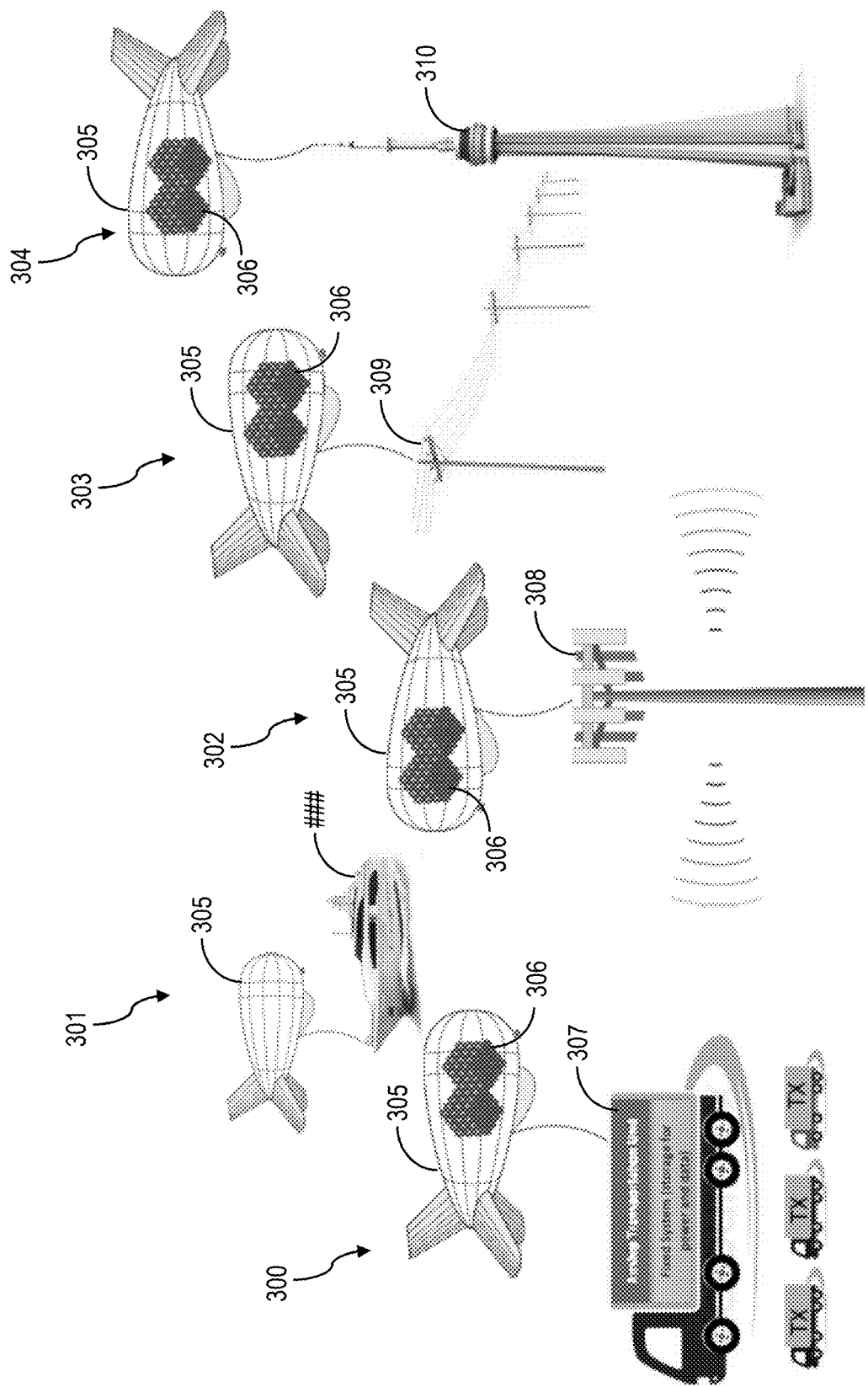
FIGS. 31-32 are diagrams of ground tethered hybrid wireless power transfer systems, according to several embodiments.

FIG. 31 is a diagram of ground tethered hybrid wireless power transfer systems 300, 301, 302, 303, 304, according to several embodiments. Each system 300, 301, 302, 303, 304 includes a tethered airship 305 covered in rectennas 306. Each system 300, 301, 302, 303, 304 includes a ground-based power supply 307, 308, 309, 310. The ground-based power supply may be a vehicle 307. The ground-based power supply may be a radio communications tower 308. The ground-based power supply may be an utility pole 309. The ground-based power supply may be a building/structure 310.

Power from the ground-based power supply 307, 308, 309, 310 is sent up to the airships 305 via the tether.

Figure 32:
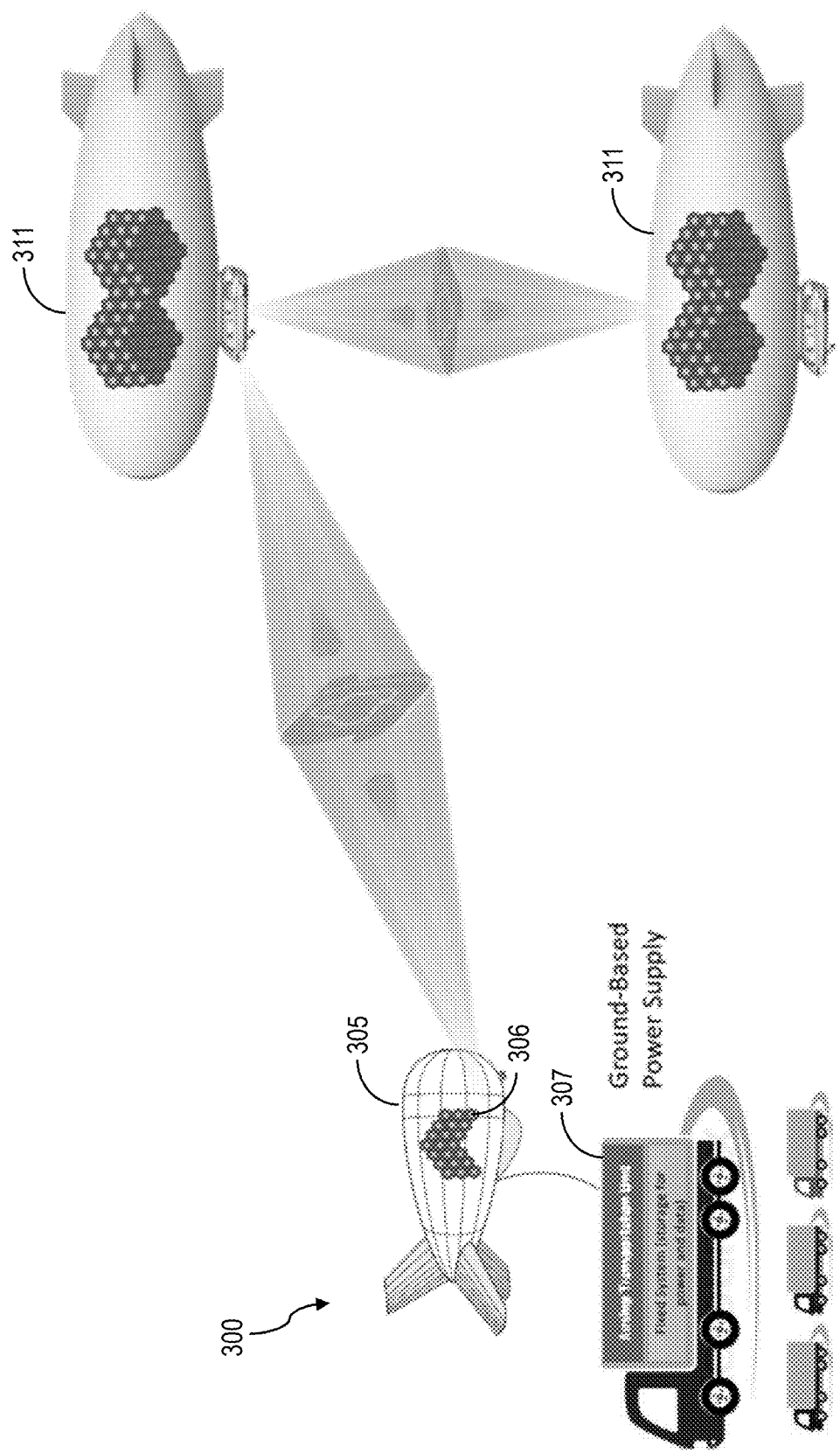

FIG. 32 is a diagram of ground tethered hybrid wireless power transfer system 300 shown in relation to untethered rectenna covered airships 311.

Referring to FIGS. 31 and 32, transmitting power from a ground-based source to an untethered airship 311 requires a high intensity of electromagnetic radiation. Such a high intensity beam of radiation may cause interference with electrical devices on or near the ground. Accordingly, it may be advantageous to transmit power from a ground-based power source to a tethered airship 305, via a tether, to eliminate the potential for electromagnetic radiation interference near the ground. Once the power is received by the tethered airship 305, it may be beamed as radiation to other airships at higher or lower elevations without interfering with ground-based electrical devices.

Figure 33:
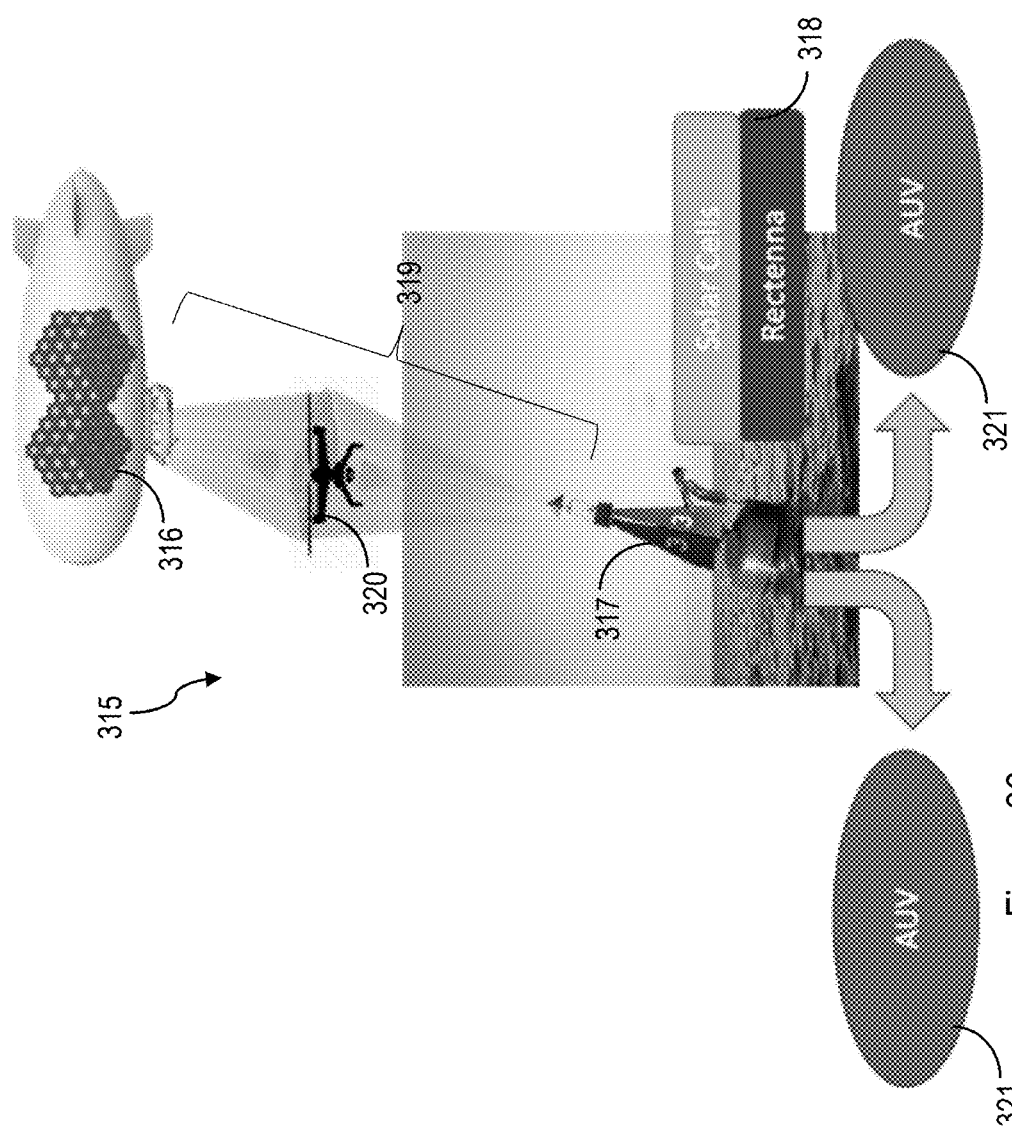
FIG. 33 is a diagram of an air-water interface application for wireless power transmission systems, according to an embodiment.

FIG. 33 is a diagram of an air-water system 315 for wireless power transmission, according to an embodiment. The system 315 includes an airship 316 having a transmitter to beam radiation downward. The system 315 includes a buoy 317 having rectennas 318 for receiving the radiation beamed from the airship 316 to create a beam riding highway 319 between the airship 316 and the buoy 317. The beam riding highway 319 may be used to transport drones 320 between the airship 316 and the buoy 317 in the manner described above with reference to FIGS. 2-4. Radiation in the beam may also be received by the rectennas 318 on the buoy 317 and converted to electricity. The buoy 317 may include solar cells for converting solar radiation to electricity. The solar cells and rectennas 318 on the buoy 317 may be deployable, inflatable and additively manufactured.

The buoy 317 may be configured as a charging station to store power generated by the solar cells and/or the rectennas. The buoy 317 may include underwater architecture (not shown) to support the charging of multiple underwater vehicles 321.

Figure 34:
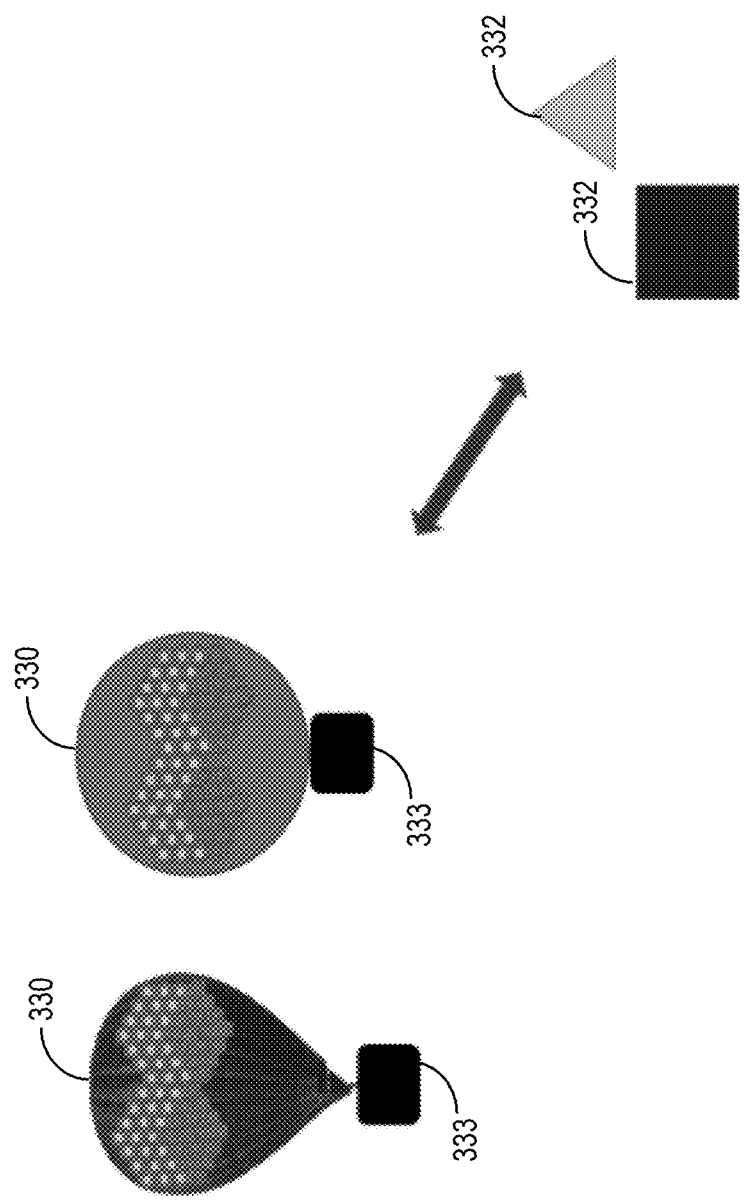
FIG. 34 is a diagram of aerial craft to IoT device connectivity for wireless data transmission, according to an embodiment.
Figure 36:
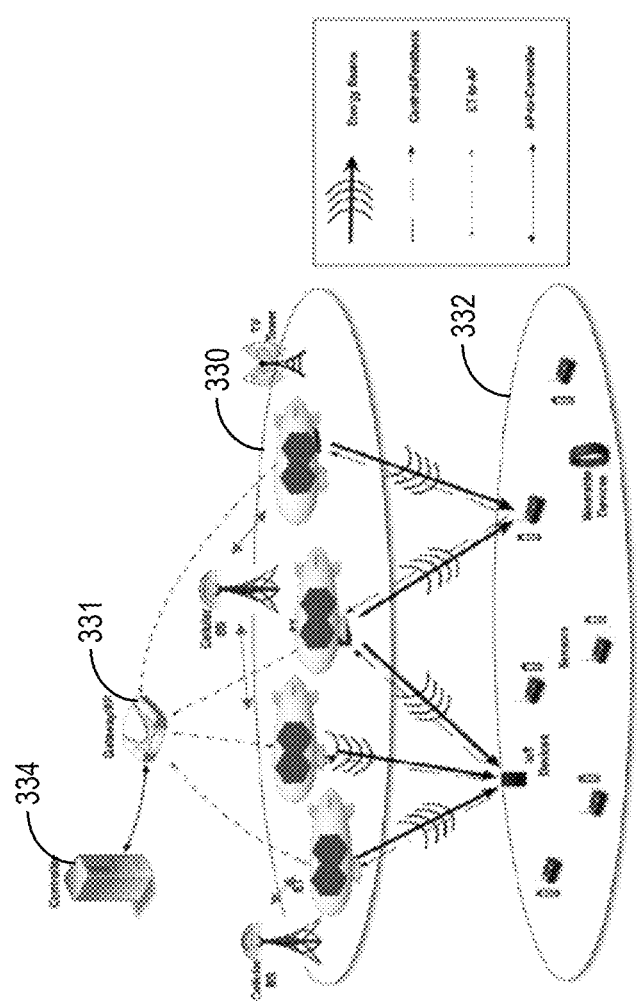
FIG. 36 is a diagram of aerial craft to IoT device connectivity for wireless power and data transmission, according to an embodiment.

FIGS. 34 and 36 are diagrams of aerial craft to IoT device connectivity for wireless power and data transmission, according to several embodiments. Aerial craft 330 having a phased array receiver and transmitter, for example contained in a gondola 333, may be used to communicate and relay signals between IoT devices 332. The IoT devices 332 may be located at remote outposts or communications hubs. The signals transmitted between the IoT devices 332 and the aerial craft 330 may correspond to sensor measurements of temperature, pressure, air quality as well as signals from cameras, telescopes, etc. In conventional systems, the signals must be relayed by satellites in orbit. Using aerial craft 330, the signal relay process is simplified somewhat as the signals need not be relayed over greater distances to space and back to earth. Radiation beamed from the aerial craft 330 may also be used to wirelessly transmit power to compatible IoT devices 332 having rectennas to receive the beamed radiation.

Referring to FIG. 36, signals received/relayed by aerial craft 330 may be channeled through a gateway 331 to a controller 334 for processing. Similarly commands from the controller 334 may be relayed via the gateway 331 to aerial craft 330 and relayed to IoT devices 332.

Figure 35:
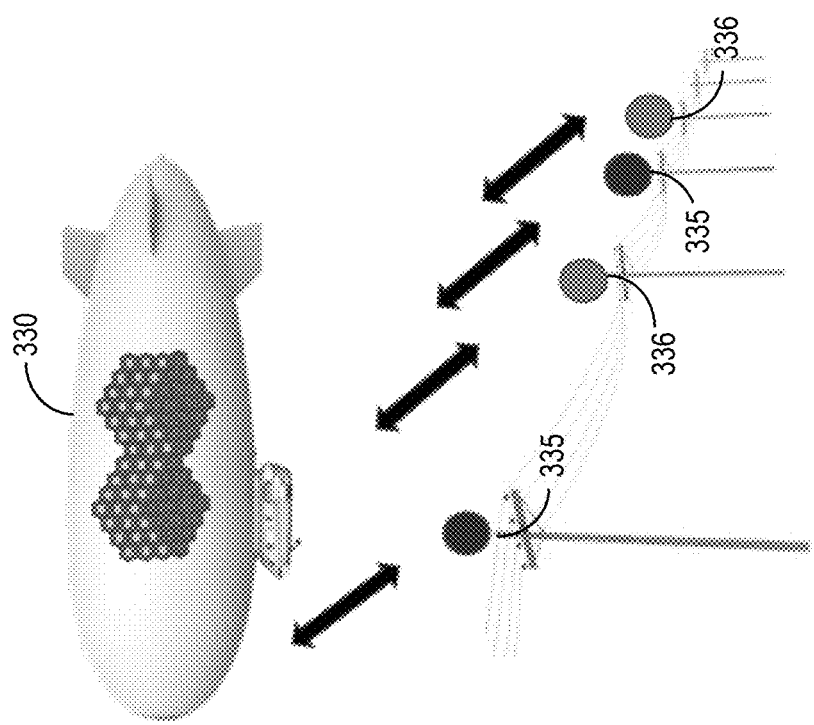
FIG. 35 is a diagram of aerial craft connectivity with smart city infrastructure for wireless power and data transmission, according to an embodiment.

FIG. 35 is a diagram of aerial craft connectivity with smart city infrastructure for wireless power and data transmission, according to an embodiment. Aerial craft 330 having a phased array communication system can be used to create a mobile backhaul support system for rapid response communication with mobile phones, computers and devices on the ground (not shown) by connecting to existing communication infrastructure 335 (e.g., utility poles). Aerial craft 330 may also connect with existing electrical grid infrastructure 336 (e.g., utility poles) to draw power for recharging, rather than having to land to recharge and expend additional battery power unnecessarily. The aerial craft 330 may also transmit power to the grid 336. The connection of the aerial craft to electrical and communication infrastructure is described below with reference to FIGS. 43-44.

Figure 45:
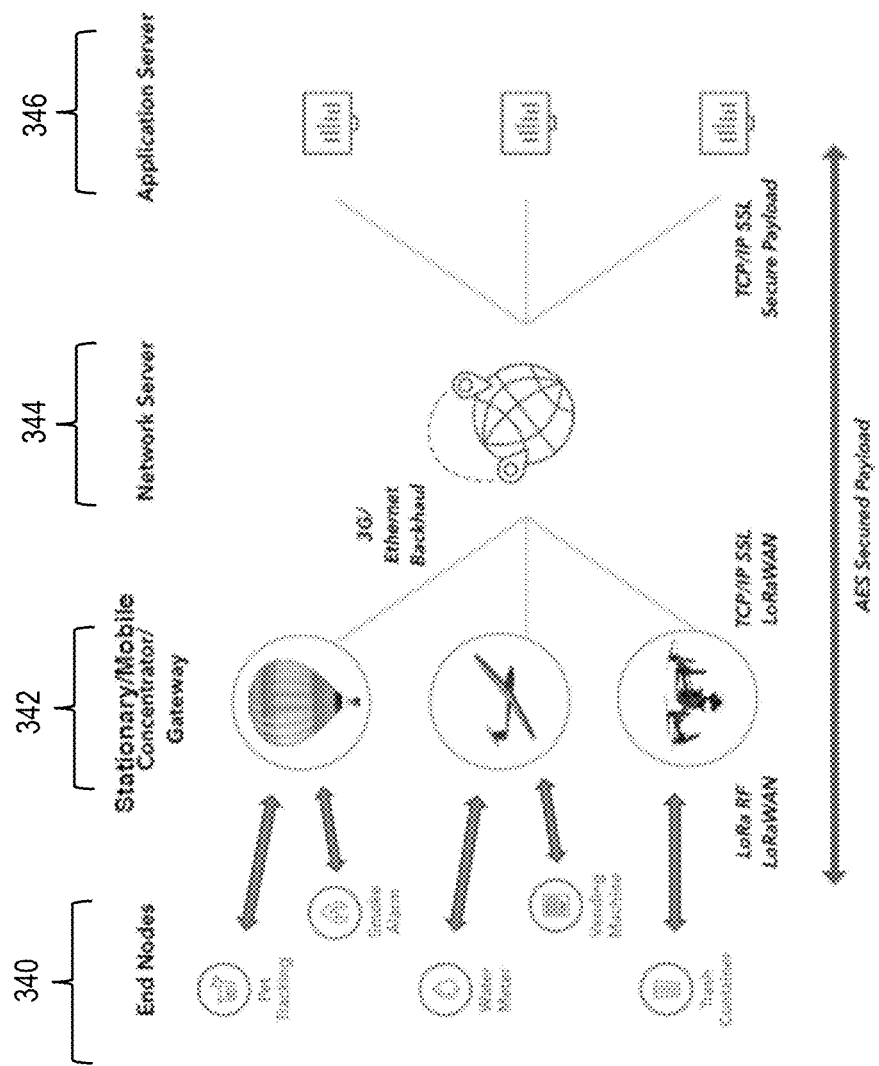
FIG. 45 is a diagram of earth-based end node power and data transmission by aerial craft.

FIG. 45 is a diagram of earth-based end node power and data transmission by aerial craft, according to several embodiments. Earth-based end nodes 340 may correspond to devices or applications for performing and reporting measurements including, water, light, noise temperature, humidity; seismology; climate change monitoring; tracking services, etc. Signals from the end nodes 340 are transmitted to aerial craft 342 as encrypted payloads. The aerial craft 342 act as stationary or mobile backhaul signal concentrators or gateways. The payloads are passed from the aerial craft 342 to a network server 344 and finally to application servers 346 on the backend. Secure payloads from the application servers 346 may be passed to the network server 344 and to the aerial craft 342 before reaching the end nodes 340. The aerial craft 342 may be configured with one or more secure communication protocols for secure communication with the end nodes 340 and network server 344. This configuration for data transmission may be advantageous where end nodes 340 are located in remote areas.

Figure 37:
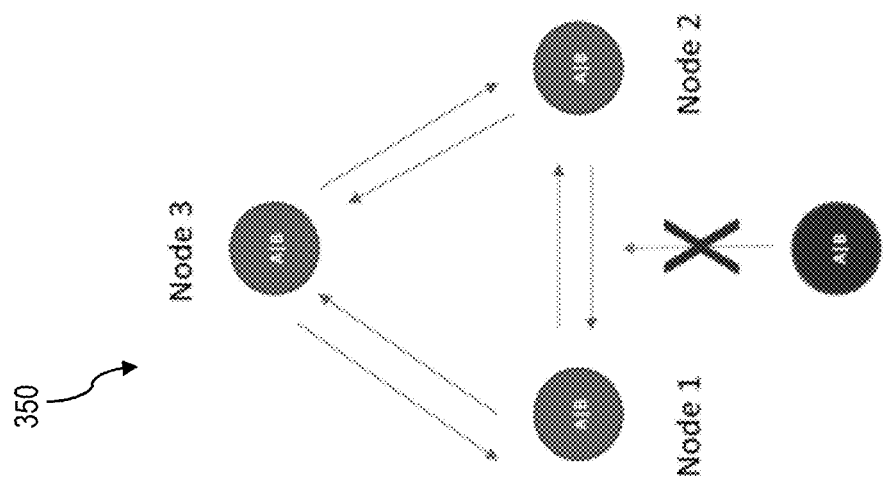
FIG. 37 is a diagram of a quantum communication network for long-distance wireless power and data transmission, according to an embodiment.

FIG. 37 is a diagram of a quantum communication network 350 for long-distance wireless power and data transmission, according to an embodiment. The network 350 includes at least 3 nodes. Each node may correspond to an aerial craft. Conventional quantum communication networks operate according to a set of quantum encrypted photons between a plurality of nodes. Typically, one or more nodes are fixed.

By placement of the nodes on aerial craft, the distance between nodes is scalable and continuously arrangeable in equilateral triangles (bounded by three nodes), and coupled with quantum cryptography, may be used to establish one or more quantum communication channels between the nodes. By placement of the nodes at the vertices of an equilateral triangle, the communication distance between all nodes is equal and thus may be advantageous for near real-time communication between the nodes. Further, since the nodes are aerial craft (and not fixed), the craft may be moved, as needed, to form new triangles while maintaining the quantum communication between nodes to allow for communications across large distances. According to some embodiments, energy may be transmitted through the network to power systems and devices running quantum protocols on the network 350 for various applications.

Figure 38:
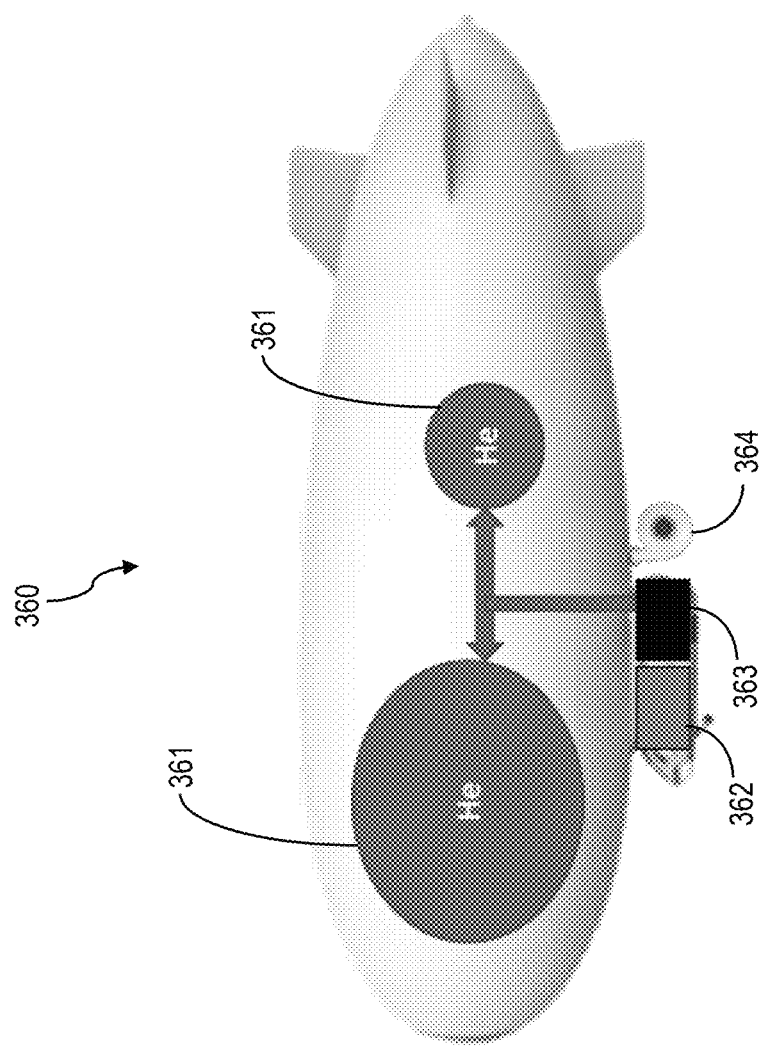
FIG. 38 is a diagram of ballonet-based control for helium airships, according to an embodiment.

FIG. 38 is a diagram of ballonet-based control for a Helium air ship 360, according to an embodiment. The airship 360 includes at least two ballonets 361 for holding helium. The airship 360 includes a vessel 362 for storing compressed Helium gas. The airship includes a heater 363 for heating the stored Helium and a compressor 364 for pumping the heated helium into the ballonets 361. The ballonets 361 are interconnected such that when one ballonet 361 is inflated, the other is correspondingly deflated. The combined inflation/deflation of the ballonets 361 may be used to control the airship 360, to direct the airship 360 in flight.

Figure 41:
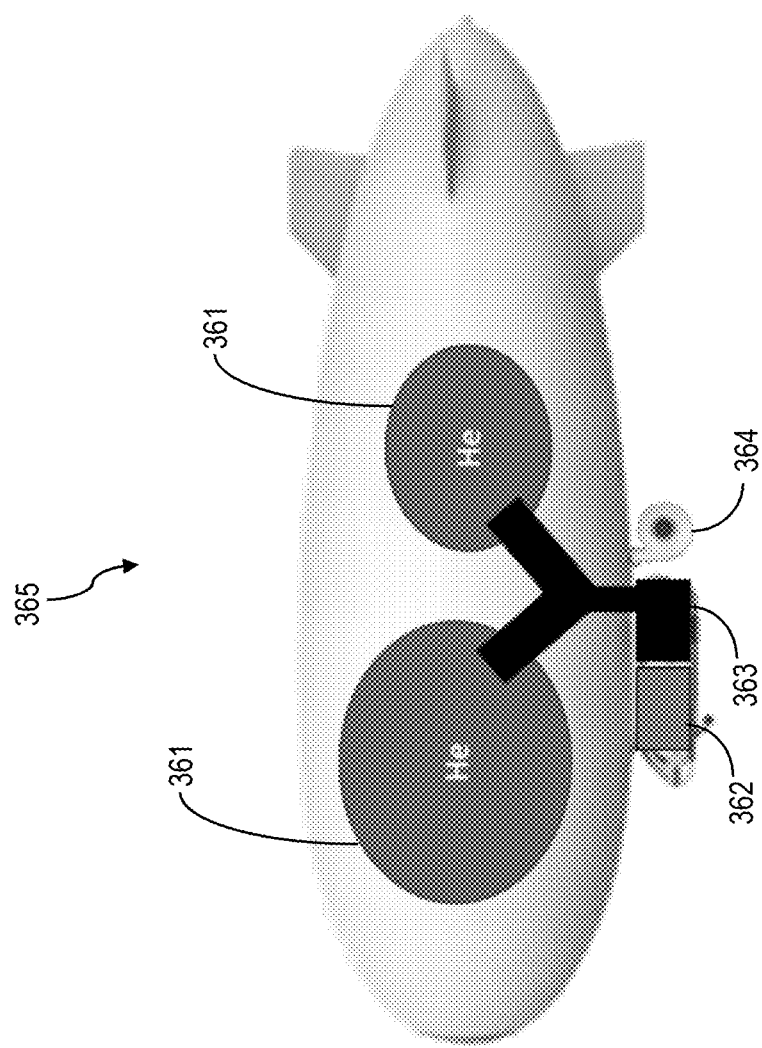
FIG. 41 is a diagram of ballonet-based control for helium airships, according to another embodiment.

FIG. 41 is a diagram of ballonet-based control for a Helium air ship 365, according to another embodiment. The airship 365 is substantially similar to the airship 350 in FIG. 38 and includes at least two ballonets 361 for holding helium, a vessel 362 for storing compressed helium gas, a heater 363 for heating the stored Helium and a compressor 364 for pumping the heated helium into the ballonets 361. However, the ballonets in the airship 365 are not interconnected and may be inflated/deflated independent of one another to control the airship 365.

Figure 39:
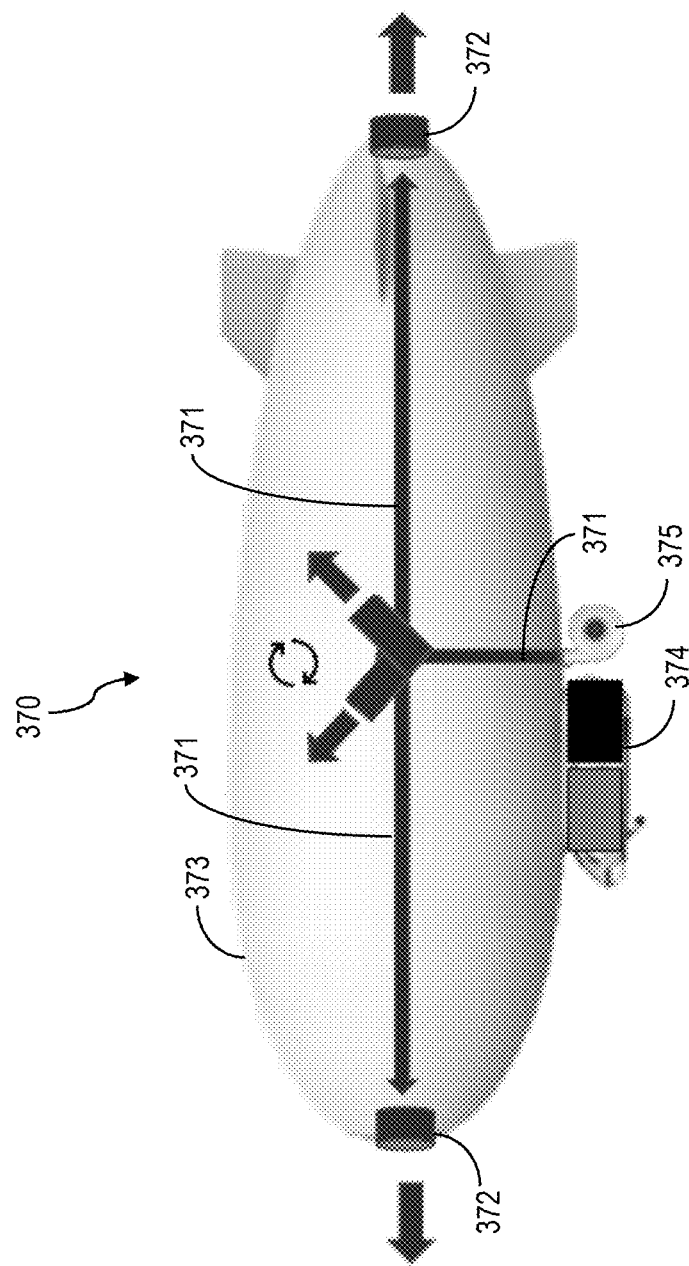
FIG. 39 is a diagram of a hybrid vectored control for airships, according to an embodiment.

FIG. 39 is a diagram of hybrid vectored control for an airship 370, according to an embodiment. The airship includes a plurality of ducts 371. The ducts 371 have outlet valves 372 on the exterior surface of the airship envelope 373 to expel air from the ducts 371 to the exterior. The airship 370 includes a heater 374 for heating air and a compressor 375 for pumping the heated air through the ducts 371. The valves 372 may be opened and closed, as needed, to expel hot air out of the ducts 371 through the outlet valves 372 for vector control to direct the flight of the airship 370. Generally, hot air is expelled in an opposite direction to the desired direction of travel.

Figure 40:
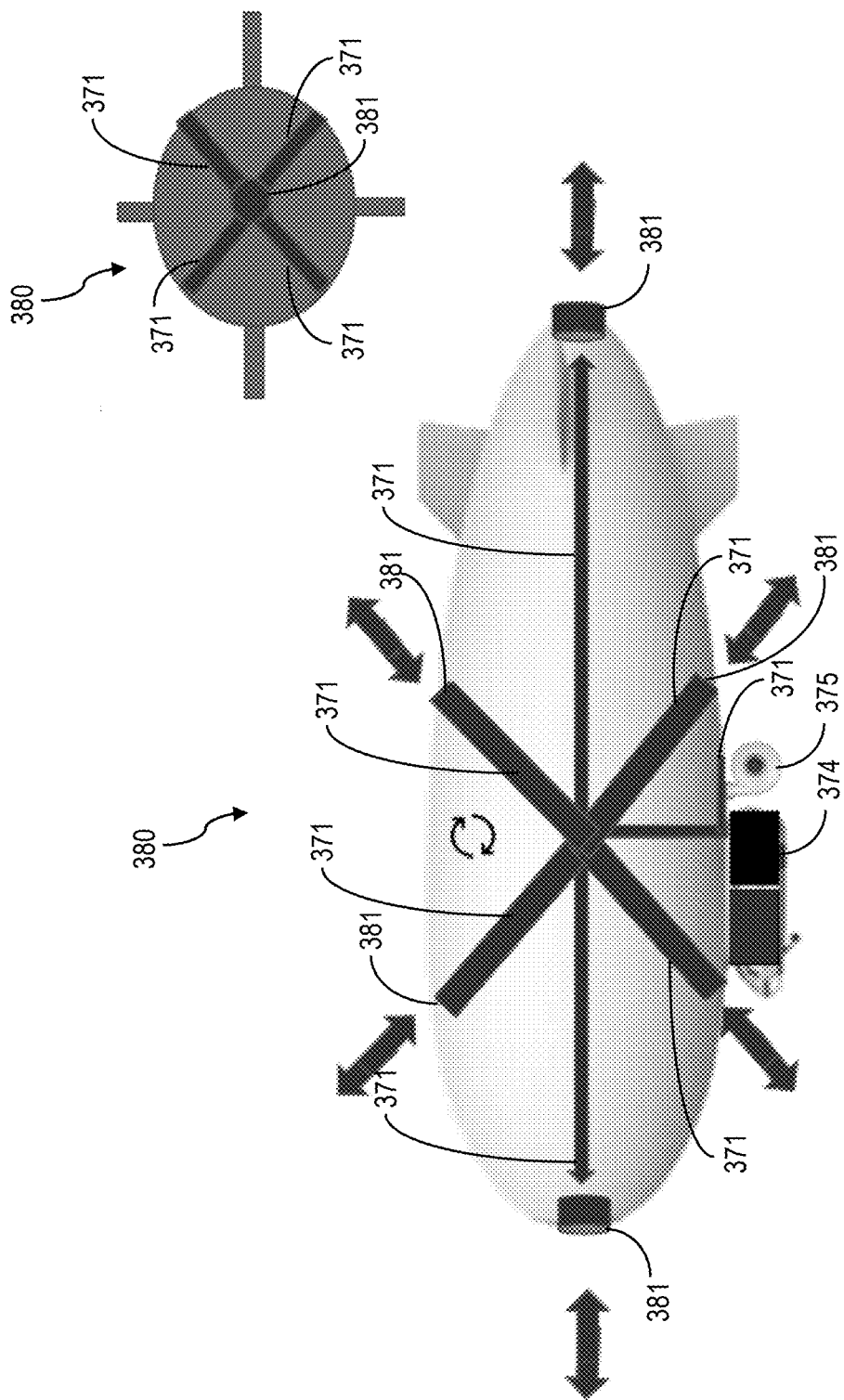
FIG. 40 is a diagram of hybrid vectored control for airships, according to another embodiment.

FIG. 40 is a side view and front cross-section diagrams of hybrid vectored control for an airship 380, according to an embodiment. The airship may be substantially similar to the airship 370 in FIG. 39 and includes a network of ducts 371, a heater 374 and a compressor 375. The ducts 371 have bidirectional valves 381 on the exterior surface of the airship envelope 373 to expel air from the ducts 371 to the exterior. The bidirectional valves 381 are configured to expel air from the ducts 371 and also draw air into the ducts 371 from the exterior as needed, for vector control to direct the flight of the airship 380.

Referring to FIGS. 39 and 40, the expulsion of air through the valves 372, 381 may give rise to the Coanda effect, as the expelled air flows along the curved envelope 373 of the airship. Accordingly, air flowing out of a valve may result in movement of the airship in a corresponding direction to the air flow.

Figure 42:
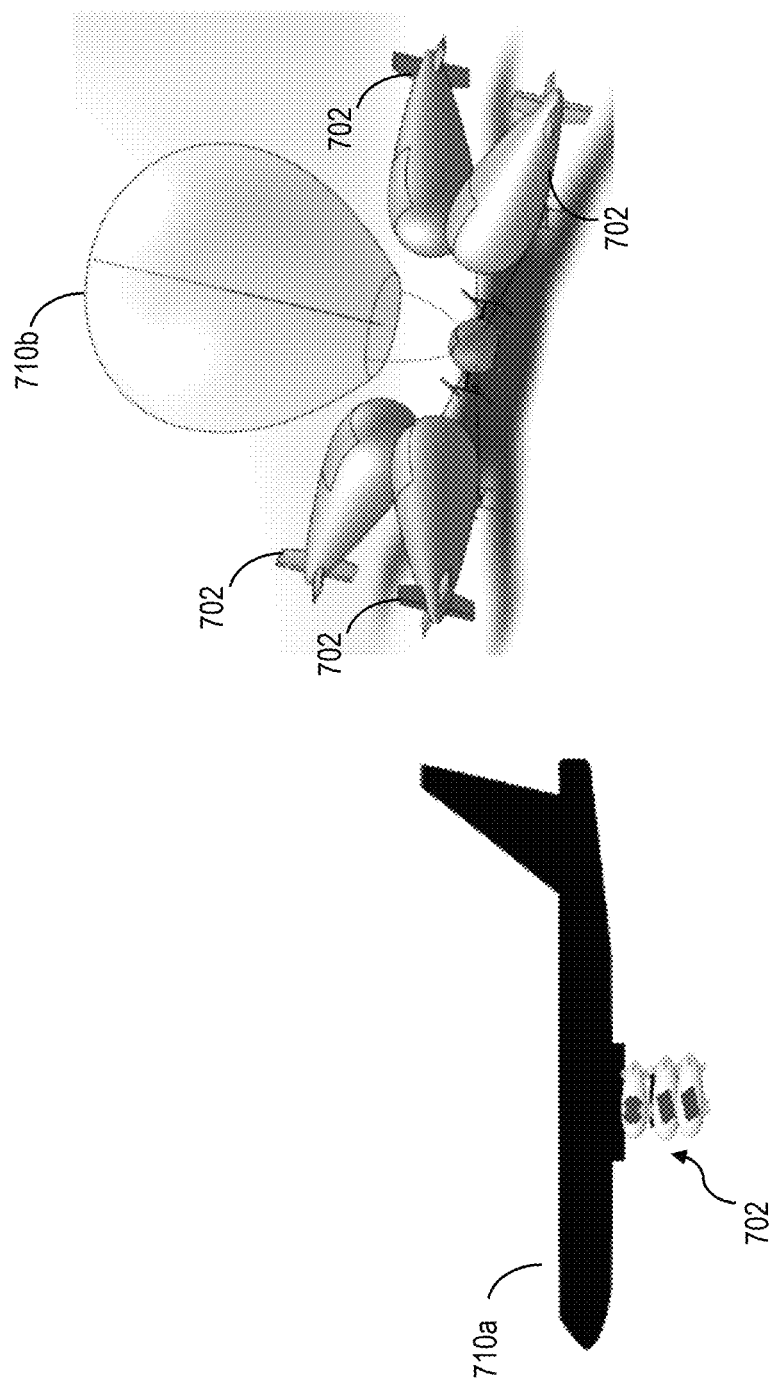
FIG. 42 is are diagram of methods for UAV deployment.

FIG. 42 is a diagram depicting methods for UAV deployment. Pictured therein is launch vehicle 710a, 710b, each launch vehicle coupled to a plurality of aerial receiving stations 702. Launch vehicle 710a, 710b may increase its altitude until a target altitude is reached. Once a target altitude is reached, launch vehicle 710*a*, 710*b* may deploy aerial receiving stations 702. Launch vehicle 710*a* comprises a large fixed wing aircraft. Launch vehicle 710*b* comprises a hot air balloon.

Launch vehicle 710*a* may store each aerial receiving station 702 internal to its exterior structure. Launch vehicle 710*a* may deploy aerial receiving station 702 by opening an access point, allowing each aerial receiving station 702 to escape launch vehicle 710*a*.

Launch vehicle 710*b* is coupled to a plurality of aerial receiving stations 702. Launch vehicle 710*b* may deploy each aerial receiving station 702 by decoupling each aerial receiving station 702 from launch vehicle at the target altitude.

FIG. 43 is a diagram of a docking system 390 to tether an airship to power and communications infrastructure, according to an embodiment. The docking system 390 may be contained in a gondola beneath the aerial craft. The docking system 390 includes a winch 392 and robotic arm 393. The winch 392 lowers or raises the robotic arm 393. The robotic arm 393 itself may articulate in at least two dimensions to align with a docking point on communications or power infrastructure, for example, a utility pole 395 or communications tower 396. The robotic arm 393 includes an interface 394 to transmit and receive power and/or data when docked with communications or power infrastructure. The robotic arm 393 may be modular, such that it may be elongated by adding more joints, or reduced in length by removing joints.

Figure 44:
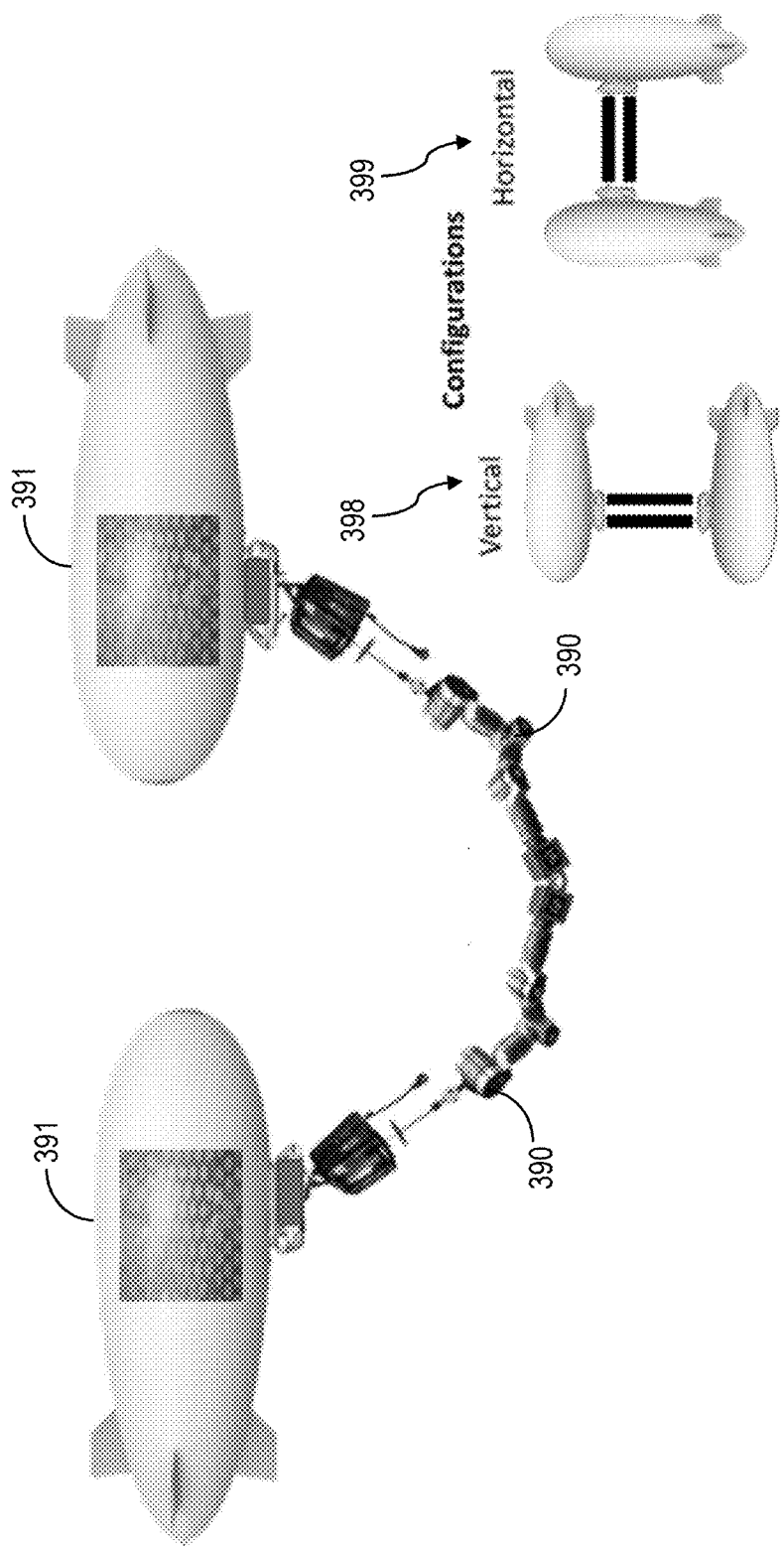
FIG. 44 is a diagram of wired power and data transmission between aerial craft, according to several embodiments.

FIG. 44 is a diagram of wired power and data transmission between aerial craft, according to an embodiment. Wired power and data transmission may be achieved by establishing a wired connection between aerial craft 391 in close proximity. The wired connection may be established by use of the docking system 390 on both aerial craft 391. The robotic arm of the docking system 390 may articulate to achieve a connection at different angles to each other allowing for multiple configurations for docking, for example a vertical configuration 398 or a horizontal configuration 399. An advantage of the wired power and data transmission between aerial craft is that the signals passing between the craft may not be detected or interference with by extraneous sources.

Figure 46:
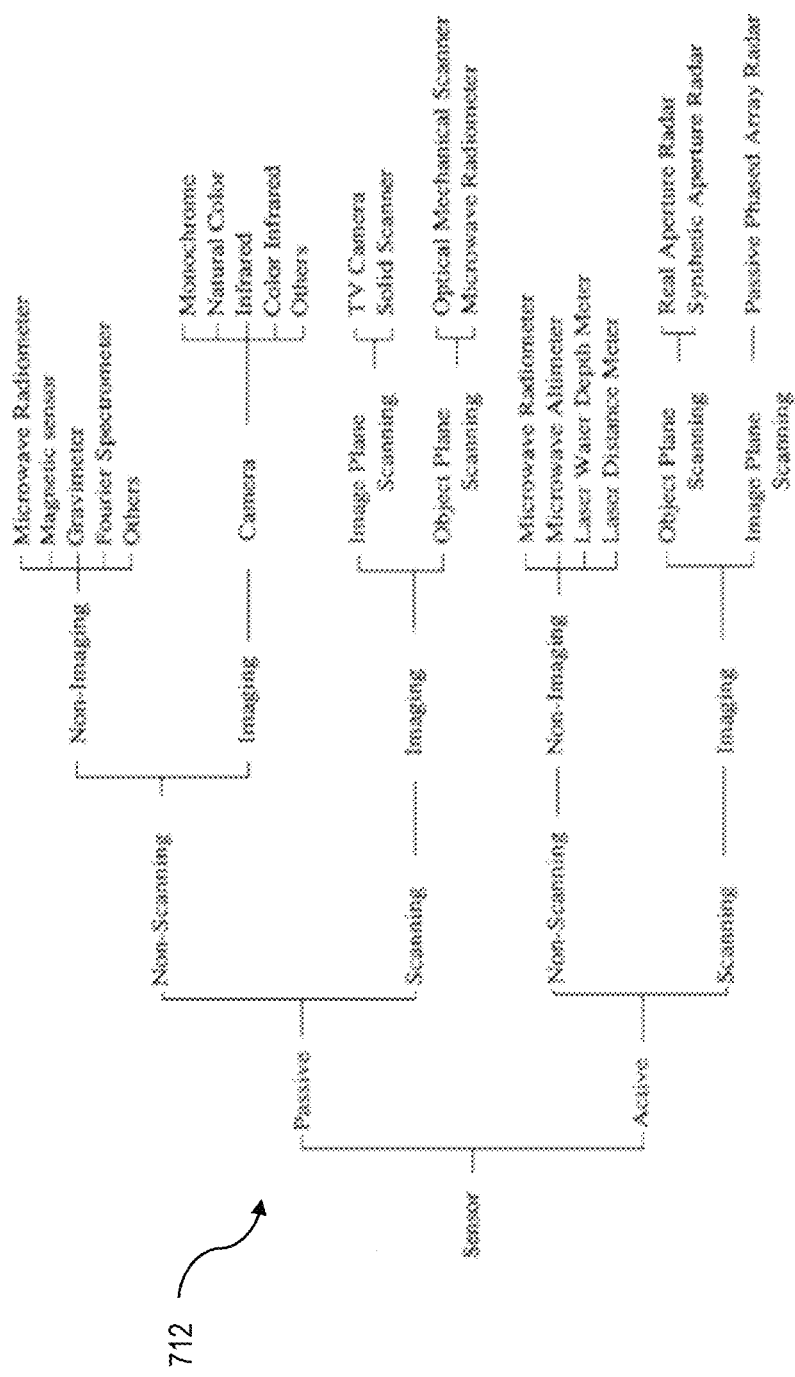
FIG. 46 is a chart of sensors for UAVs and spacecraft.

FIG. 46 is a chart 712 of sensors for UAVs and spacecraft. The chart 712 of FIG. 46 details the array of sensors, both active and passive, that any UAV or spacecraft mentioned in the disclosure herein may comprise. Sensors may include a microwave radiometer, magnetic sensor, gravimeter, Fourier spectrometer, monochrome camera, natural color camera, infrared camera, color infrared camera, other camera, TV camera, solid scanner, optical mechanical scanner, scanning microwave radiometer, non- scanning microwave radiometer, microwave altimeter, laser water depth meter, laser distance meter, real aperture radar, synthetic aperture radar, and or passive phased array radar.

FIG. 47 is a diagram of additively manufactured spacecraft 400, 401, according to several embodiments. The spacecraft 400, 401 may be crewed or uncrewed and may be used for supporting in-orbit space services including manufacturing, power generation and storage in cislunar space, surface, sub-surface operations on the Moon, Mars and asteroids. The spacecraft include an inflatable habitat 402, a capsule 403 and arrays of rectennas 404 and solar cells 405. The inflatable habitat 402 may be raised to orbit in a compact form and inflated to the final configuration shown.

Figure 54:
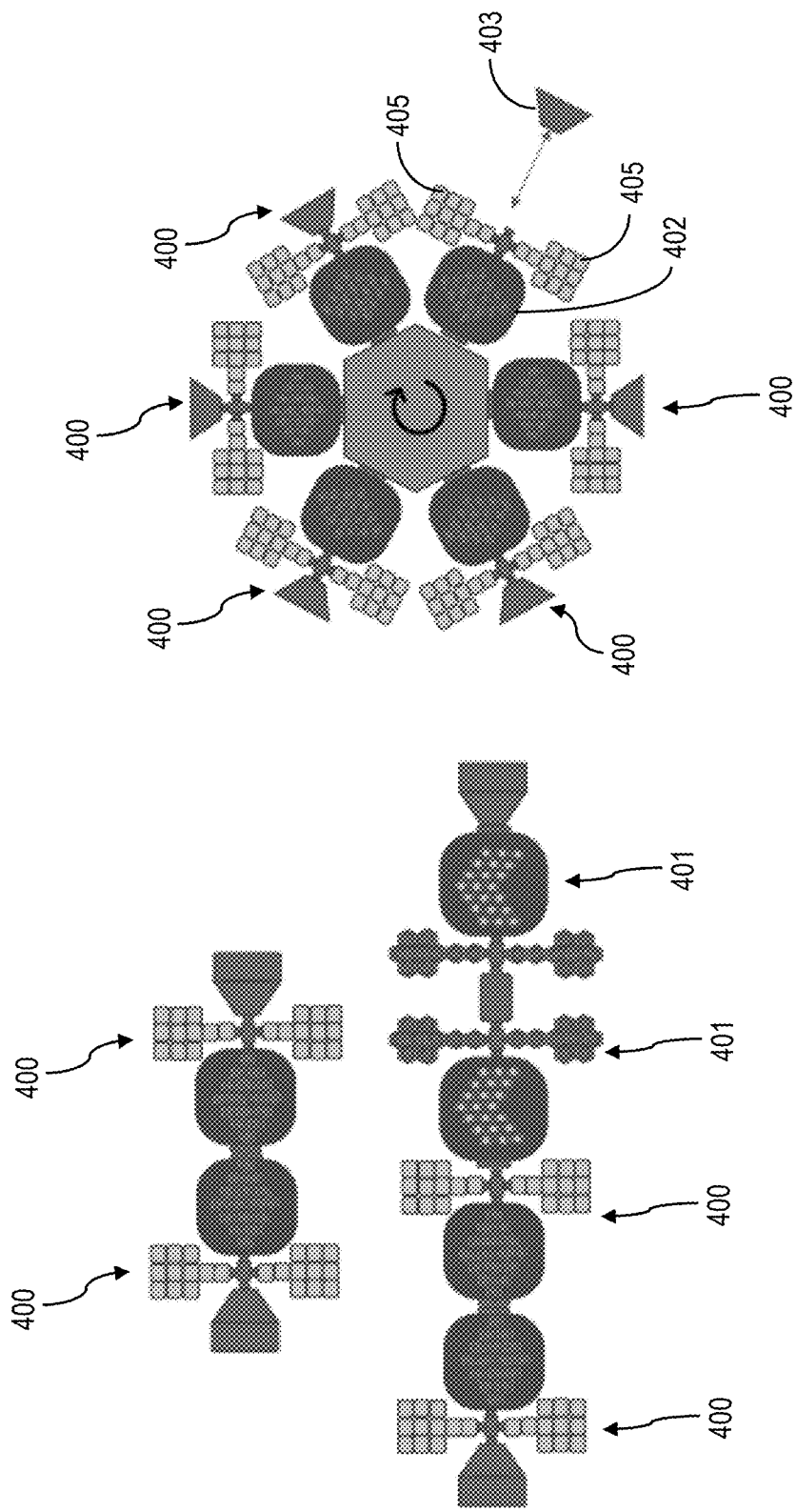
FIG. 54 is a diagram of in-orbit assembled modular spacecraft from the additively manufactured spacecraft shown in FIG. 47, according to several embodiments.
Figure 56:
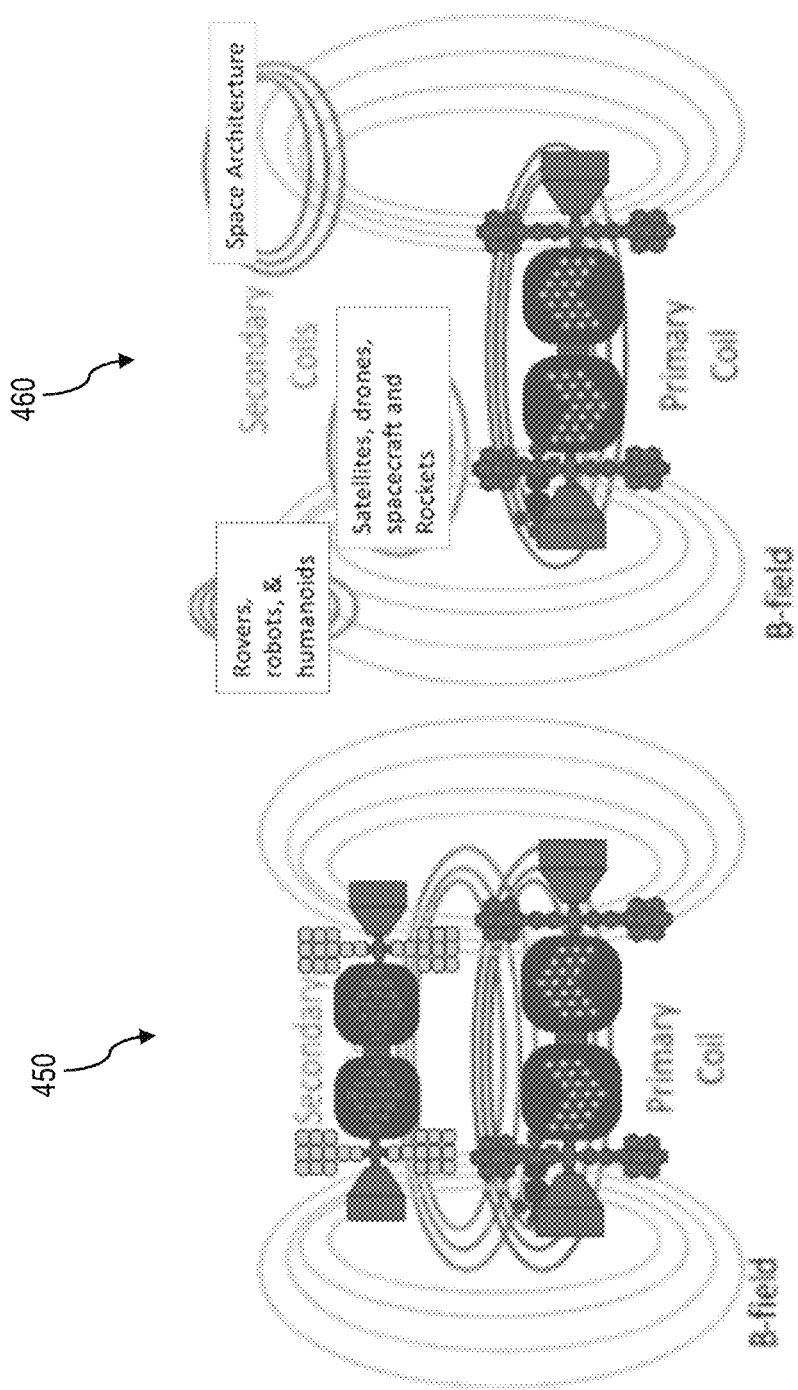

The arrays of rectennas 404 and solar cells 405 may be additively manufactured on the spacecraft 400, 401 in a similar manner to additive manufacture of arrays of rectennas and/or solar cells manufactured on the envelope of an airship (FIG. 17), and may combined and joined and/or attached to the spacecraft 400, 401 while in orbit. Additive manufacturing of the arrays of rectennas 404 and solar cells 405 on the spacecraft may provide for a magnetically spin-stabilized spacecraft 400, 401 according to the position of the arrays 404, 405 and may further provide an interface on the spacecraft for additional construction to create larger systems as shown in FIG. 54.

Figure 48:
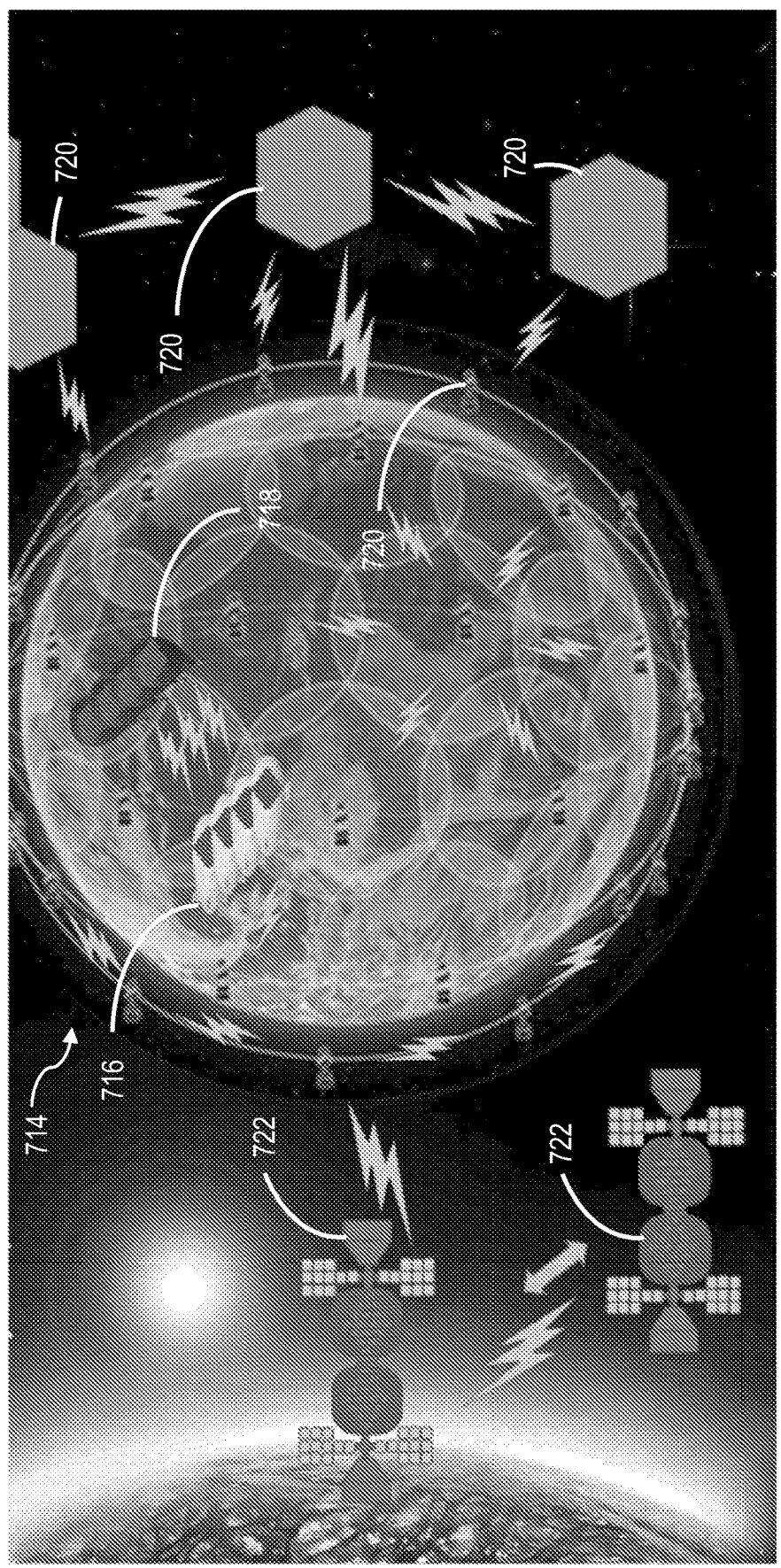
FIGS. 48-49 are diagrams of scalable network configurations for earth-to-space and space-to-earth point-to-point power and data transmission, according to several embodiments.
Figure 49:
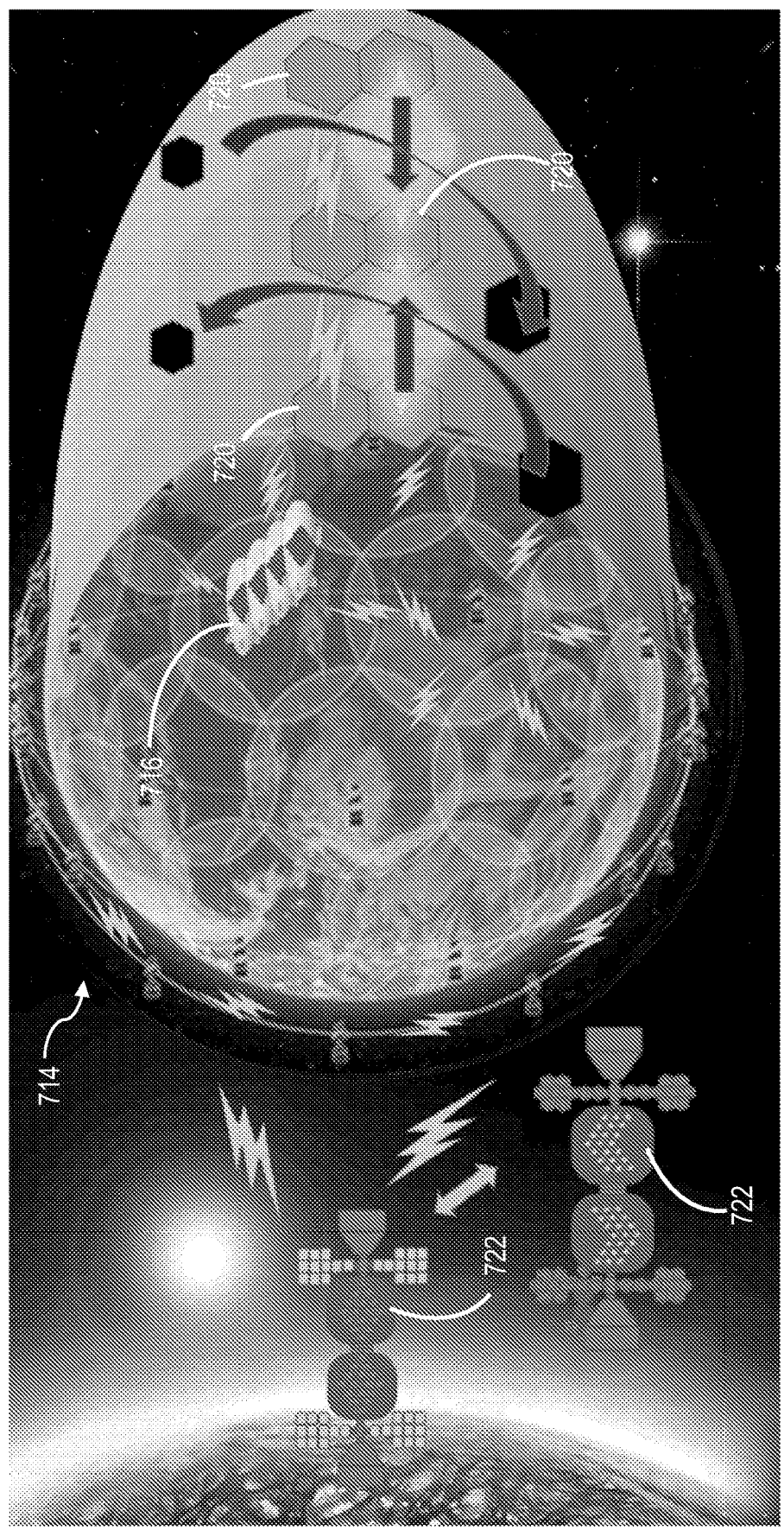

FIGS. 48-49 are diagrams of scalable network 714 configurations for earth- to-space and space-to-earth point-to-point power and data transmission, according to several embodiments. Network of FIG. 48-49 may comprise a plurality of craft, such as aircraft and or spacecraft, including but not limited to airships 716, hot air balloons 718, satellites 720, and other spacecraft 722, such as a interplanetary spacecraft. Earth to space, and space to earth architectures can be rapidly deployed to support mission objectives, networks for wireless transfer of power and data. Each craft may transfer wireless power and or data to and from each other craft or to a ground station. The network 714 may be continuously managed, and dynamic, such that additional craft or ground stations may be added or removed, such that they are added removed to or from network 714 while network is operational, without disturbing the operation of the network.

Orbiting satellite 720 may alter orbit as pictured in FIG. 49. Orbit may be raised or lowered, such that satellite 720 may be placed at various orbit heights, such as to create an energy tunnel, wherein a craft may wirelessly receive power and data while within the energy tunnel. Orbit raising and descent can be achieved through the beam riding satellite and point to point power transfer methodologies. Space systems may also be augmented with heat exchangers for propulsion and power generations. Space systems have rectennas and/or solar cells for power generations. Other subsystems may be used for hybrid systems to augment the capabilities, such as storage, plasma confinement, thermal, nuclear, water-based systems, etc.

Figure 50:
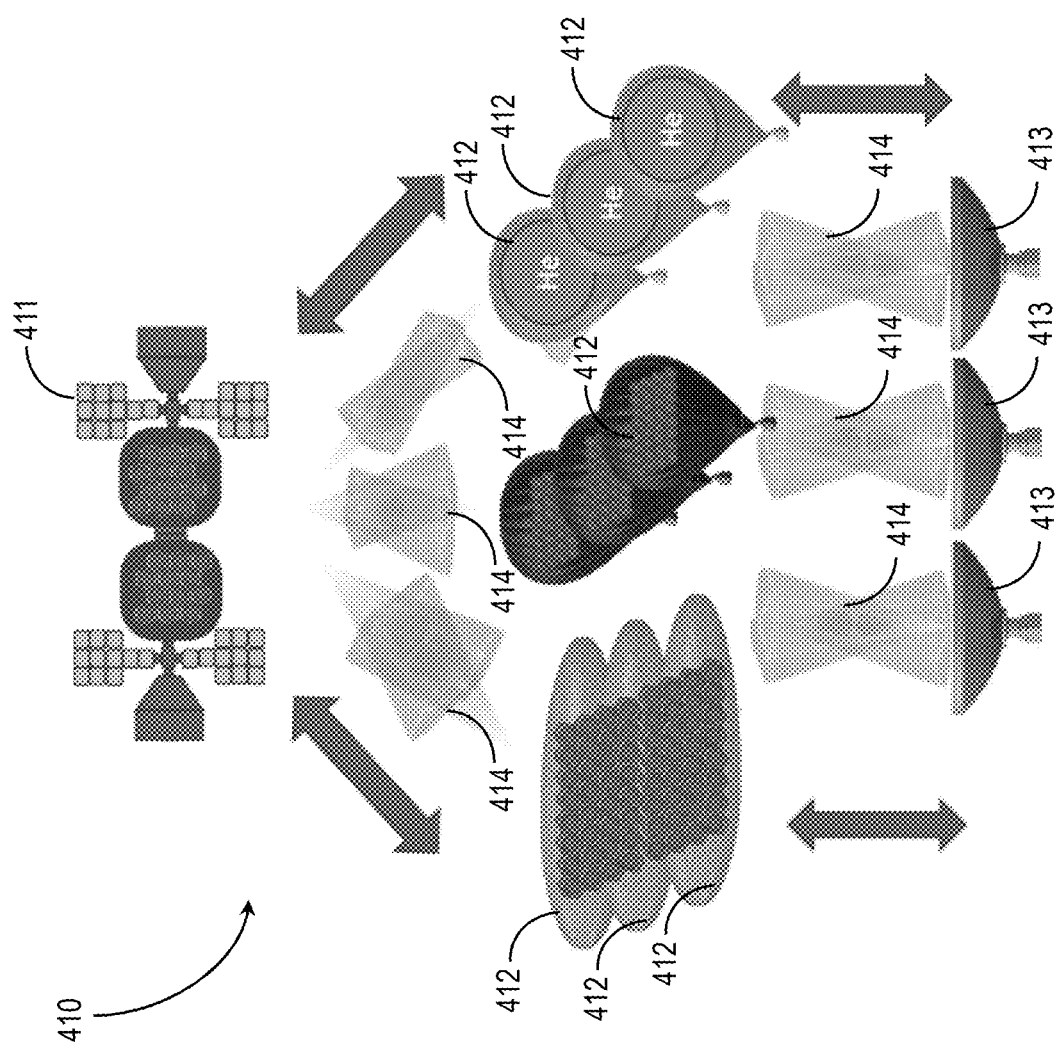
FIG. 50 is a diagram of a solar powered satellite elevator system, according to an embodiment.

FIG. 50 is a diagram of a solar powered satellite elevator system 410, according to an embodiment. The system 410 includes one or more satellites 411 in orbit at a space altitude. The system 410 includes one or more aerial craft 412 positioned at an intermediate altitude. The system 410 include ground-based parabolic EM radiation transmitters 413. The satellites 411 and aerial craft 412 include arrays of EM radiation transmitters and receivers (including rectennas) to establish beam riding highways 414 in a generally vertical direction from the ground up to space. A fleet of satellites 411 or aerial craft 412 may be used to increase the availability of power in the beam riding highways 414 from the ground to space. Other aerial craft (not shown) may enter the beam riding highways 414 and use the local available power for propulsion to change altitude (up or down) and position (side to side) within the beam riding highways 414.

Figure 51:
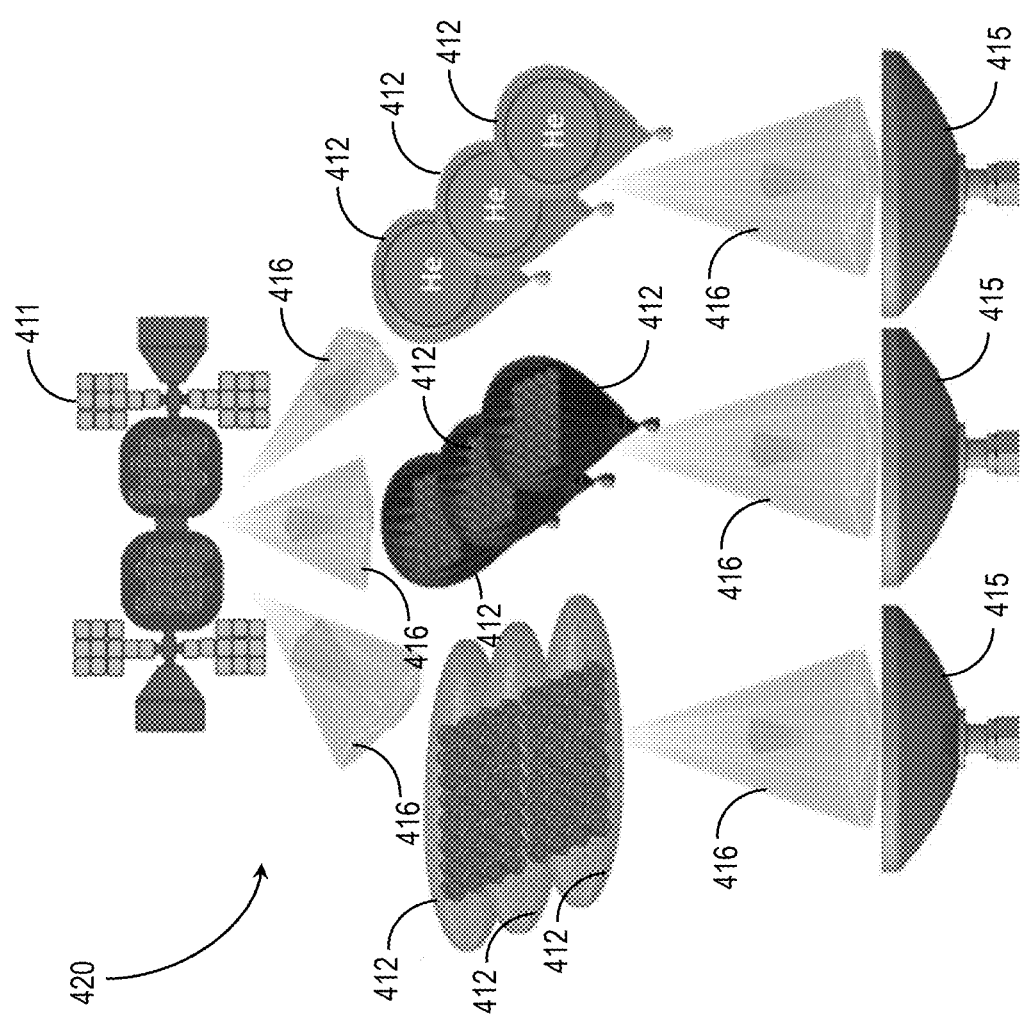
FIG. 51 is a diagram of a solar powered satellite space-to-earth wireless power and data transmission system, according to an embodiment.

FIG. 51 is a diagram of a solar powered satellite space-to-earth wireless power and data transmission system 420, according to an embodiment. The system 420 is substantially similar to the system 410 (FIG. 50) and includes one or more satellites 411 in orbit. The satellites 411 include arrays of solar cells to receive solar radiation and generate power. The satellites 411 include transmitters to beam EM radiation 416 down toward the earth from the power generated by the solar cells. The system 420 includes one or more aerial craft 412 positioned at an intermediate altitude. The aerial craft 412 include arrays of EM radiation transmitters and receivers (including rectennas). The aerial craft 412 receive the radiation 416 beamed down from the satellite 411 and retransmit the radiation 416 downward toward the earth. The system 420 includes ground-based parabolic receivers 415 to collect the EM radiation 416 beamed down from the aerial craft 412. The parabolic receivers 415 may include rectenna arrays to convert the received radiation 416 to electricity for use on the ground.

Figure 52:
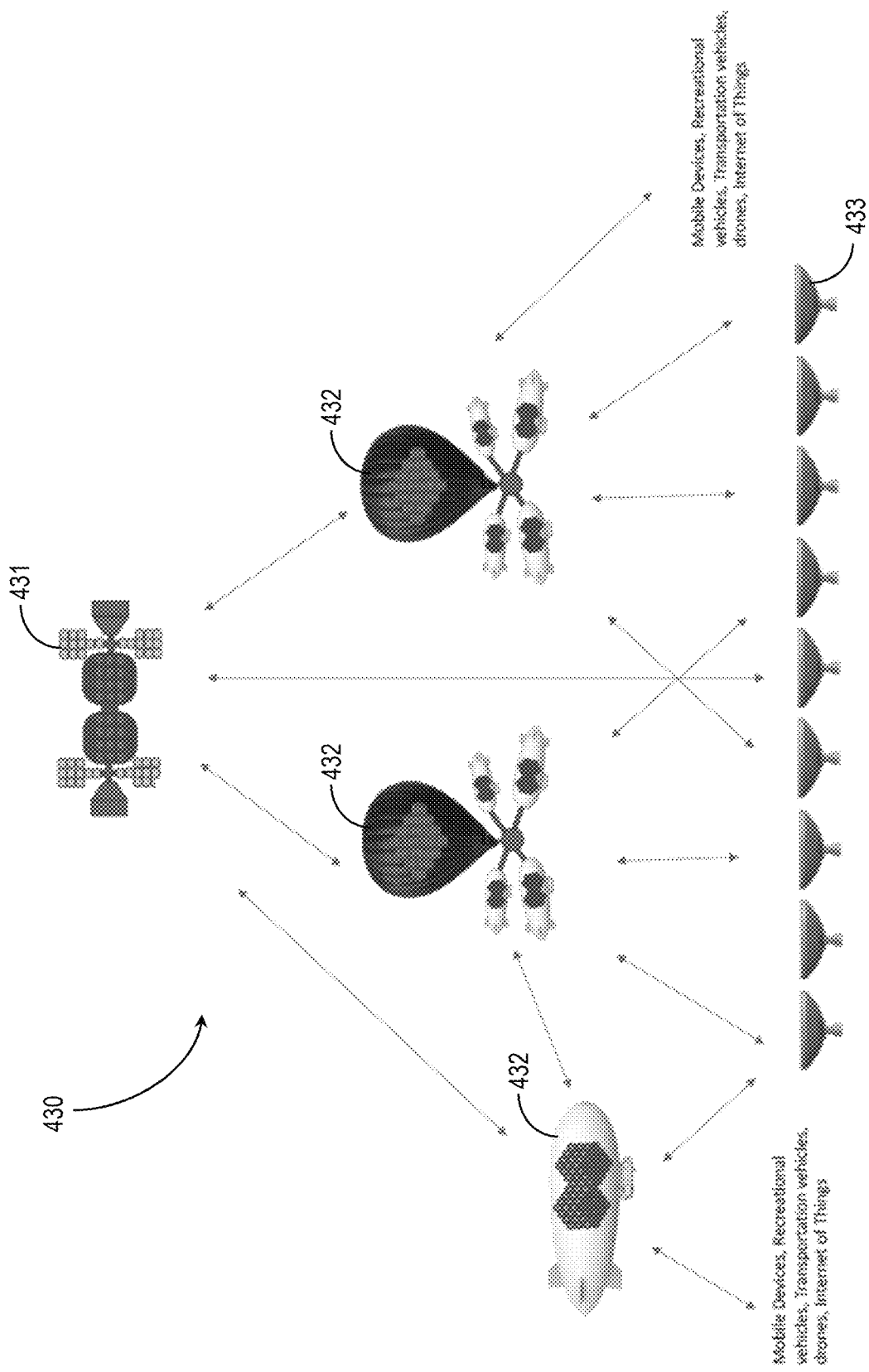
FIGS. 52-53 are diagrams of rapidly deployable data and power hubs for use in point-to-point wireless power and data transmission, according to several embodiments.

FIG. 52 is a diagram of a deployable data hub system 430 for use in point-to-point data transmission, according to an embodiment. The system 430 includes a constellation of satellites 431, a fleet of aerial craft 432 and ground stations 433. In conventional systems wherein data is beamed directly from satellites 431 to ground stations 433, the satellite 431 must be in range (i.e., above the ground station 433) for successful data transmission. Compared to conventional systems, the system 430 is advantageous to provide an intermediary data hub in the fleet of aerial craft 432 to relay signals between the satellite 431 and the ground stations 433. Accordingly, a satellite 431 need not be in direct range of a ground station 433 for successful data transmission and may transmit or receive data via the aerial craft 432 data hub. A further advantage is that data received from the satellite 431 may be transmitted directly from the aerial craft 432 data hub to IoT devices rather than having to pass through a ground station 433 first.

Figure 53:
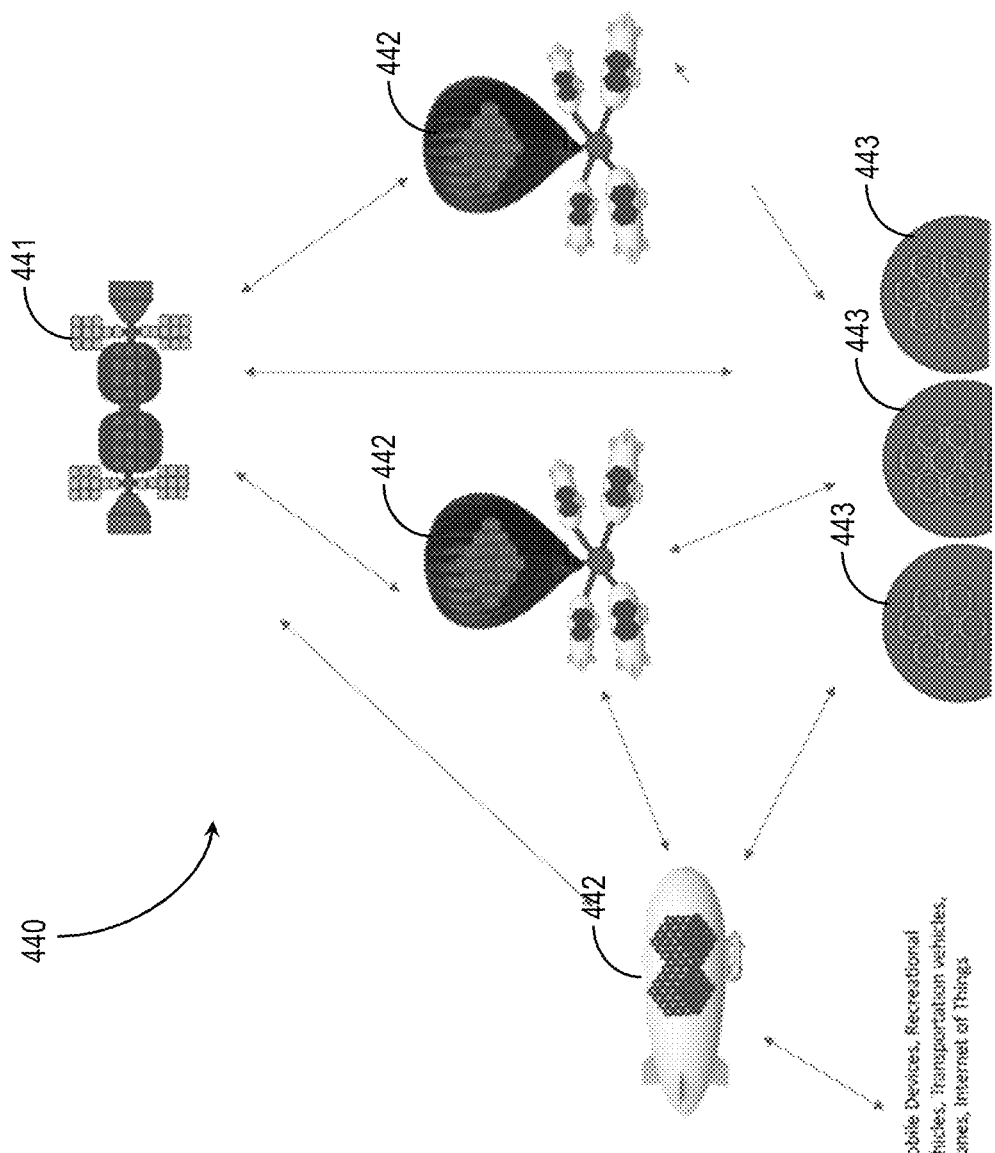

FIG. 53 is a diagram of a rapidly deployable power hub system 440 for use in point-to-point wireless power transmission, according to an embodiment. The system 440 includes a constellation of satellites 441, a fleet of aerial craft 442 and deployable ground stations 443. The satellites 441 include arrays of solar cells to receive solar radiation and generate power. The satellites 441 include transmitters to beam EM radiation down toward the earth from the power generated by the solar cells. The fleet of aerial craft 442 are positioned at an intermediate altitude between the satellite 441 and ground stations 443. The aerial craft 442 include arrays of EM radiation transmitters and receivers (including rectennas). The aerial craft 442 receive the radiation beamed down from the satellite 441 and retransmit the radiation downward toward the earth.

The deployable ground stations 443 may be additively manufactured, deployable structures to house aircraft, personnel, and other materials. The deployable ground stations 443 include arrays of rectennas to collect the radiation beamed downward from the aerial craft 442. The deployable ground stations 443 are preferable dome shaped to provide maximal area for deployment of the arrays of rectennas to receive beamed radiation from the aerial craft. The system 440 may be advantageously used to generate power in remote areas where power availability is low or when the electrical grid is down. Alternatively, the system 440 may be used to augment available energy.

FIGS. 54-55 are diagrams of in-orbit inductive-coupled magnetic resonance wireless power transfer systems 450, 455, 460 according to several embodiments. The systems are analogous to the wireless power transfer systems 140, 150, 155 in FIGS. 7-8. Certain differences will be described. As the systems 450, 455, 460 are in orbit, the primary and secondary coils are located within satellites, rovers, robots, spacecraft and/or space systems. The system 450, 455, 460 architectures may be augmented with other power beaming platforms (in the manner shown in FIG. 9) including but not limited to low and high frequency microwaves, lasers, infrared, x-rays, and other EM radiation. Furthermore, the systems 450, 455, 460 may be shielded from space debris and/or harmful radiation by moving plasma within the magnetic field, B.

Figure 57:
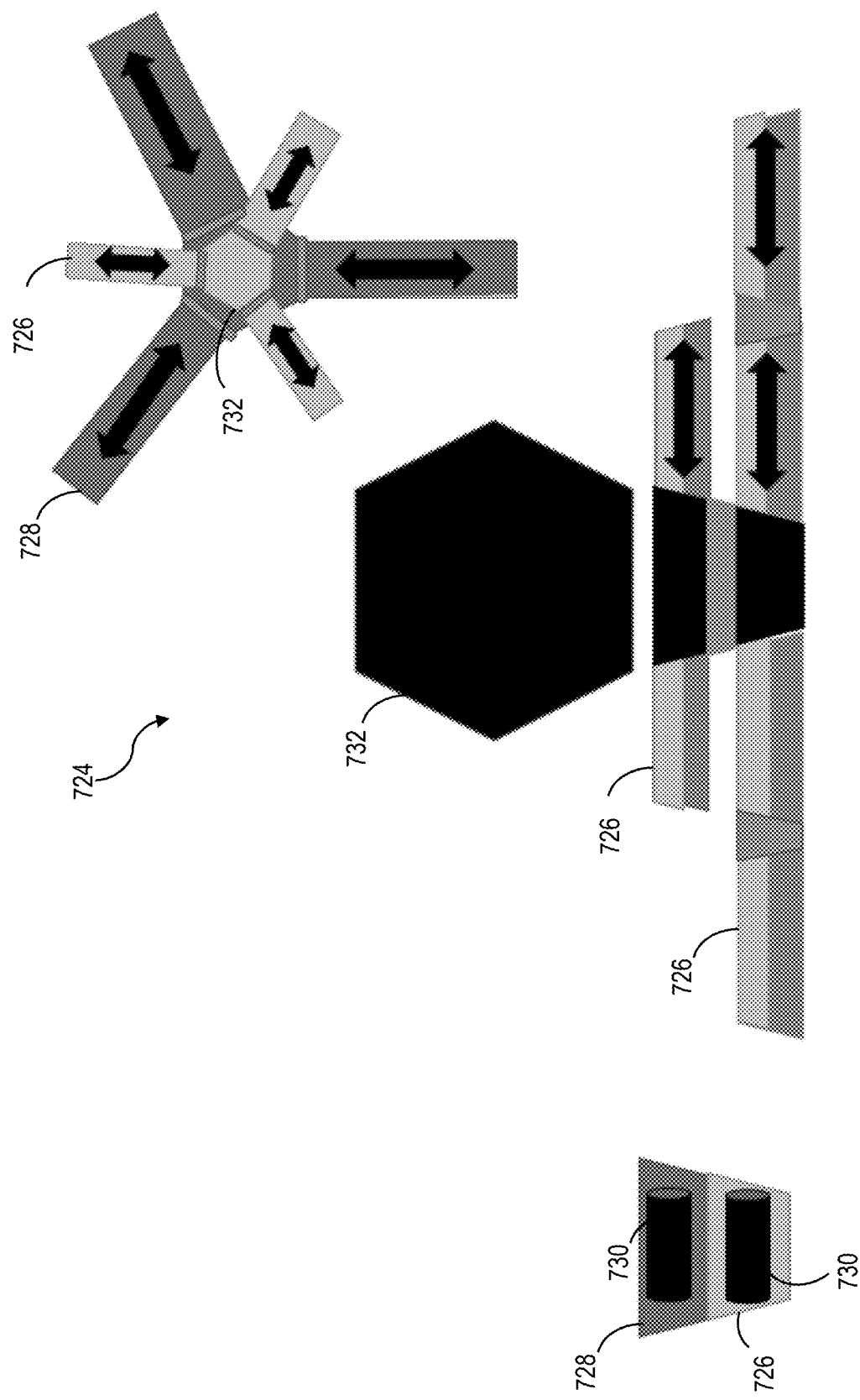
FIGS. 57-58 are diagrams of inflatable, space-deployable systems for wireless power and data transmission according to several embodiments.
Figure 58:
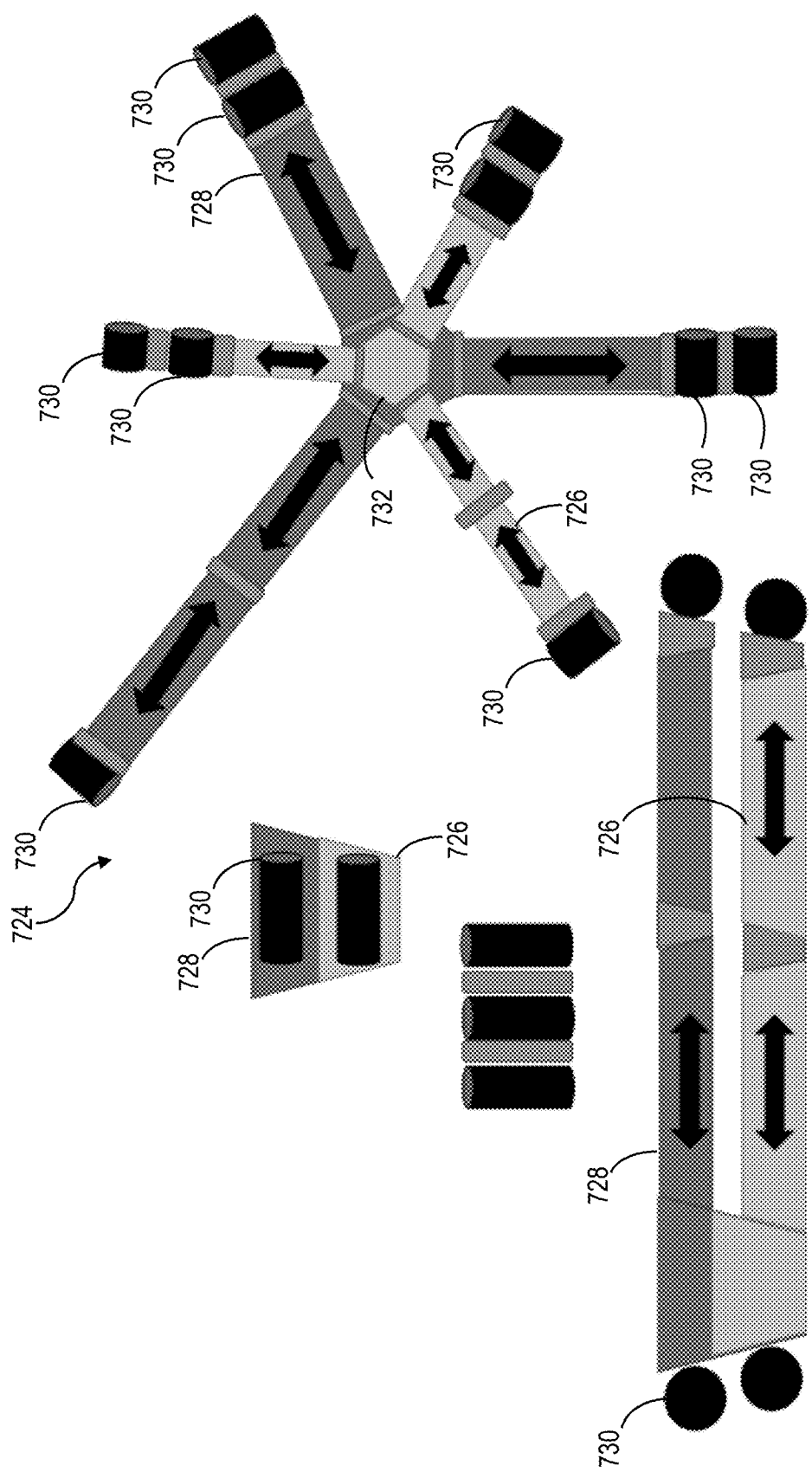

FIGS. 57-58 are diagrams of inflatable, space-deployable systems 724 for wireless power and data transmission according to several embodiments. Systems 724 comprise hexagonal body 732 and sandwich panels comprising solar cells 726, rectennas 728, and batteries 730. Systems 724 may be deployed. After deployment, solar cells 726 and rectennas 728 may roll out or inflate to increase surface area of each component. Systems 724 may wirelessly transfer data and power between to other systems 724, grounds stations, other aircraft, other spacecraft, or other entities.

Hexagonal body 732 may take on other forms in other embodiments. Each system 724 may be spin stabilized for aerial stability. Systems 724 are scalable, such that they may be configured in different sizes, for use in networks of various sizes. Systems 724 may comprise various configurations, for different use cases. Systems 724 comprise a compact design, for convenient transportation and deployment, as well as protection from solar flares. The batteries 730 may comprise nano thermite batteries, micro thermite batteries, metallic powder batteries, and or conventional batteries, such as lithium batteries, nickel metal hydride batteries, or lead acid batteries and/or the like.

Systems 724 may provide for predictive analytics, reactive to feedback data to protect space systems. Systems 724 may delate and fold for easy transportation.

Figure 59:
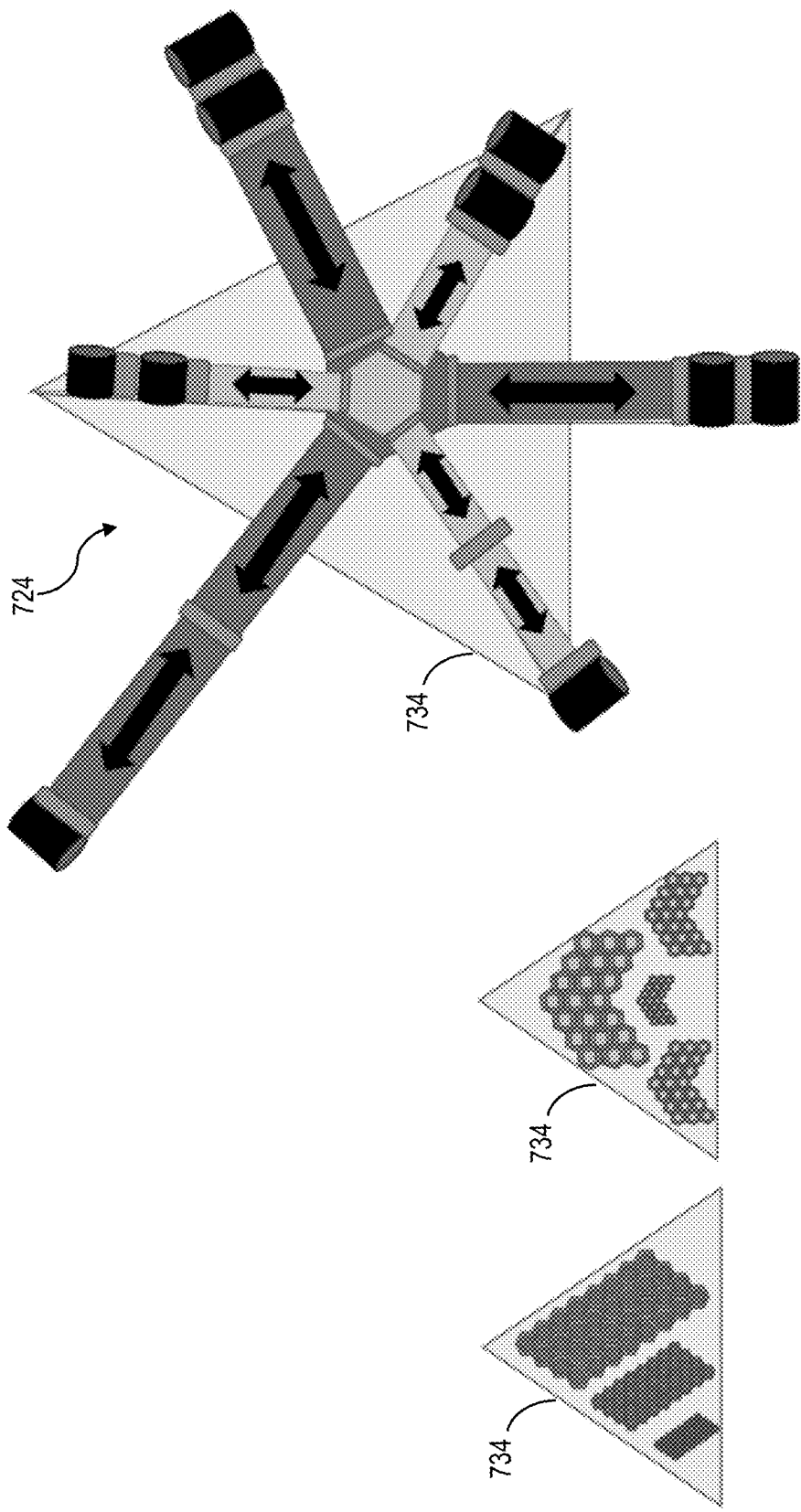
FIG. 59 are diagrams for deployable sails for wireless power and data transmission, according to several embodiments.

FIG. 59 are diagrams for deployable sails 734 for wireless power and data transmission, according to several embodiments. Deployable sails 734 may be fixed and or coupled to systems 724. Deployable sails 734 may be autonomously deployed or retracted, using magnetic control or other control schemes. Once deployed, sails 734 may be used for acceleration and deacceleration of systems 724. The surface of sail 734 may comprise an array of rectennas, solar cells, and or coils, such as induction coils. Arrays may be placed on the surface of each sail 734 in a fractal pattern. Sails 734 may comprise a sandwich structure, as described in reference to FIG. 57-58.

Figure 60:
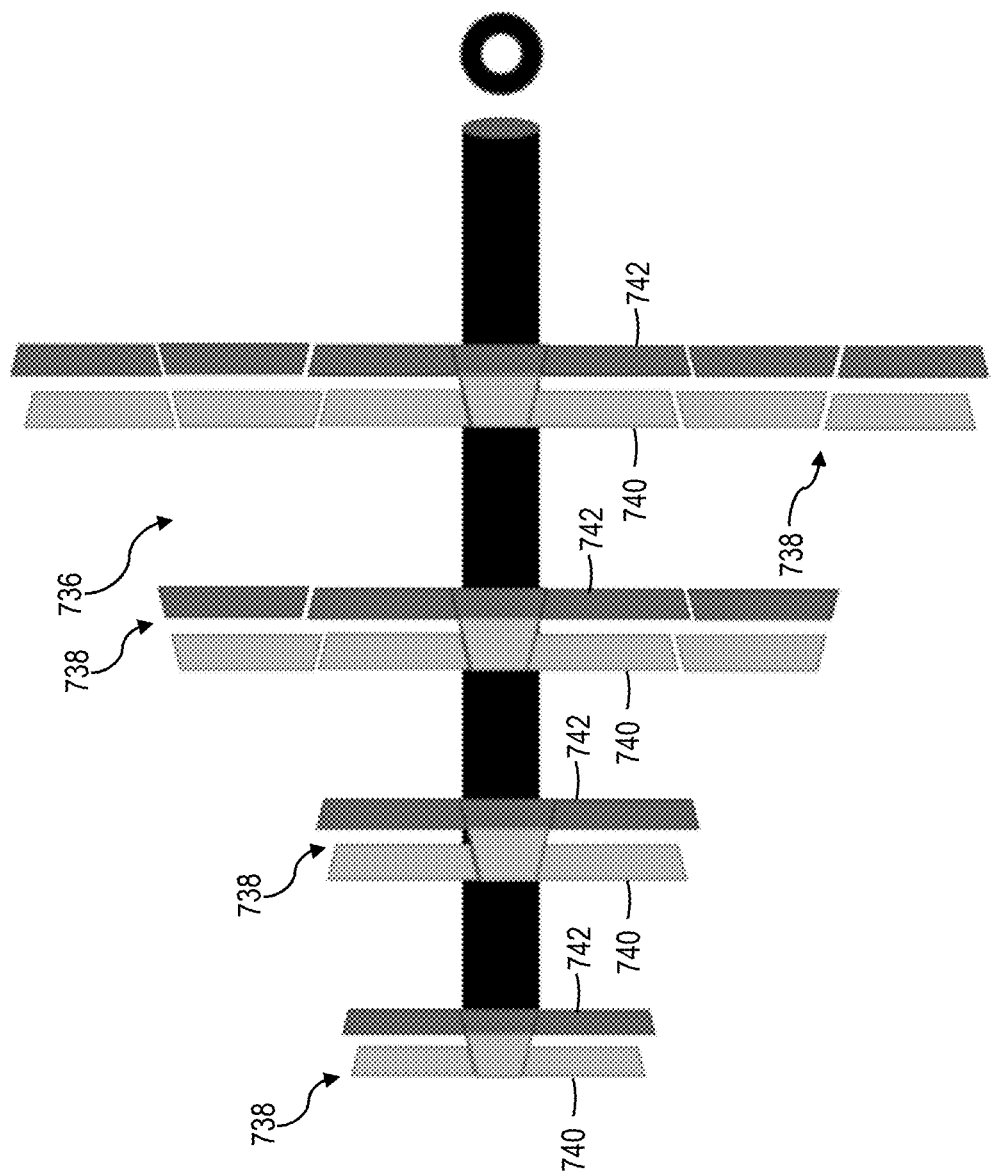
FIGS. 60-64 are diagrams for scalable satellite configurations for wireless power and data transmission, according to several embodiments.

FIGS. 60-64 are diagrams for scalable satellite configurations for wireless power and data transmission, according to several embodiments. Pictured in FIG. 60 is a system 736 for wireless power and data transmission. System 736 comprises sandwich panels 738 comprising solar cells 740, and rectenna 742. System 736 is configured as a scalable system, with a standardized interface for sandwich panels 738 and other components. The standardized interface enables components to be replaced one by one for repair and/or maintenance, reconfiguration or component upgrade. System 736 may be tethered to another object or surface, such to restrict the movement of system 736. System 736 may be spin stabilized.

Figure 61:
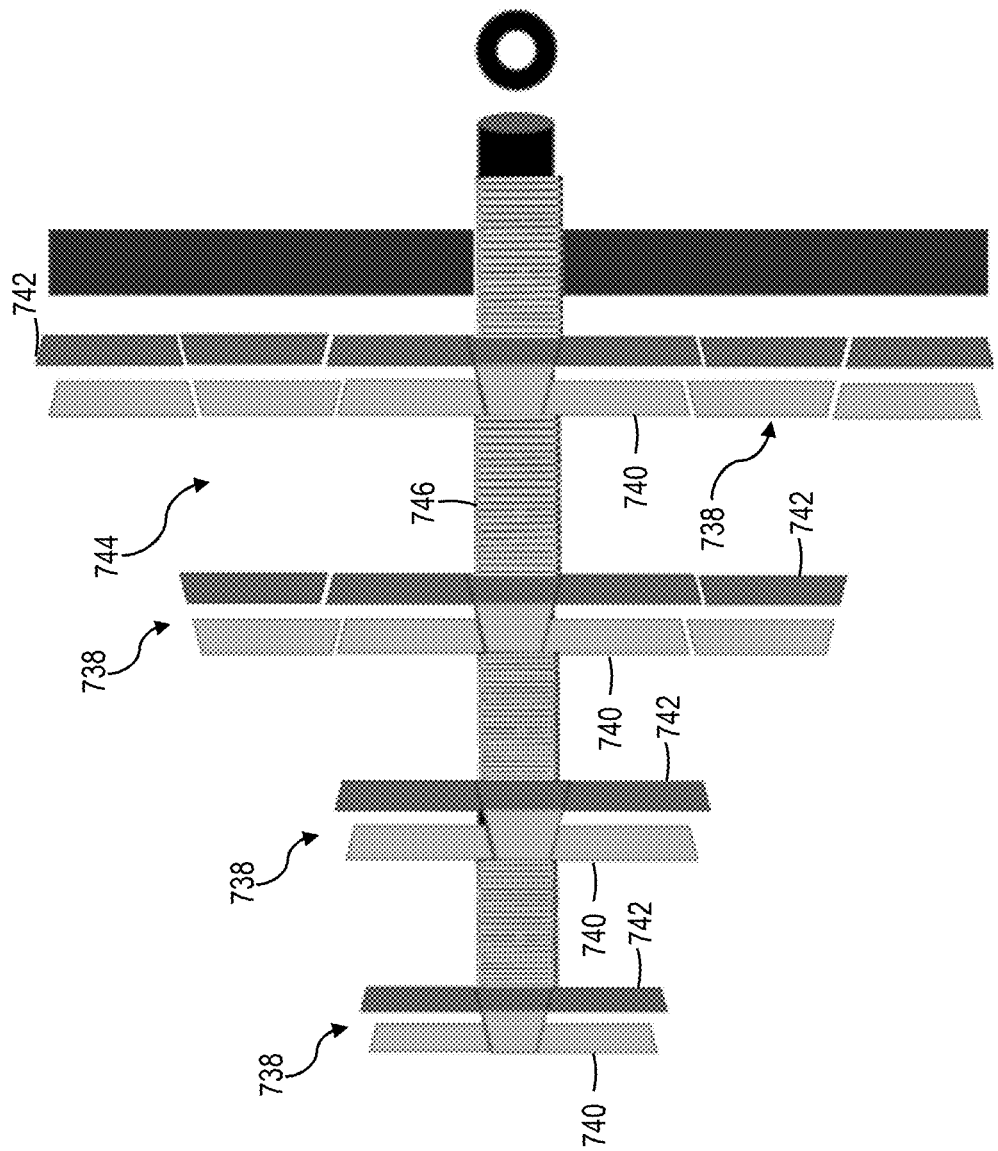

Pictured in FIG. 61 is an alternative embodiment of a system 744, analogous to system 736. System 744 comprises components of system 736 and additionally comprises inflatable accordion structure 746. Inflatable accordion structure 746 enables system 744 to increase its overall size, by inflating accordion structure 746. This may provide a number of advantages. For example, a system 744 with an increased size may enable system 744 to wireless transmit power and data over a larger area, or across a greater volume. Magnetohydrodynamics may be used to expand inflatable accordion structure 746.

Figure 62:
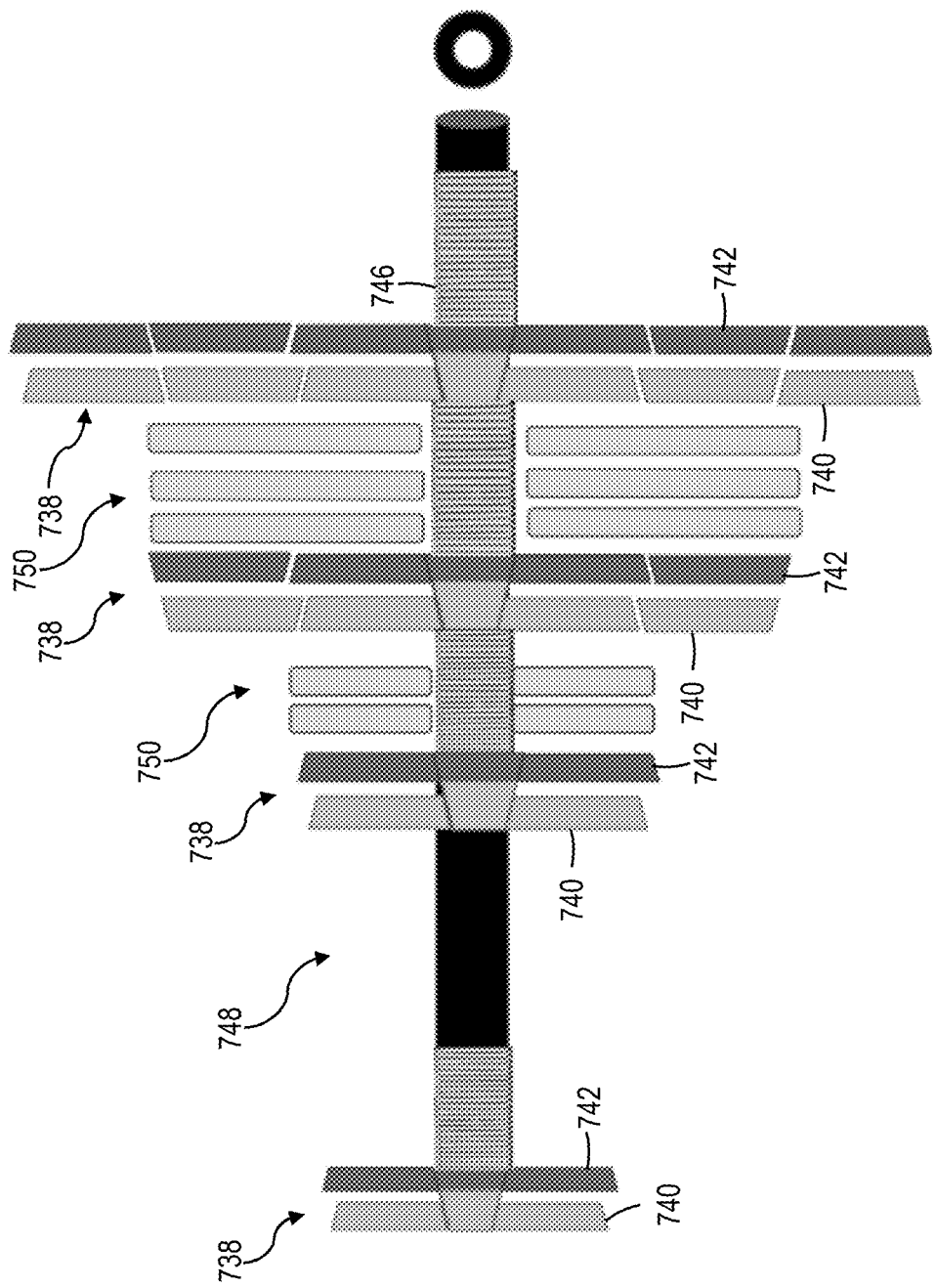

Pictured in FIG. 62 is an alternative embodiment of a system 748, analogous to system 744 and system 736. System 748 comprises components of system 744, and additionally comprises a venetian blind mechanism 750. The venetian blind mechanism 750 comprises a plurality of elements which may be manipulated or controlled such that light and or other electromagnetic radiation is directed to certain areas, volumes, or directions, or is modulated in intensity.

Figure 63:
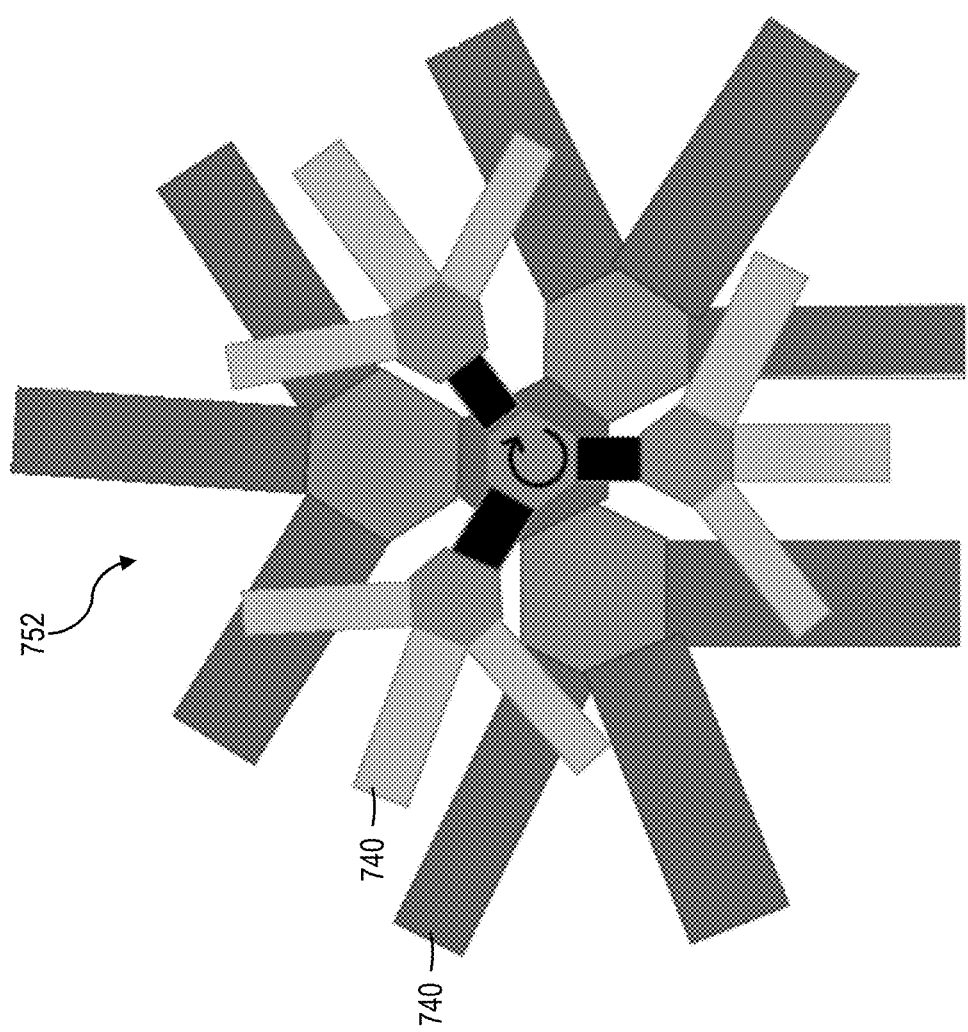

Pictured in FIG. 63 is an alternative embodiment of a system 752. System 752 comprises all of the components of system 736. System 752 is configured such that system 752 comprises an evolving architecture. System 752 is spin stabilized, such that system 752 may rotate at various rates, which may provide for thermal management, artificial gravity generation, and or gravity shielding for system 752.

Figure 64:
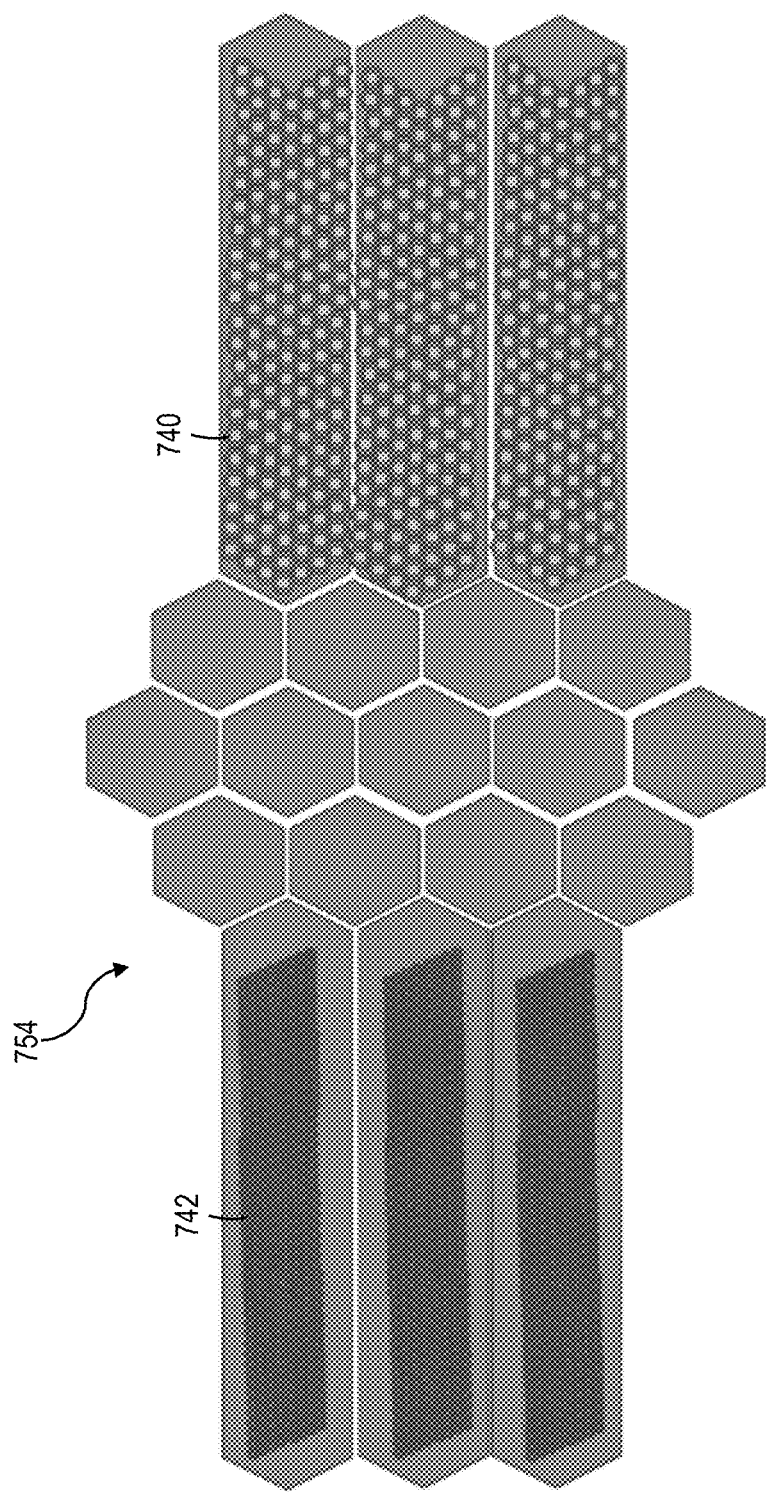

Pictured in FIG. 64 is an alternative embodiment of a system 754. System 754 is analogous to systems 736, 744, 748 and 752. System comprises an alternate configuration to systems 736, 744, 748 and 752. System 754 comprises a modular structure, allowing for a plurality of configurations of system 754. Individual components may be replaced for repair, upgrade, or change or configuration. Components of system 753 may be replaced to create a larger overall system 754, which may provide for wireless power and or data transfer over a larger volume or area, or may increase the performance of power and/or data transfer. Other configurations of system 754 may be equipped with hybrid power generation systems to enable other novel capabilities.

Figure 65:
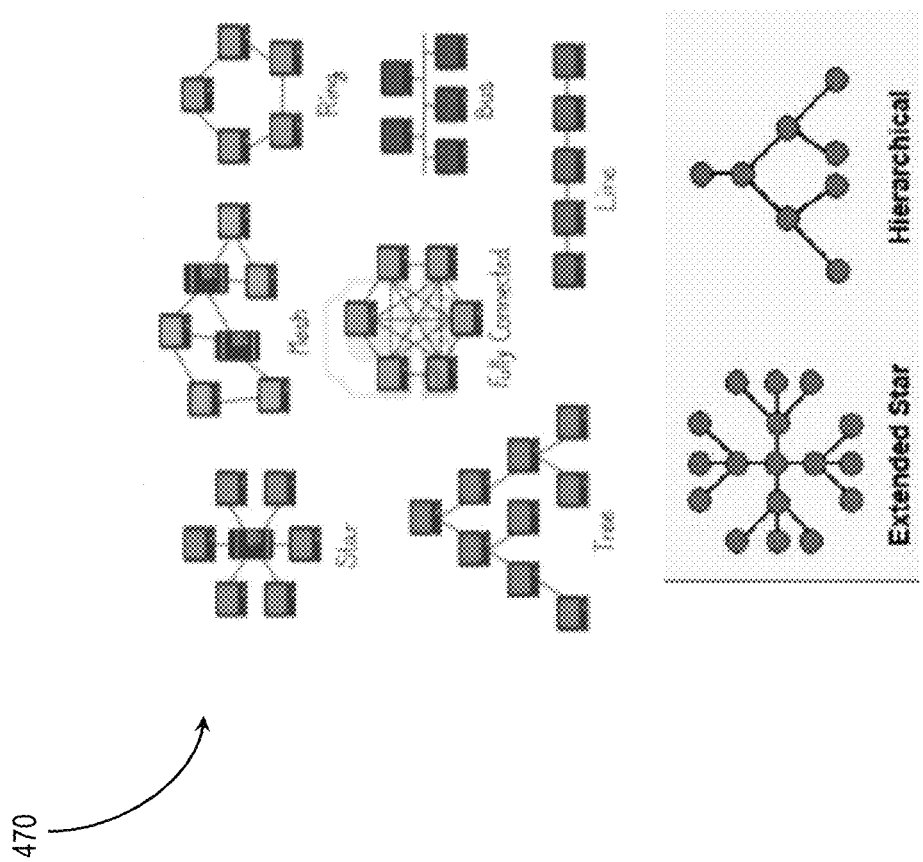
FIG. 65 is a diagram of power and data network topologies, according to several embodiments.

FIG. 65 is a diagram of power and data network topologies 470 for powering a three-dimensional array of vehicles, for example, a swarm of drones that could be continuous like a crystalline structure, or random like a flock of birds. The vehicles may be drones, or other aerial craft, cars, trucks, boats, or spacecraft, hereafter referred to as nodes. The nodes may be fixed, mobile or hybrid systems. The nodes may transmit, receive and store power or data. Charging a distributed array of nodes may be done using one or more network topologies shown. Charing power may occur by transferring power from a source to a node; then node to node (power relay system).

Figure 66:
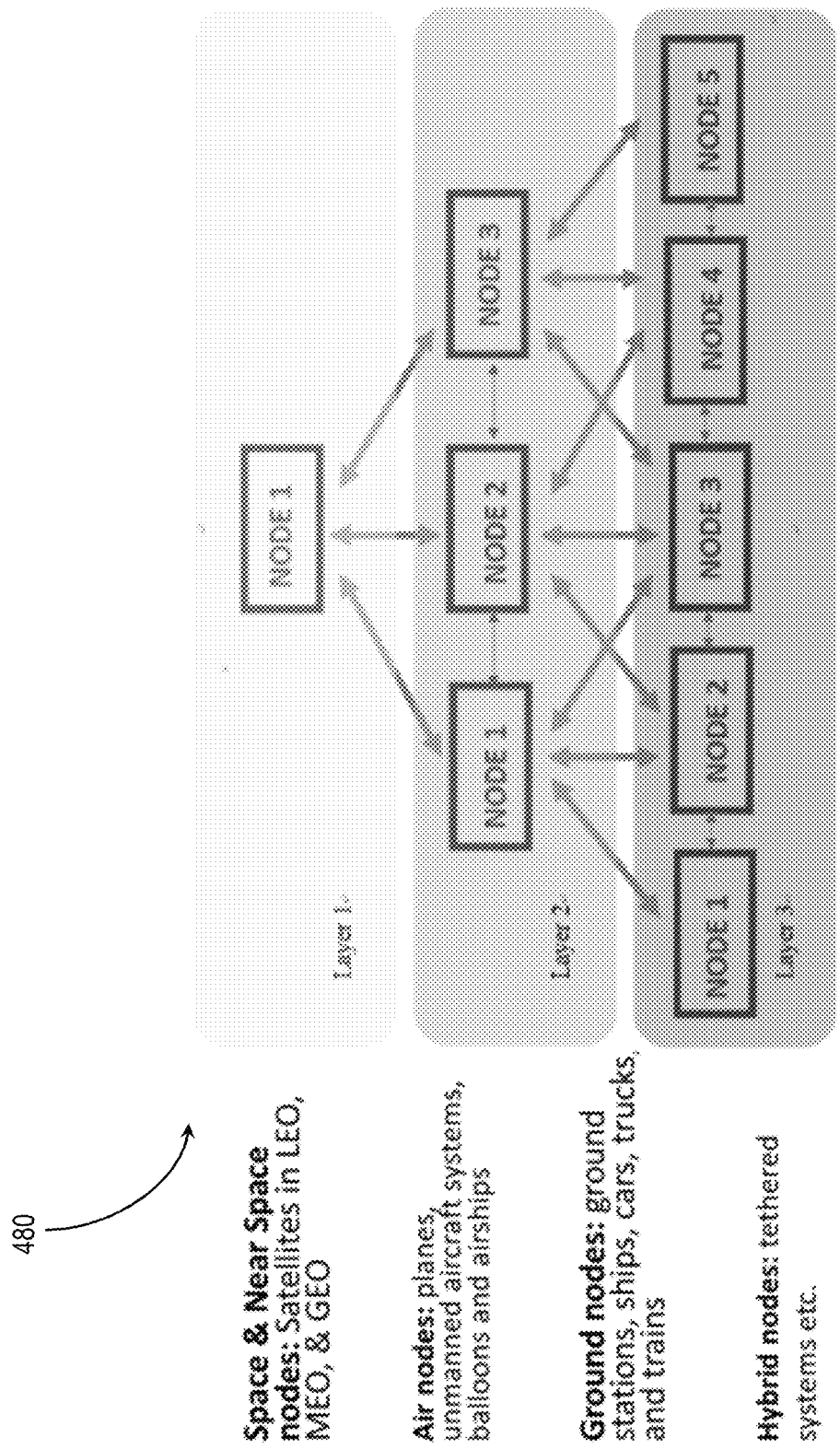
FIG. 66 is a diagram of a multi-orbit, multi-spectrum topology for wireless power and data transmission, according to an embodiment.

FIG. 66 is a diagram of a multi-orbit, multi-spectrum network topology 480 for wireless power and data transmission, according to an embodiment. The topology includes at least three layers or domains. A first layer includes space and near space nodes, for example, satellites in varying orbital distances. A second layer includes air nodes including aerial craft, including drones, balloons and airships. A third layer includes ground nodes including ground stations, ground based vehicles, etc. The topology may also include hybrid nodes, including tethered systems having tethered components on the ground and in the air; or having tethered components in the air and in space. Each node may transmit, receive and store power or data.

Figure 67:
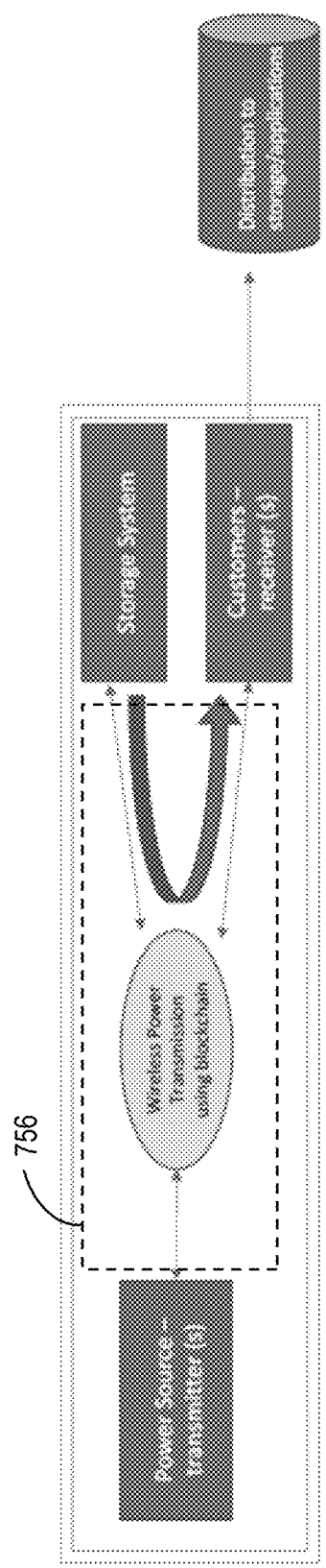
FIG. 67 is a diagram of blockchain for recording power and data transmission, according to an embodiment.

FIG. 67 is a diagram of blockchain 756 for recording power and data transmission, according to an embodiment. Each wireless power transmission and control signals transmitted and received between two aerial craft may be recorded as a transaction between the transmitting and receiving craft using blockchain technology between mobile nodes. Blockchain 756 may capture at least power source to customer, power source to storage system and storage system to customer. The system depicted in FIG. 67 may be applied to distributed power and data service hubs for mobile fleets of vehicles such as cars, boats, trains, airplanes, airships, aircraft, satellites and other vehicles. Fleets may be used to deliver power to IoT devices. The system depicted in FIG. 67 may be applied to smart cities to provision public services and for commercial purposes. The system depicted in FIG. 67 may be applied to mobile network backhaul for communication and/or utilities. The system depicted in FIG. 67 may applied to distributed power generation and information systems on earth and in space. The system depicted in FIG. 67 may applied advanced metering infrastructure, relay, wayfind and/or other in-situ monitoring purposes.

Figure 68:
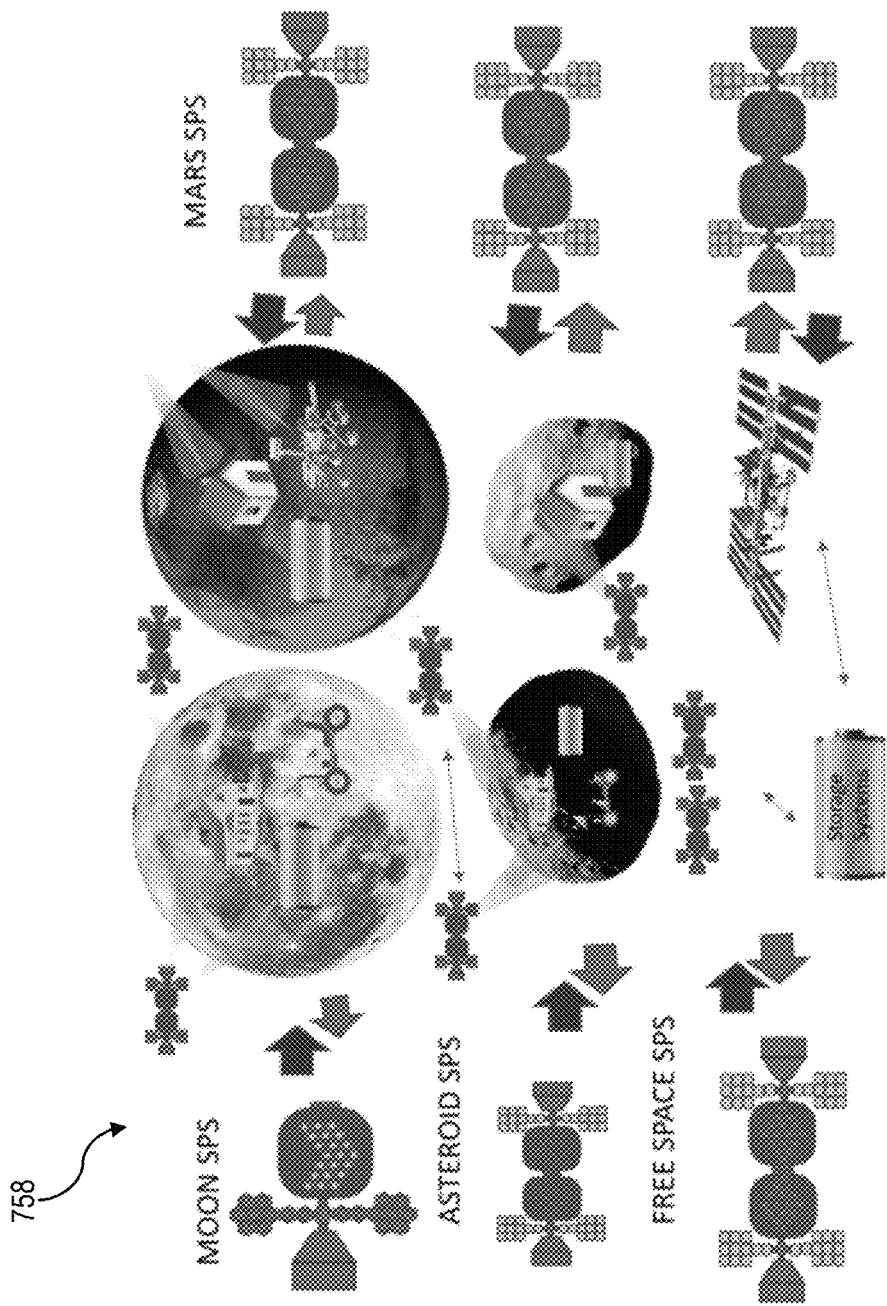
FIG. 68 is a diagram of in-space applications for wireless power and data transmission, according to several embodiments.

FIG. 68 is a diagram of in-space applications 758 for wireless power and data transmission, according to several embodiments. In space applications 758 of wireless power and data transmission as described herein may include directing power and data for control of in space systems, constellation of satellites for in orbit and surface operations of moon bases, rovers, drones, exploration vehicles and other lunar structures. Aspects of systems described herein may be used to create a point-to-point network for wireless power and data transfer on bodies such as the Moon, Mars, asteroids, and Earth. Bodies may be orbited by a craft, such as a satellite that may communicate with devices or ground stations present on the surface of each body, such as to enable a large scale wireless power and data transfer network, accessible on the surface and in the orbit of each body.

Figure 69:
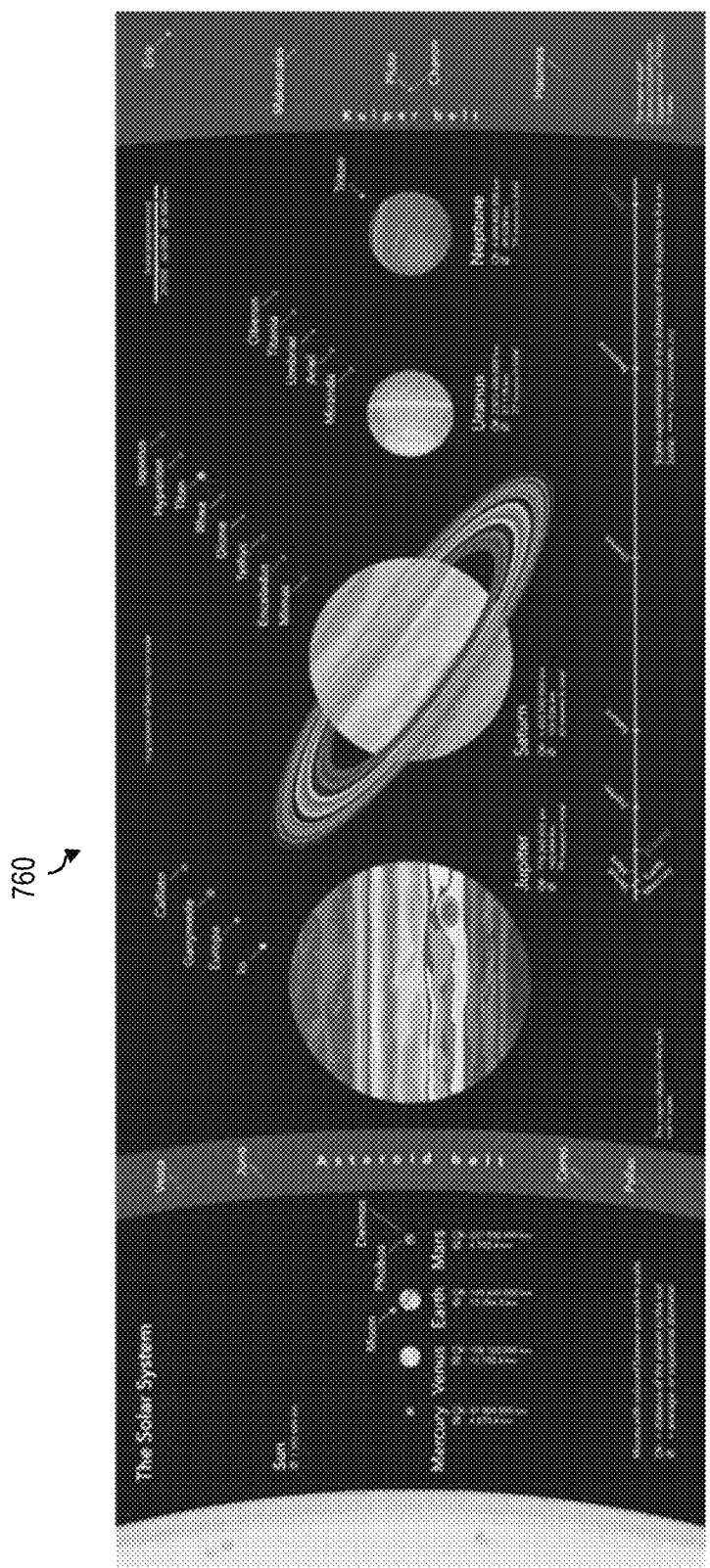
FIG. 69 is a diagram of the solar system showing environments for modular systems for wireless power and data transmission.

FIG. 69 is a diagram of the solar system showing environments 760 for modular systems for wireless power and data transmission. Wireless power and data transmission, systems, devices and methods as described herein may be applied to modular systems operable in extreme environments. These environments 760 may include the Moon, Mars, Earth orbit, asteroid surface, asteroid orbit and more. The robust, modular and scalable nature of wireless power and data transmission, systems, devices and methods as described result in a well-suited solution for intra solar system and deep space applications.

While the above description provides examples of one or more apparatus, methods, or systems, it will be appreciated that other apparatus, methods, or systems may be within the scope of the claims as interpreted by one of skill in the art.

The invention claimed is:

1. A system for energy transfer comprising:
   an autonomous first device having a first energy transceiver for transmitting and receiving electromagnetic energy;
   an autonomous second device having a second energy transceiver for transmitting and receiving the electromagnetic energy;
   wherein the electromagnetic energy passing between the first device and the second device forms a plurality of wireless energy transfer beams between the first device and the second device; and
   an autonomous third device having a third energy transceiver for receiving and converting the electromagnetic energy into an energy supply when the third device is within the wireless energy transfer beams.

2. The system of claim 1, wherein the first device, the second device and the third device each comprises an array of transmitters and receivers for transmitting and/or receiving the electromagnetic energy,
   wherein the electromagnetic energy passing between the first device, the second device and the third device, forms a plurality of wireless energy transfer beams between the respective devices.

3. The system of claim 2, wherein at least one of the first device, the second device and the third device further comprises an additive manufacturing unit for creating any one or more of the first energy transceiver, the second energy transceiver and or the third energy transceiver.

4. The system of claim 1, wherein the electromagnetic energy comprises electromagnetic radiation including at least one of: microwaves, masers, visible light, lasers, millimeter waves, ultraviolet waves and x-rays.

5. The system of claim 1, wherein the first device is a first airship, the second device is a second airship, and the third device is a drone.

6. The system of claim 1, wherein at least the first device, the second device and the third device further comprises a primary coil, and respectively at least the first device, the second device and the third device further comprises a secondary coil.

7. The system of claim 6, wherein the primary coil and the secondary coil are configured for resonant inductive coupling between the primary coil and the secondary coil.

8. The system of claim 6, wherein the primary coil and the secondary coil are configured for magnetic resonance based coupling between the primary coil and the secondary coil.

9. The system of claim 1, wherein the first device includes a data transmitter for transmitting data relating to the wireless power beam to the second device, and wherein the second device includes a data receiver for receiving the data.

10. The system of claim 1, wherein the system further includes a sensor configured to measure energy transfer from the plurality of wireless energy transfer beams to the third device, and record the energy transfer on a blockchain.

11. The system of claim 1, wherein the first device includes solar cells for converting solar energy into electrical energy.

12. The system of claim 1, wherein the autonomous third device includes a rectenna for converting electromagnetic radiation into direct current electricity.

13. The system of claim 1, wherein the first device includes any one or more of: a thermal rectenna for converting electromagnetic radiation into direct current electricity, an infrared thermal rectenna for converting infrared radiation into direct current electricity, a solar cell array coupled to a power transmitter, and a pilot signal receiver.

14. The system of claim 1, wherein at least the first device, the second device and the third device includes a modular swapping battery, that is replaceable with a battery provided by a plurality of devices.

15. The system of claim 1, wherein the first device comprises a balloon envelope having a plurality of energy receivers.

16. The system of claim 1, wherein the first device comprises a heated gas-helium hybrid lift system.

17. The system of claim 1, wherein the first device is a hot air balloon having a payload deployer configured to deploy the second device or the third device.

18. The system of claim 1, wherein the first device is a ground or refilling station, the first device having a wired energy transmission line for transferring power to the second device.

19. The system of claim 1, wherein the system further comprises a fourth device, wherein the fourth device comprises a networked internet of things device configured to receive data.

20. The system of claim 1, wherein at least the first device, the second device, and the third device communicate over quantum communication network secured by quantum encryption.

21. The system of claim 1, wherein at least the first device, the second device and the third device form quantum entangled transmitter-receiver pairs of a quantum communication network secured by quantum entangled beam encryption.

22. The system of claim 2, wherein at least the first device, the second device and the third device form nodes of a quantum communication network comprising the plurality of wireless energy transfer beams.

23. The system of claim 22, wherein the wireless energy transfer beams communicate by quantum entangled transmitter-receiver pairs between the nodes.

24. The system of claim 1, wherein the first device is a hybrid airship, the airship comprising a vector control system for compressing and directing heated gas.

25. The system of claim 1, wherein at least one of the first device and the second device is launched by an aerial craft.

26. The system of claim 1, wherein at least one of the first device, the second device and the third device is an semi-autonomous, remotely-piloted, and piloted devices.

27. The system of claim 1, wherein the first device is configured to dock to power or communications infrastructure.

28. The system of claim 1, wherein energy is transferred between the first device and the second device by a wired connection or a waveguide.

29. The system of claim 1, wherein at least one of the first device, the second device and the third device is a spacecraft.

30. The system of claim 1, wherein at least one of the first device, the second device and the third device comprises an energy storage device.

31. The system of claim 1, wherein at least one of the first device, the second device and the third device further comprises a sandwich panel having a first side and a second side, the first side comprising an energy receiver array, and the second side comprising an energy transceiver array.

32. The system of claim 31, wherein the energy transceiver array is a deployable structure to increase or decrease a transmitting and receiving area of the first device, the second device and/or the third device.

33. The system of claim 30, wherein the energy storage device comprises one of: a thermal battery, an electromagnetic battery, a nanothermite battery, a microthermite battery and a metal powder battery.

34. A method for wireless energy transfer comprising:
transmitting electromagnetic energy by a first device having a first energy transceiver;
receiving the electromagnetic energy by a second device having a second energy transceiver,
wherein the electromagnetic energy passing between the first device and the second device forms a plurality of wireless energy transfer beams between the first device and the second device; and
positioning a third device within the wireless energy transfer beams, the third device having a third energy transceiver for receiving and converting the electromagnetic energy into an energy supply.

35. The method of claim 34, further comprising:
connecting an array of transmitters and receivers for transmitting and/or receiving the electromagnetic energy,
forming a plurality of wireless energy transfer beams between the first device, the second device and the third device.

* * * * *